(12) United States Patent
Matsuda et al.

(10) Patent No.: US 9,051,654 B2
(45) Date of Patent: Jun. 9, 2015

(54) GALVANIZED STEEL SHEET

(75) Inventors: Takeshi Matsuda, Kawasaki (JP); Akira Matsuzaki, Tokyo (JP); Masato Sasaki, Fukuyama (JP); Katsutoshi Takashima, Fukuyama (JP); Satoru Ando, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 343 days.

(21) Appl. No.: 13/503,959

(22) PCT Filed: Oct. 22, 2010

(86) PCT No.: PCT/JP2010/069233
§ 371 (c)(1),
(2), (4) Date: Apr. 25, 2012

(87) PCT Pub. No.: WO2011/052701
PCT Pub. Date: May 5, 2011

(65) Prior Publication Data
US 2012/0208043 A1    Aug. 16, 2012

(30) Foreign Application Priority Data

Oct. 27, 2009  (JP) .................................. 2009-246819
Sep. 27, 2010  (JP) .................................. 2010-216037

(51) Int. Cl.
| | | |
|---|---|---|
| B32B 15/08 | (2006.01) | |
| B32B 15/18 | (2006.01) | |
| C23C 22/60 | (2006.01) | |
| C23C 22/05 | (2006.01) | |
| C23C 22/64 | (2006.01) | |
| C23C 22/82 | (2006.01) | |
| C09D 5/08 | (2006.01) | |
| C23C 22/83 | (2006.01) | |
| C23C 28/00 | (2006.01) | |

(52) U.S. Cl.
CPC .......... *C23C 22/60* (2013.01); *Y10T 428/12549* (2015.01); *C23C 22/05* (2013.01); *C23C 22/64* (2013.01); *C23C 22/82* (2013.01); *Y10T 428/12569* (2015.01); *Y10T 428/12556* (2015.01); *Y10T 428/12799* (2015.01); *Y10T 428/12972* (2015.01); *Y10T 428/265* (2015.01); *Y10T 428/12979* (2015.01); *C09D 5/084* (2013.01); *C23C 22/83* (2013.01); *C23C 28/00* (2013.01); *C23C 2222/20* (2013.01)

(58) Field of Classification Search
CPC .... B32B 15/08; B32B 15/082; B32B 15/092; B32B 2255/06; C23C 22/60; C23C 22/05; C23C 22/62; C23C 22/64; C23C 22/82; C23C 22/83; C23C 28/00; C23C 2222/00; C23C 2222/20; Y10T 428/12549; Y10T 428/12556; Y10T 428/12569; Y10T 428/12799; Y10T 428/12972; Y10T 428/12979; Y10T 428/265

USPC ........ 428/623, 624, 626, 632, 633, 653, 659, 428/684, 685, 639, 640, 215, 216, 219, 220, 428/332, 334, 335, 336, 339, 457, 469, 470, 428/472

See application file for complete search history.

(56) References Cited

U.S. PATENT DOCUMENTS

| | | |
|---|---|---|
| 2002/0090529 A1 | 7/2002 | Ueda et al. |
| 2006/0177685 A1* | 8/2006 | Matsuda et al. ............... 428/621 |
| 2008/0063896 A1* | 3/2008 | Fujibayashi et al. ........... 428/684 |
| 2010/0035055 A1 | 2/2010 | Okai et al. |

FOREIGN PATENT DOCUMENTS

| | | |
|---|---|---|
| JP | 2000-144449 | 5/2000 |
| JP | 2001-181860 | 7/2001 |
| JP | 2001-234358 | 8/2001 |
| JP | 2001-271175 | 10/2001 |
| JP | 2002-030459 | 1/2002 |
| JP | 2002-053979 | 2/2002 |
| JP | 2002-053980 | 2/2002 |
| JP | 2002-105658 | 4/2002 |
| JP | 3302677 | 7/2002 |
| JP | 2003-013252 | 1/2003 |
| JP | 2003-155452 | 5/2003 |
| JP | 2003-171778 | 6/2003 |
| JP | 2004-183015 | 7/2004 |
| JP | 3549455 | 8/2004 |
| JP | 2004-263252 | 9/2004 |
| JP | 3596665 | 12/2004 |
| JP | 2005-048199 | 2/2005 |
| JP | 2005-194627 | 7/2005 |
| JP | 2006-213958 | 8/2006 |
| JP | 2006-321957 | 11/2006 |
| JP | 2007-177314 | 7/2007 |
| JP | 2008-169470 | 7/2008 |
| JP | 2008-274388 | 11/2008 |

OTHER PUBLICATIONS

Machine Translation, Tonaka JP 2007-177314, Jul. 2007.*
International Search Report, PCT/JP2010/069233, Dec. 14, 2010.

* cited by examiner

*Primary Examiner* — Michael E La Villa
(74) *Attorney, Agent, or Firm* — Young & Thompson

(57) ABSTRACT

There is provided a galvanized steel sheet that has various properties such as corrosion resistance and adhesion and allows for high conductivity at a low contact pressure. A first layer film is formed by applying a surface treatment solution having a pH of 8 to 10 onto the surface of the galvanized steel sheet and drying the surface treatment solution by heating, the surface treatment solution containing a water-soluble zirconium compound, a tetraalkoxysilane, an epoxy group-containing compound, a chelating agent, a silane coupling agent, vanadic acid, and a metal compound in a specific ratio. Subsequently, a second layer film is formed by applying a surface treatment solution containing an organic resin onto the surface of the first layer film and drying the surface treatment solution by heating.

28 Claims, No Drawings

GALVANIZED STEEL SHEET

TECHNICAL FIELD

The present invention relates to an environmentally friendly galvanized steel sheet that is used for automobiles, household electrical appliances, building materials, and the like and that is surface-treated such that a surface-treatment film formed on a surface of the galvanized steel sheet is completely free from regulated substances causing pollution such as hexavalent chromium. In particular, the present invention relates to a galvanized steel sheet that is suitable for applications relating to electric and electronic devices and the like in which electromagnetic interference (EMI) needs to be prevented and that has good electromagnetic shielding characteristics and high corrosion resistance.

BACKGROUND ART

With recent trends toward digitization of household electrical appliances, an increase in the speed of CPUs, and the like, issues relating to an electromagnetic disturbance that adversely affects the peripheral devices and human bodies have been attracting attention. To address the issues, "The Voluntary Control Council for Interference by Information Technology Equipment (VCCI)" was established in Japan. To comply with the rules of VCCI, there has been an increasingly strong trend in the industry toward voluntary control in terms of the issues relating to an electromagnetic disturbance. To address electromagnetic noise generated from electronic boards inside electric and electronic devices, for example, there is a technique of enclosing the electronic boards with a shield box composed of a metal (electrically conductive) material to achieve electromagnetic shielding.

In a shield box, the electrically conductive material constituting the shield box reflects electromagnetic waves to achieve electromagnetic shielding. As the electrical conductivity of a material constituting a shield box increases, the reflectivity of electromagnetic waves increases and the electromagnetic shielding property improves. Accordingly, to ensure the electromagnetic shielding property of a shield box, it is important that metal plates constituting the shield box have high electrical conductivity.

Such a shield box is produced by shaping metal plates and hence has discontinuous portions (joints and joining portions). Leakage or entry of electromagnetic waves tends to occur through such discontinuous portions. Therefore, to suppress leakage and entry of electromagnetic waves, electrically conductive gaskets are generally inserted into the discontinuous portions of shield boxes.

To enhance the shielding property of a shield box, the shield box needs to have a structure in which a desired electric current can be passed through the entire shield box. However, such portions where metal members and gaskets are in contact with each other generally have a low contact pressure and thus have poor electrical continuity (hereinafter, simply referred to as "continuity") between the metal members and gaskets. Thus, the amount of current passing through the contact portions tends to become small. Accordingly, to further enhance the performance of a shield box, it is important to ensure the electrical conductivity of metal plates constituting the shield box and to ensure the continuity between the metal plates and gaskets.

Since electric and electronic devices are used in various environments today, materials constituting shield boxes are required not to corrode in usage in severe environments, that is, to have high corrosion resistance. A chromate treatment has been known as a typical method for improving the corrosion resistance (white-rust resistance and red-rust resistance) of galvanized steel sheets. Galvanized steel sheets subjected to a chromate treatment with a treatment solution mainly containing chromic acid, dichromic acid, or a salt of the foregoing have been widely used as steel sheets for household electrical appliances, steel sheets for building materials, and steel sheets for automobiles.

As described above, metal members (steel sheets) constituting shield boxes need to have high electrical conductivity and furthermore have continuity with gaskets. Although films formed on surfaces of steel sheets by a chromate treatment have lower electrical conductivity than the base steel sheets, films formed by a chromate treatment can exhibit rust resistance even when the films have a small thickness. Therefore, in surface-treated steel sheets subjected to a chromate treatment, by decreasing the thickness of films having low electrical conductivity as small as possible, electrical conductivity equivalent to that of steel sheets (without surface treatment) is achieved. As a result, continuity between the metal members and the gaskets can be sufficiently ensured and thus both rust resistance and electromagnetic shielding property can be achieved. However, due to recent global environmental issues, there is an increasing demand for employing pollution-free surface-treated steel sheets provided without using a chromate treatment, that is, chromium-free treated steel sheets.

A large number of techniques relating to chromium-free treated steel sheets have been proposed. Examples of the techniques include techniques of using the passivation effect of molybdic acid and tungstic acid belonging to group IVA as with chromic acid; techniques of using metal salts of transition metals such as Ti, Zr, V, Mn, Ni, and Co and rare-earth elements such as La and Ce; techniques based on chelating agents such as polyhydric phenolcarboxylic acid, e.g., tannic acid and S- or N-containing compounds; techniques of forming a polysiloxane film with a silane coupling agent; and techniques in combination of the foregoing.

Specific examples are as follows:
(1) a technique of forming a film with a treatment solution containing a coating agent obtained by causing an organic resin such as a polyvinylphenol derivative, an acid component, and an epoxy compound to react with one another, a silane coupling agent, a vanadium compound, and the like (e.g., PTLs 1, 2, 3, and 4);
(2) a technique of forming a film containing an aqueous resin, a thiocarbonyl group, a vanadate compound, and phosphoric acid (e.g., PTL 5);
(3) a technique of forming a film with a treatment solution containing a compound of a metal such as Ti, an inorganic acid such as a fluoride or phosphate compound, and an organic acid (PTLs 6, 7, 8, 9, 10, 11, and 12);
(4) a technique in which a composite film containing a rare-earth element such as Ce, La, or Y and a Ti or Zr element is formed, and a layer having a high oxide content is formed in a region of the film closer to the interface and a layer having a high hydroxide content is formed in a region of the film closer to the front surface (PTL 13), and a technique of forming a composite film composed of Ce and a Si oxide (PTL 14);
(5) a technique of forming an organic composite coating constituted by a lower layer that is a phosphoric acid and/or phosphate compound film containing an oxide and an upper layer that is a resin film (e.g., PTLs 15 and 16); and
(6) a technique of forming a composite film composed of a specific inhibitor component and a silica/zirconium compound (e.g., PTL 17).

The films formed by these techniques are intended to suppress the generation of white rust of zinc through composite addition of organic components or inorganic components. For example, in the techniques (1) and (2), corrosion resistance is ensured by mainly adding an organic resin. However, in a film containing such an organic resin, the organic resin has an insulating property. Therefore, a steel sheet having such a film formed thereon does not have sufficient electrical conductivity and thus is not suitable as a material of shield boxes.

The techniques (3) and (4) provide films that are completely free from organic components and are composed of inorganic components only. However, such a composite film composed of a metal oxide or a metal hydroxide needs to have a large thickness to impart sufficient corrosion resistance to a galvanized steel sheet. In addition, a surface of a galvanized steel sheet is covered with a non-conductive film (insulating film) composed of zinc phosphate or the like. Therefore, as in the techniques (1) and (2), high electrical conductivity is less likely to be achieved and it is difficult to achieve both high corrosion resistance and electrical conductivity.

The technique (5) focuses on the fact that the electrical conductivity of a surface of a surface-treated steel sheet depends on the thickness of an insulating film formed on the surface, and high electrical conductivity is achieved by decreasing the thickness of the insulating film. However, the decrease in the thickness results in degradation of corrosion resistance of the steel sheet. Therefore, it is difficult to provide a surface-treated steel sheet that is excellent in terms of both corrosion resistance and electrical conductivity.

The technique (6) provides high corrosion resistance by using the passivation effect of a vanadate compound serving as an inhibitor component and a sparingly soluble metal salt formed with a phosphate compound serving as an inhibitor component, and by forming a composite film containing a zirconium compound, silica fine particles, and a silane coupling agent that constitute the skeleton of the film. However, to ensure electrical conductivity, the film thickness needs to be small. Thus, it is difficult to achieve both high corrosion resistance and electrical conductivity.

As described above, to make the chromium-free treated steel sheet having been developed so far have corrosion resistance equivalent to that of existing chromate films, films having a good insulating property need to have a large thickness. Accordingly, it is difficult for such chromium-free treated steel sheets to have sufficiently high electrical conductivity. Thus, these steel sheets do not sufficiently satisfy characteristics required for steel sheets constituting shield box bodies. In addition, as described above, to enhance the shielding property of a shield box, sufficiently high continuity needs to be achieved between metal members (steel sheets) and gaskets that are in contact with each other at a low contact pressure. However, such continuity is not considered at all in any of the above-described techniques.

CITATION LIST

Patent Literature

PTL 1: Japanese Unexamined Patent Application Publication No. 2003-13252
PTL 2: Japanese Unexamined Patent Application Publication No. 2001-181860
PTL 3: Japanese Unexamined Patent Application Publication No. 2004-263252
PTL 4: Japanese Unexamined Patent Application Publication No. 2003-155452
PTL 5: Japanese Patent No. 3549455
PTL 6: Japanese Patent No. 3302677
PTL 7: Japanese Unexamined Patent Application Publication No. 2002-105658
PTL 8: Japanese Unexamined Patent Application Publication No. 2004-183015
PTL 9: Japanese Unexamined Patent Application Publication No. 2003-171778
PTL 10: Japanese Unexamined Patent Application Publication No. 2001-271175
PTL 11: Japanese Unexamined Patent Application Publication No. 2006-213958
PTL 12: Japanese Unexamined Patent Application Publication No. 2005-48199
PTL 13: Japanese Unexamined Patent Application Publication No. 2001-234358
PTL 14: Japanese Patent No. 3596665
PTL 15: Japanese Unexamined Patent Application Publication No. 2002-53980
PTL 16: Japanese Unexamined Patent Application Publication No. 2002-53979
PTL 17: Japanese Unexamined Patent Application Publication No. 2008-169470

SUMMARY OF INVENTION

Technical Problem

The present invention overcomes the above-described problems in the related art. An object of the present invention is to provide a galvanized steel sheet having a surface-treatment film that is completely free from regulated substances causing pollution such as hexavalent chromium and allows for high continuity without degrading corrosion resistance even under a severe condition that the steel sheet is in contact with a gasket or the like at a low contact pressure.

Solution to Problem

As a result of the eager study to overcome the above-described problem, the inventors of the present invention have found that the above-described problems can be overcome by forming a first layer film, which is a composite oxide film (inorganic film), by applying an alkaline surface treatment solution (A) containing a water-soluble zirconium compound, a tetraalkoxysilane, an epoxy group-containing compound, a chelating agent, a vanadate compound, and a metal compound onto a surface of a galvanized layer and drying the surface treatment solution (A) by heating, and furthermore by forming a second layer film, which is an organic resin film, by applying a surface treatment solution (B) containing an organic resin onto a surface of the first layer film and drying the surface treatment solution (B) by heating.

The present invention has been completed based on the above-described finding, and the gist thereof is as follows.

(1) A galvanized steel sheet includes a surface film on a surface of a galvanized layer, the surface film having a two-layer structure including a first layer film and a second layer film, wherein the first layer film is formed by applying a surface treatment solution (A) having a pH of 8 to 10 onto the surface of the galvanized layer and drying the surface treatment solution (A) by heating, the surface treatment solution (A) containing a water-soluble zirconium compound (a), a tetraalkoxysilane (b), an epoxy group-containing compound (c), a chelating agent (d), a vanadate compound (e), and a metal compound (f) containing at least one selected from the group consisting of Ti, Al, and Zn so that conditions (I) to (V) below are satisfied; the second layer film is formed by applying a surface treatment solution (B) containing an organic resin (h) onto a surface of the first layer film and drying the surface treatment solution (B) by heating; and the total thickness of the first layer film and the second layer film is 0.1 to 3 μm per side:

(I) a ratio ($a_{Zr}/b$) of the mass ($a_{Zr}$) of the water-soluble zirconium compound (a) in terms of Zr to the mass of the tetraalkoxysilane (b) is 1.0 to 6.0, (II) a ratio ($b/c_s$) of the mass of the tetraalkoxysilane (b) to the mass of a solid ($c_s$) of the epoxy group-containing compound (c) is 0.1 to 1.6, (III) a ratio ($b/d_s$) of the mass of the tetraalkoxysilane (b) to the mass of a solid ($d_s$) of the chelating agent (d) is 0.3 to 2.0, (IV) a ratio ($e_v/d_s$) of the mass ($e_v$) of the vanadate compound (e) in terms of V to the mass of a solid ($d_s$) of the chelating agent (d) is 0.03 to 1.0, and (V) a ratio ($f_M/d_S$) of the total metal mass ($f_M$) of the metal compound (f) to the mass of a solid ($d_s$) of the chelating agent (d) is 0.05 to 0.8.

(2) In the galvanized steel sheet according to (1) above, the surface treatment solution (A) further contains a nonionic acrylic resin emulsion (g), and a ratio of the nonionic acrylic resin emulsion in the surface treatment solution (A) is 0.5 to 45.0% by mass on a solid content basis.

(3) In the galvanized steel sheet according to (2) above, the ratio of the nonionic acrylic resin emulsion in the surface treatment solution (A) is 0.5 to 4.5% by mass on a solid content basis.

(4) In the galvanized steel sheet according to any one of (1) to (3) above, the organic resin (h) in the surface treatment solution (B) contains an organic resin (F) having an OH group and/or a COOH group.

(5) In the galvanized steel sheet according to any one of (1) to (3) above, the organic resin (h) in the surface treatment solution (B) contains a hydrazine-modified organic resin (X) produced by reaction with an active hydrogen-containing compound (D) that is partly or entirely composed of a hydrazine derivative (E) containing active hydrogen.

(6) In the galvanized steel sheet according to any one of (1) to (5) above, the surface treatment solution (B) further contains a rust-inhibiting additive (Y).

(7) In the galvanized steel sheet according to (6) above, the rust-inhibiting additive (Y) is (i) and/or (j) below, and the content of the rust-inhibiting additive (Y) is 1 to 100 parts by mass on a solid content basis relative to 100 parts by mass of the whole organic resin (h) in the surface treatment solution (B):

(i) Ca ion-exchanged silica; and
(j) silicon oxide.

(8) In the galvanized steel sheet according to any one of (1) to (7) above, the surface treatment solution (B) further contains a lubricant (k).

Advantageous Effects of Invention

According to the present invention, a galvanized steel sheet can be provided that has various properties such as corrosion resistance and adhesion and allows for high continuity without degrading corrosion resistance even under a severe condition that the steel sheet is in contact with a gasket or the like at a low contact pressure.

DESCRIPTION OF EMBODIMENTS

Hereinafter, the present invention will be specifically described.

<Galvanized Steel Sheet>

Non-limiting examples of a galvanized steel sheet according to the present invention include a hot dip galvanized steel sheet (GI), a hot dip galvannealed steel sheet (GA) that is obtained by alloying the hot dip galvanized steel sheet (GI), a hot dip Zn-5 mass % Al alloy-coated steel sheet (GF), a hot dip Zn-55 mass % Al alloy-coated steel sheet (GL), an electrogalvanized steel sheet (EG), and a Zn—Ni electrogalvanized steel sheet (Zn-11 mass % Ni).

<First layer film>

In the present invention, a first layer film is formed by applying a surface treatment solution (A) onto the surface of a galvanized layer of a galvanized steel sheet and drying the' surface treatment solution (A) by heating. The first layer film formed of the surface treatment solution (A) is a composite oxide film (inorganic film) and is excellent in terms of heat resistance, weldability, adhesion, and continuity. Thus, in the present invention, the first layer film has an important role for obtaining a galvanized steel sheet having high continuity without degrading corrosion resistance even under a severe condition that the steel sheet is in contact with a gasket or the like at a low contact pressure.

<Surface Treatment Solution (A)>

The surface treatment solution (A) contains a water-soluble zirconium compound (a), a tetraalkoxysilane (b), an epoxy group-containing compound (c), a chelating agent (d), a vanadate compound (e), and a metal compound (f) containing at least one metal selected from the group consisting of Ti, Al, and Zn.

When a surface treatment film is formed on a galvanized steel sheet with a surface treatment solution containing the water-soluble zirconium compound (a), a galvanized steel sheet is provided that is excellent in terms of various properties such as corrosion resistance of the steel sheet, adhesion of the formed film, and corrosion resistance of the steel sheet after alkaline degreasing, and that is excellent in terms of heat resistance and weldability, which are characteristics of steel sheets having an inorganic film formed thereon.

The type of the water-soluble zirconium compound (a) is not particularly limited and examples thereof include zirconium nitrate, zirconium oxynitrate, zirconyl acetate, zirconyl sulfate, zirconium carbonate, ammonium zirconyl carbonate, potassium zirconyl carbonate, sodium zirconyl carbonate, and zircon hydrofluoric acid. One or more of these compounds can be used. In particular, ammonium zirconyl carbonate and sodium zirconyl carbonate are preferred because they provide higher corrosion resistance and continuity to a galvanized steel sheet. The content of the water-soluble zirconium compound (a) is not particularly limited, but the mass ($a_{zr}$) of the water-soluble zirconium compound (a) in terms of Zr is preferably about 12 to 38% by mass and more preferably 14 to 36% by mass relative to the total solid content of the surface treatment solution (A) because the corrosion resistance and adhesion of the obtained first layer film are further improved. The total solid content means a solid content of a first layer film formed by applying a surface treatment solution (A) and drying it by heating, and a solvent or the like is not included.

When the first layer film is formed on a galvanized steel sheet with a surface treatment solution containing the water-soluble zirconium compound (a) and a tetraalkoxysilane (b), a galvanized steel sheet is provided that is excellent in terms of various properties such as corrosion resistance of the steel sheet, adhesion of the formed film, and corrosion resistance of the steel sheet after alkaline degreasing, and that is excellent in terms of heat resistance and weldability, which are characteristics of inorganic films. The reason why such excellent characteristics are provided is unclear. However, the characteristics are probably provided because, when the tetraalkoxysilane (b) and the above-described water-soluble zirconium compound (a) are used in combination, the water-soluble zirconium compound (a) and the tetraalkoxysilane (b) form a film having three-dimensional crosslinking.

The type of the tetraalkoxysilane (b) is not particularly limited and examples thereof include tetramethoxysilane, tetraethoxysilane, and tetrapropoxysilane. One or more of these compounds may be used. In particular, tetraethoxysilane and tetramethoxysilane are preferred because they provide higher corrosion resistance to a galvanized steel sheet.

The water-soluble zirconium (a) and the tetraalkoxysilane (b) are contained such that the ratio ($a_{zr}$/b) of the mass ($a_{zr}$) of the water-soluble zirconium compound (a) in terms of Zr to the mass of the tetraalkoxysilane (b) is 1.0 to 6.0 and preferably 1.6 to 3.1. If the mass ratio is less than 1.0, a galvanized steel sheet having high corrosion resistance is not provided. If the mass ratio is more than 6.0, the continuity of a galvanized steel sheet is degraded.

When the first layer film is formed on a galvanized steel sheet with a surface treatment solution containing the water-soluble zirconium compound (a), the tetraalkoxysilane (b), and an epoxy group-containing compound (c), a galvanized steel sheet is provided that is excellent in terms of various properties such as corrosion resistance of the steel sheet and corrosion resistance of the steel sheet after alkaline degreasing; and a film that is excellent in terms of adhesion and scratch resistance can be formed on the surface of the galvanized steel sheet.

The type of the epoxy group-containing compound (c) is not particularly limited and examples thereof include epoxy group-containing silane coupling agents such as γ-glycidoxypropyltrimethoxysilane, γ-glycidoxypropylmethyldiethoxysilane, and γ-glycidoxypropyltriethoxysilane; epoxy group-containing ester compounds such as diglycidyl adipate, diglycidyl phthalate, and diglycidyl terephthalate; and epoxy-containing ether compounds such as sorbitol polyglycidyl ether, sorbitan polyglycidyl ether, polyglycerol polyglycidyl ether, pentaerythritol polyglycidyl ether, diglycerol polyglycidyl ether, glycerol polyglycidyl ether, trimethylpropane polyglycidyl ether, neopentylglycol diglycidyl ether, ethylene glycol diglycidyl ether, polyethylene glycol diglycidyl ether, propylene glycol diglycidyl ether, and polypropylene glycol diglycidyl ether. One or more of these compounds may be used. In particular, an epoxy group-containing silane coupling agent is preferred to ensure the corrosion resistance of a galvanized steel sheet with a small film weight.

The epoxy group-containing compound (c) is contained such that the ratio ($b/c_s$) of the mass of the tetraalkoxysilane (b) to the mass of a solid ($c_s$) of the epoxy group-containing compound (c) is 0.1 to 1.6 and preferably 0.2 to 1.2. If the mass ratio is less than 0.1, a galvanized steel sheet having high corrosion resistance is not provided. If the mass ratio is more than 1.6, the adhesion of the film is degraded.

The chelating agent (d) is effectively used to ensure the storage stability of the surface treatment solution (A). The reason for this is unclear. The chelating agent (d) probably has an effect of suppressing the polymerization of the tetraalkoxysilane (b) in the surface treatment solution. It is believed that, even when the surface treatment solution (A) is stored over a long period of time after the preparation thereof, the surface treatment solution (A) does not alter and the quality thereof at the time of preparation is maintained as a result of the above-described effect. The chelating agent (d) is also necessary to stably dissolve a vanadate compound (e) and a metal compound (f) described below in the surface treatment solution (A). The chelating agent (d) is less likely to etch the surface of a galvanized layer than inorganic acids such as nitric acid, phosphoric acid, sulfuric acid, and hydrofluoric acid and does not form a non-conductive film of zinc phosphate or the like. Therefore, a galvanized steel sheet having a first layer film formed with a surface treatment solution containing the chelating agent (d) is believed to provide higher continuity.

The type of the chelating agent (d) is not particularly limited and examples thereof include hydroxy carboxylic acids such as tartaric acid and malic acid; monocarboxylic acids; polycarboxylic acids such as dicarboxylic acids and tricarboxylic acids, e.g., oxalic acid, malonic acid, succinic acid, citric acid, and adipic acid; aminocarboxylic acids such as glycin; and phosphonic acids and phosphonates. One or more of these chelating agents may be used. In particular, in view of the storage stability of the surface treatment solution (A) and the corrosion resistance and continuity o of the galvanized steel sheet, a compound having two or more carboxyl groups or two or more phosphonic acid groups in a molecule is preferred.

The chelating agent (d) is contained such that the ratio ($b/d_s$) of the mass of the tetraalkoxysilane (b) to the mass of a solid ($d_s$) of the chelating agent (d) is 0.3 to 2.0 and preferably 0.5 to 1.8. If the mass ratio is less than 0.3 or more than 2.0, a galvanized steel sheet having high corrosion resistance is not provided.

The vanadate compound (e) is uniformly dispersed in a film (first layer film) formed on a surface of a galvanized steel sheet in the form of being readily soluble in water, and produces a so-called inhibitor effect at the time of corrosion of zinc. Examples of the vanadate compound (e) include ammonium metavanadate and sodium metavanadate. One or more of these compounds may be used.

The vanadate compound (e) is contained such that the ratio ($e_v/d_s$) of the mass ($e_v$) of the vanadate compound (e) in terms of V to the mass of a solid ($d_s$) of the chelating agent (d) is 0.03 to 1.0 and preferably 0.05 to 0.71. If the mass ratio is less than 0.03, a galvanized steel sheet having high corrosion resistance is not provided. If the mass ratio is more than 1.0, the vanadate compound (e) is not easily dissolved in the surface treatment solution (A).

Since the metal compound (f) contains a metal component such as Ti, Al, or Zn, it is effectively used to provide high corrosion resistance to a galvanized steel sheet (in particular, a processed portion).

The type of the metal compound (f) is not particularly limited as long as the metal compound (f) contains at least one metal selected from the group consisting of Ti, Al, and Zn.

Examples of a Ti-containing metal compound include titanyl sulfate, titanyl nitrate, titanium nitrate, titanyl chloride, titanium chloride, titania sol, titanium oxide, potassium titanium oxalate, fluorotitanic acid, ammonium fluorotitanate, titanium lactate, titanium tetraisopropoxide, titanium acetylacetonate, and diisopropyl titanium bis(acetylacetone). The examples further include metatitanic acid obtained through thermal hydrolysis of an aqueous titanyl sulfate solution, orthotitanic acid obtained through neutralization of an aqueous titanyl sulfate solution with an alkali, and salts of the foregoing.

Examples of an Al-containing metal compound include aluminum oxide, aluminum hydroxide, aluminum sulfate, aluminum nitrate, aluminum phosphate, and aluminum chloride.

Examples of a Zn-containing metal compound include zinc carbonate, zinc oxide, zinc hydroxide, zinc sulfate, zinc nitrate, zinc chloride, and zinc phosphate. Furthermore, since zinc is an amphoteric metal, the examples further include sodium zincate and potassium zincate, which are generated in an alkaline state. One or more of these compounds may be used in combination.

The metal compound (f) is contained such that the ratio ($f_M/d_S$) of the total metal mass ($f_M$) of the metal compound (f) to the mass of a solid ($d_s$) of the chelating agent (d) is 0.05 to 0.8 and preferably 0.17 to 0.34. If the mass ratio is less than 0.05, a galvanized steel sheet having high corrosion resistance is not provided. If the mass ratio is more than 0.8, the metal compound (f) is not easily dissolved in the surface treatment solution (A).

The surface treatment solution (A) needs to have a pH of 8 to 10 and preferably has a pH of 8.2 to 9.5. When the surface treatment solution (A) has a pH of less than 8, the storage stability of the surface treatment solution (A), the corrosion resistance of a galvanized steel sheet, and the adhesion of a film (first layer film) formed on a surface of the steel sheet are degraded. When the surface treatment solution (A) has a pH of more than 10 or is acidic, zinc is considerably etched and the corrosion resistance and continuity of the galvanized steel sheet are degraded. In the present invention, preferred examples of an alkali used for the pH adjustment include ammonium, an amine, an amine derivative, and an aminopolycarboxylic acid. An acid for the pH adjustment is preferably selected from the above-described chelating agents (d).

The surface treatment solution (A) may further contain a nonionic acrylic resin emulsion (g) for the purpose of improving the corrosion resistance of the first layer film. The type of the nonionic acrylic resin emulsion (g) is not particularly limited. An acrylic resin emulsified with a nonionic emulsifying agent may be used. An example of the acrylic resin is an aqueous emulsion obtained by emulsion polymerization of a vinyl monomer such as acrylic acid, methacrylic acid, acrylic acid ester, methacrylic acid ester, or styrene in water in the presence of a nonionic surfactant (emulsifying agent) having a polyethylene oxide or polypropylene oxide in the structure.

The content of the nonionic acrylic resin emulsion (g) in the surface treatment solution (A) is preferably 0.5 to 45.0% by mass on a solid content basis and more preferably 1.0 to 40.0% by mass. The upper limit of the content is further preferably 4.5% or less by mass. When the content is 0.5% or more by mass, an effect of improving wettability of the surface treatment solution (A) is provided. When the content is 45.0% or less by mass, the continuity of a galvanized steel sheet is not degraded.

The surface treatment solution (A) may optionally contain a surfactant or a thickener called a wettability-increasing agent for uniformly forming a film on a surface to which the surface treatment solution (A) is applied, a conductive material for improving the electrical conductivity, a color pigment for improving the design, and a solvent for improving the film formation property.

The surface treatment solution (A) is provided by mixing the above-described components in water such as deionized water or distilled water. The solid content of the surface treatment solution (A) may be appropriately determined. The surface treatment solution (A) may optionally contain a water-soluble solvent such as an alcohol, a ketone, or cellosolve, a surfactant, a defoaming agent, a leveling agent, an antimicrobial/antifungal agent, a colorant, or the like. Addition of such agents improves the drying property, coating appearance, workability, storage stability, and design of a surface treatment agent. However, it is important that the agents are added in amounts that do not degrade qualities provided by the present invention. The maximum amount of the agents added is less than 5% by mass relative to the total solid content of the surface treatment solution (A).

<Formation of First Layer Film>

As described above, in the present invention, a first layer film, which is a composite oxide film (inorganic film), is formed by applying the surface treatment solution (A) onto a surface of a galvanized layer of a galvanized steel sheet and drying the surface treatment solution (A) by heating.

A method for applying the surface treatment solution (A) onto a galvanized steel sheet is optimally selected in accordance with, for example, the shape of a galvanized steel sheet to be treated and may be roll coating, bar coating, dipping, spray coating, or the like. Specifically, a galvanized steel sheet having a sheet-like shape is treated by roll coating or bar coating. Alternatively, such a galvanized steel sheet is treated by spraying the surface treatment solution (A) and adjusting the adhesion amount by roll squeezing or blowing of gas at a high pressure. A galvanized steel sheet having a shape of a formed product is treated by dipping the galvanized steel sheet in the surface treatment solution (A), withdrawing the galvanized steel sheet, and optionally adjusting the adhesion amount by blowing off an excessive surface treatment solution (A) with compressed air.

Before the surface treatment solution (A) is applied onto a galvanized steel sheet, the galvanized steel sheet may be optionally subjected to a pretreatment performed to remove oil or stains on a surface of the galvanized steel sheet. Galvanized steel sheets are often coated with rust-inhibiting oil for preventing rust. Even when galvanized steel sheets are not coated with rust-inhibiting oil, oil, stains, or the like adhere to the steel sheets during processes. Such coated oil, oil, or stains reduce the wettability of a surface of a galvanized layer, which causes difficulty in uniform formation of a first layer film. However, by performing the above-described pretreatment, the surface of the galvanized layer is cleaned and thus becomes uniformly wettable. When oil or stains are not present on a surface of a galvanized steel sheet and the surface treatment solution (A) is uniformly wet, the pretreatment step is not necessarily performed. The method for performing the pretreatment is not particularly limited and may be, for example, washing with hot water, washing with a solvent, or alkaline degreasing.

The heating temperature (maximum sheet temperature) at the time of drying the surface treatment solution (A) applied onto a surface of the galvanized layer is normally 60 to 200° C. and preferably 80 to 180° C. When the heating temperature is 60° C. or higher, water serving as the main solvent does not remain in the first layer film. When the heating temperature is 200° C. or lower, the occurrence of cracking in the first layer film is suppressed. Therefore, problems such as degradation of corrosion resistance of a galvanized steel sheet do not occur.

The heating time is optimally selected in accordance with the types of galvanized steel sheets used. The heating time is preferably 0.1 to 60 seconds and more preferably 1 to 30 seconds in view of productivity and the like.

The first layer film is preferably formed so that the thickness after drying by heating is 0.01 to 1.0 μm. When the thickness is 0.01 μm or more, there is no concern about low corrosion resistance. When the thickness is 1.0 μm or less, the continuity of the galvanized steel sheet does not decrease. The thickness is preferably 0.05 to 0.5 μm.

The first layer film obtained as described above is excellent in terms of heat resistance, weldability, and adhesion. In the present invention, by forming the first layer film on a surface of a galvanized layer of a galvanized steel sheet, a galvanized steel sheet having desired continuity is provided without degrading the corrosion resistance. The reason for this is unclear, but such a galvanized steel sheet is believed to be provided by the following effects.

In the present invention, the skeleton of the first layer film formed on a surface of a galvanized layer of a galvanized steel sheet is constituted by a water-soluble zirconium compound (a), a tetraalkoxysilane (b), and an epoxy group-containing compound (c) among the components of the surface treatment solution (A). A dried film containing the water-soluble zirconium compound (a) does not dissolve back into water and provides a barrier effect. Thus, a galvanized steel sheet is provided that is excellent in terms of various properties such as corrosion resistance of the galvanized steel sheet, adhesion of the film, and corrosion resistance of the galvanized steel sheet after alkaline degreasing, and that is excellent in terms of heat resistance and weldability, which are characteristics of inorganic films.

It is also believed that the presence of the tetraalkoxysilane (b) results in three-dimensional crosslinking between silanol groups generated from alkoxy groups of the tetraalkoxysilane (b) and the water-soluble zirconium compound (a) and thus a dense film is formed. In addition, when the epoxy group-containing compound (c) is contained, a crosslinking reaction of epoxy groups of the epoxy group-containing compound (c) with the silanol groups and the water-soluble zirconium compound (a) probably occurs. As a result, the bonding strength of the film is believed to be further increased.

The vanadate compound (e) and the metal compound (f) among the components of the surface treatment solution (A) are uniformly dispersed in the film in the form of being readily soluble in water and exhibit a so-called inhibitor effect at the time of corrosion of zinc. Specifically, part of the vanadate compound (e) and the metal compound (f) is believed to be ionized in a corrosive environment and passivated to suppress corrosion of zinc. In particular, it is believed that, even if defects are caused on a film in a processed portion when a galvanized steel sheet is molded into a desired shape, the metal compound (f) is released mainly to the defect portions of the film and thus the corrosion of zinc is suppressed.

The chelating agent (d) among the components of the surface treatment solution (A) is believed to provide an effect of suppressing the polymerization of the tetraalkoxysilane (b) in the surface treatment solution (A) and an effect of stably dissolving the vanadate compound (e) and the metal compound (f) in the surface treatment solution (A). When the first layer film is formed through drying by heating, the chelating agent (d) does not form an insulating film (non-conductive film) such as a zinc phosphate film and the carboxyl groups or phosphonic acid groups in the chelating agent (d) serve as a crosslinking agent for forming the dense skeleton of the film together with the above-described skeleton components of the first layer film. Accordingly, the chelating agent (d) is believed to improve the continuity.

In summary, the first layer film according to the present invention can maintain high continuity even when the first layer film is in contact with a gasket or the like under a low pressure probably because a film formed of a water-soluble zirconium compound, a tetraalkoxysilane, and an epoxy group-containing compound has high corrosion resistance in spite of its small thickness, and a chelating agent, a vanadate compound, and a metal compound serving as corrosion inhibitors are contained in the film.

<Second layer film>

The first layer film provides high corrosion resistance to a galvanized steel sheet. However, since the first layer film is a composite oxide film (inorganic film) and thus is inferior to an organic resin film in view of providing corrosion resistance to the galvanized steel sheet, it may be difficult to satisfy required corrosion resistance in some applications. In the present invention, a second layer film is formed by applying a surface treatment solution (B) onto a surface of the first layer film and drying the surface treatment solution (B) by heating. The second layer film formed of the surface treatment solution (B) is an organic resin layer. In the present invention, the second layer film protects the first layer film and reinforces the corrosion resistance (e.g., chemical resistance, die galling resistance, fingerprint resistance, design) of a galvanized steel sheet.

The second layer film is formed so as to have a thickness that does not degrade the continuity of a galvanized steel sheet. Thus, the present invention provides a practical galvanized steel sheet that has a good balance between continuity and corrosion resistance and that is used as a material for shield boxes or the like.

<Surface Treatment Solution (B)>

The surface treatment solution (B) mainly composed of an organic resin (h). Various organic resins can be used as the organic resin (h). Examples of the organic resin (h) include epoxy resin, modified epoxy resin, urethane resin, alkyd resin, acrylic resin, ethylene resin (polyolefin resin), polyester resin, polybutadiene resin, amino resin, phenolic resin, fluorocarbon resin, and silicon resin. The type of the organic resin (h) is not limited. The content of the organic resin (h) in the surface treatment solution (B) is about 50 to 90% by mass on a solid content basis. Within the range, the role of the second layer film can be achieved.

As described above, to provide corrosion resistance to a galvanized steel sheet, an organic resin film is more effective than a composite oxide film (inorganic film). Therefore, in the present invention, regardless of the type of the organic resin (h) contained in the surface treatment solution (B), the second layer film is formed to protect the first layer film and reinforce the corrosion resistance of a galvanized steel sheet.

Herein, when an organic resin (F) having an OH group and/or a COOH group or a hydrazine-modified organic resin (X) described below is used as the organic resin (h) to be contained in the surface treatment solution (B), the film can be further improved.

<Organic Resin (F) Having OH Group and/or COOH Group>

In the present invention, when the surface treatment solution (B) containing the organic resin (F) having an OH group and/or a COOH group is used, a galvanized steel sheet can be provided that has good adhesion between the first layer film and the second layer film and higher corrosion resistance.

Examples of the organic resin (F) having an OH group and/or a COOH group include (F1) epoxy resin, (F2) modified epoxy resin, (F3) polyhydroxy polyether resin, (F4) urethane resin, (F5) alkyd resin, (F6) acrylic resin, (F7) ethylene copolymer, (F8) acrylic silicon resin, and (F9) fluorocarbon resin copolymer, which are described below.

(F1) Epoxy Resin

Examples of the epoxy resin include an epoxy resin in which, for example, bisphenol A, bisphenol F, or novolac is formed into a glycidyl ether; an epoxy resin in which bisphenol A is subjected to addition of propylene oxide, ethylene oxide, or polyalkylene glycol and is formed into a glycidyl ether; aliphatic epoxy resins, alicyclic epoxy resins; and polyether-based epoxy resins. In the case where the surface treatment solution (B) containing the epoxy resin is dried by heating to form the second layer film, in particular, when the film needs to be formed in a low-temperatures range, an epoxy resin having a number-average molecular weight of 1500 or more is preferred. These epoxy resins described above may be used alone or in combination as a mixture of different types.

(F2) Modified Epoxy Resin

Examples of the modified epoxy resin include resins prepared by allowing epoxy groups or hydroxyl groups in the epoxy resins described above to react with various modifiers. Specific examples thereof include epoxy ester resins prepared by allowing the epoxy groups or hydroxyl groups described above to react with carboxy groups in drying oil fatty acids; epoxy acrylate resins prepared by allowing the epoxy groups or hydroxyl groups described above to react with acrylic acid or methacrylic acid; urethane-modified epoxy resins prepared by allowing the epoxy groups or hydroxyl groups described above to react with isocyanate compounds; and amine-added urethane-modified epoxy resins prepared by addition of alkanolamines to urethane-modified epoxy resins resulting from the reaction of epoxy resins with isocyanate compounds.

(F3) Polyhydroxy Polyether Resin

The polyhydroxy polyether resin is a polymer prepared by polycondensation of a mononuclear or binuclear dihydric phenol, or a mixture of mononuclear and binuclear dihydric phenols with a substantially equimolar amount of epihalohydrin in the presence of an alkaline catalyst. Typical examples of the mononuclear dihydric phenol include resorcin, hydroquinone, and catechol. A typical example of the binuclear phenol is bisphenol A. These may be used alone or in combination.

(F4) Urethane Resin

Examples of the urethane resin include oil-modified polyurethane resins, alkyd polyurethane resins, polyester polyurethane resins, polyether urethane resins, and polycarbonate polyurethane resins.

(F5) Alkyd Resin

Examples of the alkyd resin include oil-modified alkyd resins, rosin-modified alkyd resins, phenol-modified alkyd resins, styrene-alkyd resins, silicon-modified alkyd resins, acrylic-modified alkyd resins, oil-free alkyd resins, and high-molecular-weight oil-free alkyd resins.

(F6) Acrylic Resin

Examples of the acrylic resin include polyacrylic acid and the copolymers thereof, polyacrylate and the copolymers thereof, polymethacrylic acid and the copolymers thereof, polymethacrylate and the copolymers thereof, urethane-acrylic acid copolymers (or urethane-modified acrylic resins), and styrene-acrylic acid copolymers. Furthermore, resins prepared by modifying these resins with alkyd resins, epoxy resins, phenolic resins, or the like may be used.

(F7) Ethylene Copolymer

Examples of the ethylene copolymer include ethylene copolymers such as ethylene-acrylic acid copolymers, ethylene-methacrylic acid copolymers, and carboxy-modified polyolefin resins; ethylene-unsaturated carboxylic acid copolymers; and ethylene ionomers. Furthermore, resins prepared by modifying these resins with alkyd resins, epoxy resins, phenolic resins, or the like may be used.

(F8) Acrylic Silicon Resin

An example of the acrylic silicon resin is a resin that contains an acrylic copolymer, serving as a main component, having a hydrolyzable alkoxysilyl group in its side chain or at its terminal, and a curing agent. When such an acrylic silicon resin is used, excellent weatherability can be expected.

(F9) Fluorocarbon Resin Copolymer

An example of the fluorocarbon resin copolymer is a fluoroolefin copolymer. An example of the fluoroolefin copolymer is a copolymer prepared by copolymerization of a fluorocarbon monomer (fluoroolefin) with, for example, alkyl vinyl ether, cycloalkyl vinyl ether, carboxylic acid-modified vinyl ester, hydroxyalkyl allyl ether, or tetrafluoropropyl vinyl ether, which serves as a monomer. When such a fluorocarbon resin copolymer is used, excellent weatherability and hydrophobicity can be expected.

The organic resin (F) of the present invention is preferably a thermosetting resin. Among the thermosetting resins, a thermosetting epoxy resin and a thermosetting modified epoxy resin having excellent barrier properties against corrosive factors such as oxygen are optimal. When the second layer film is formed with the surface treatment solution (B) containing the organic resin (F), a galvanized steel sheet having desired corrosion resistance can be provided even if the thickness is small. Therefore, this is particularly advantageous when importance is attached to the continuity and spot weldability of a galvanized steel sheet and the coating weight of the film is suppressed to a low level.

From the viewpoint of corrosion resistance, workability, and coating property, among the organic resins (F) described above, (F1) an epoxy resin, (F2) a modified epoxy resin, and (F7) an ethylene copolymer are preferred. In particular, a thermosetting epoxy resin and a thermosetting modified epoxy resin having excellent barrier properties against corrosive factors such as oxygen are particularly preferred. Examples of these thermosetting resins include thermosetting epoxy resins, thermosetting modified epoxy resins, acrylic copolymer resins copolymerized with epoxy group-containing monomers, epoxy group-containing polybutadiene resins, epoxy group-containing polyurethane resins, and adducts and condensates of these resins. These epoxy group-containing resins may be used alone or in combination.

In addition to (F1) to (F9), the organic resin (h) of the present invention may be a polybutadiene resin, a phenolic resin, a polyamine resin, or a polyphenylene resin. The above-described resins may be used as a mixture of two or more or an addition polymer of the resins may be used.

A core-shell water-dispersible resin in which the core and the shell of each particle of a resin are composed of different resin components or resin components having different glass transition temperatures may be used to reduce the heat-drying temperature of the resin.

By using a water-dispersible resin having a self-crosslinking property and, for example, providing alkoxysilane groups to resin particles, it is possible to utilize interparticle crosslinking by means of the formation of silanol groups through hydrolysis of alkoxysilane and a dehydration condensation reaction of the silanol groups between resin particles during the drying of the resin by heating.

Furthermore, organic composite silicate in which an organic resin is combined with silica using a silane coupling agent is preferred as the organic resin (h) of the present invention.

As described above, a thermosetting resin is particularly suitably used as the organic resin (F) to improve the corrosion resistance and workability of the second layer film. In this case, the organic resin (F) may contain an amino resin such as a urea resin (e.g., butylated urea resin), a melamine resin (butylated melamine resin), a butylated urea-melamine resin, or a benzoguanamine resin; or a curing agent such as a blocked isocyanate, an oxazoline compound, or a phenolic resin.

When the second layer film is formed with the surface treatment solution (B) containing the above-described organic resin (F), the adhesion between the first layer film and the second layer film is improved. As a result, a galvanized steel sheet having higher corrosion resistance is provided. The reason why such an effect is produced is unclear. However, it is believed that the organic resin (F) having an OH group and/or a COOH group (preferably a thermosetting resin and more preferably an epoxy resin and/or a modified epoxy resin) forms a dense barrier film through reaction with a curing agent (crosslinking agent) and the barrier film exhibits an excellent ability to inhibit permeation of corrosive factors such as oxygen. It is also believed that the barrier film contributes significantly to improvement in adhesion between the first layer film and the second layer film because an OH group or a COOH group in its molecule is tightly bonded to an alkoxysilane and an epoxy group-containing compound, which are components of the first layer film.

<Hydrazine-modified organic resin (X)>

In the present invention, by using a surface treatment solution (B) containing a hydrazine-modified organic resin (X) produced through reaction with an active hydrogen-containing compound (D) that is partly or entirely composed of a hydrazine derivative (E) containing active hydrogen, a galvanized steel sheet can be provided that has significantly high corrosion resistance while a degradation of continuity is minimized.

The hydrazine-modified organic resin (X) is produced through reaction of a predetermined organic resin (C) with the active hydrogen-containing compound (D) that is partly or entirely composed of the hydrazine derivative (E) containing active hydrogen. The type of the organic resin (C) is not particularly limited as long as the organic resin (C) reacts with the active hydrogen-containing compound (D) composed of the hydrazine derivative (E) and a bond between the organic resin (C) and the active hydrogen-containing compound (D) is established by an addition or condensation reaction and as long as the organic resin (C) appropriately forms a film. Examples of the organic resin (C) include epoxy resins, modified epoxy resins, polyurethane resins, polyester resins, alkyd resins, acrylic copolymer resins, polybutadiene resins, phenolic resins, and adducts and condensates of these resins. These resins may be used alone or in combination.

The organic resin (C) is particularly preferably an epoxy group-containing resin (C1) that contains an epoxy group in a resin in terms of reactivity, ease of reaction, and corrosion resistance. Examples of the epoxy group-containing resin (C1) include an epoxy resin (C1-1), a modified epoxy resin (C1-2), an acrylic copolymer resin (C1-3) prepared by, for example, copolymerization with an epoxy group-containing monomer, an epoxy group-containing polybutadiene resin, an epoxy group-containing polyurethane resin, and an adduct and a condensate of these resins. These epoxy group-containing resins may be used alone or in combination.

Among the epoxy group-containing resins (C1), the epoxy resin (C1-1) and the modified epoxy resin (C1-2) are particularly preferred in terms of adhesion to a surface of the first layer film (composite oxide film) and corrosion resistance. Among them, a thermosetting epoxy resin and a thermosetting modified epoxy resin, which have excellent barrier properties against corrosive factors such as oxygen, are optimal. When the second layer film is formed with the surface treatment solution (B) containing the hydrazine-modified organic resin (X) produced through reaction of the epoxy group-containing resin (C1) with the active hydrogen-containing compound (D) that is partly or entirely composed of the hydrazine derivative (E) containing active hydrogen, a galvanized steel sheet having significantly high corrosion resistance can be provided even with a small thickness of the film. This is particularly advantageous when importance is attached to the continuity and spot weldability of a galvanized steel sheet and the coating weight of the film is suppressed to a low level.

Examples of the epoxy resin (C1-1) include aromatic epoxy resins prepared by causing reaction of a polyphenol, such as bisphenol A, bisphenol F, or novolac phenol, with an epihalohydrin, such as epichlorohydrin, to introduce glycidyl groups, or further causing reaction of the resulting glycidyl group-containing product with a polyphenol to increase the molecular weight; aliphatic epoxy resins; and alicyclic epoxy resins. These resins may be used alone or in combination. In the case where the surface treatment solution (B) containing the hydrazine-modified organic resin (X) produced by reaction of the epoxy resin (C1-1) and the active hydrogen-containing compound (D) that is partly or entirely composed of the hydrazine derivative containing active hydrogen is dried by heating to form the second layer film, in particular, when the film needs to be formed in a low-temperature range, an epoxy resin (C1-1) having a number-average molecular weight of 1500 or more is preferred.

A resin having a chemical structure represented by formula (I) below, which is a reaction product of bisphenol A and epihalohydrin, is particularly preferred as the epoxy resin (C1-1) described above. The epoxy resin is preferred because of its high corrosion resistance.

[Chem. 1]

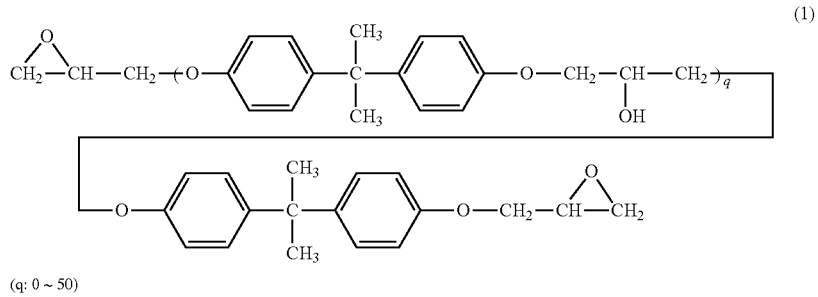

(q: 0 ~ 50)

A method for producing such a bisphenol A-type epoxy resin is widely known in the art. In the chemical structure above, q represents 0 to 50, preferably 1 to 40, and more preferably 2 to 20.

An example of the modified epoxy resin (C1-2) is a resin prepared by allowing epoxy groups or hydroxyl groups in the epoxy resin (C1-1) above to react with various modifiers. Examples of the resin include epoxy ester resins prepared by reaction with drying oil fatty acids; epoxy acrylate resins prepared by modification with polymerizable unsaturated monomer components containing, for example, acrylic acid or methacrylic acid; and urethane-modified epoxy resins prepared by reaction with isocyanate compounds.

An example of the acrylic copolymer resin (C1-3) prepared by copolymerization with the epoxy group-containing monomer is a resin prepared by, for example, solution polymerization, emulsion polymerization, or suspension polymerization of an epoxy group-containing unsaturated monomer and a polymerizable unsaturated monomer component essentially containing acrylate or methacrylate.

Examples of the polymerizable unsaturated monomer component include C1 to C24 alkyl esters of acrylic acid or methacrylic acid, such as methyl(meth)acrylate, ethyl (meth) acrylate, propyl(meth)acrylate, n-, iso-, and tert-butyl (meth) acrylate, hexyl(meth)acrylate, 2-ethylhexyl (meth)acrylate, decyl(meth)acrylate, and lauryl (meth)acrylate; C1 to C4 alkyl ether compounds of acrylic acid, methacrylic acid, styrene, vinyltoluene, acrylamide, acrylonitrile, N-methylol (meth)acrylamide, and N-methylol(meth)acrylamide; and N,N-diethylaminoethyl methacrylate.

Any monomer having an epoxy group and a polymerizable unsaturated group, such as glycidyl methacrylate, glycidyl acrylate, or 3,4-epoxycyclohexylmethyl(meth)acrylate, may be used as the epoxy group-containing unsaturated monomer without particular limitation.

Furthermore, the acrylic copolymer resin (C1-3) prepared by copolymerization with the epoxy group-containing monomer may be a resin modified with a polyester resin, an epoxy resin, a phenolic resin, or the like.

The organic resin (C) may be soluble in an organic solvent, dispersible in an organic solvent, soluble in water, or dispersible in water.

The hydrazine-modified organic resin (X) of the present invention aims to incorporate the hydrazine derivative (E) into the molecule of the organic resin (C) described above. Therefore, at least part (preferably the whole) of the active hydrogen-containing compound (D) needs to be the hydrazine derivative (E) containing active hydrogen.

In the case where the organic resin (C) is the epoxy group-containing resin (C1), the following compounds may be exemplified as the active hydrogen-containing compound (D) that reacts with the epoxy group. One or more of these compounds may be used. Also in this case, at least part (preferably the whole) of the active hydrogen-containing compound (D) needs to be the hydrazine derivative (E) containing active hydrogen.

a hydrazine derivative (D1/E) containing active hydrogen
a primary or secondary amine compound (D2) containing active hydrogen
ammonia and organic acid (D3) such as carboxylic acid
hydrogen halide (D4) such as hydrogen chloride
alcohol and thiol (D5)
an active hydrogen-free hydrazine derivative, or a quaternary chlorinating agent (D6) that is a mixture of a tertiary amine and an acid Examples of the hydrazine derivative (E) containing active hydrogen include:
(1) hydrazide compounds such as carbohydrazide, propionic acid hydrazide, salicylic acid hydrazide, adipic acid dihydrazide, sebacic acid dihydrazide, dodecanedioic acid dihydrazide, isophthalic acid dihydrazide, thiocarbohydrazide, 4,4'-oxybisbenzenesulfonylhydrazide, benzophenonehydrazone, and N-aminopolyacrylamide;
(2) pyrazole compounds such as pyrazole, 3,5-dimethylpyrazole, 3-methyl-5-pyrazolone, and 3-amino-5-methylpyrazole;
(3) triazole compounds such as 1,2,4-triazole, 3-amino-1,2,4-triazole, 4-amino-1,2,4-triazole, 3-mercapto-1,2,4-triazole, 3-amino-5-mercapto-1,2,4-triazole, 2,3-dihydro-3-oxo-1,2,4-triazole, 1H-benzotriazole, 1-hydroxybenzotriazole (monohydrate), 6-methyl-8-hydroxytriazolopyridazine, 6-phenyl-8-hydroxytriazolopyridazine, and 5-hydroxy-7-methyl-1,3,8-triazaindolizine;
(4) tetrazole compounds such as 5-phenyl-1,2,3,4-tetrazole and 5-mercapto-1-phenyl-1,2,3,4-tetrazole;
(5) thiadiazole compounds such as 2-amino-5-mercapto-1,3,4-thiadiazole and 2,5-dimercapto-1,3,4-thiadiazole; and
(6) pyridazine compounds such as maleic acid hydrazide, 6-methyl-3-pyridazone, 4,5-dichloro-3-pyridazone, 4,5-dibromo-3-pyridazone, and 6-methyl-4,5-dihydro-3-pyridazone.

Among these compounds, pyrazole compounds and triazole compounds each having a five- or six-membered ring structure and containing a nitrogen atom in its ring structure are particularly preferred.

These hydrazine derivatives (E) may be used alone or in combination.

Typical examples of the active hydrogen-containing amine compound (D2) that may be used as part of the active hydrogen-containing compound (D) include:
(1) compounds of aldimine, ketimine, oxazoline, or imidazoline prepared by reaction of a primary amino group of an amine compound containing one secondary amino group and one or more primary amino groups, such as diethylenetriamine, hydroxyethylaminoethylamine, ethylaminoethylamine, or methylaminopropylamine, with ketone, aldehyde, or carboxylic acid by heating at a temperature of about 100 to 230° C.;
(2) secondary monoamines such as diethylamine, diethanolamine, di-n- or di-iso-propanolamine, N-methylethanolamine, and N-ethylethanolamine;
(3) secondary amine-containing compounds prepared by Michael addition reaction of monoalkanolamine such as monoethanolamine with dialkyl(meth)acrylamide; and
(4) compounds prepared by modifying a primary amino group of alkanolamine such as monoethanolamine, neopentanolamine, 2-aminopropanol, 3-aminopropanol, or 2-hydroxy-2'(aminopropoxy)ethyl ether into ketimine.

Examples of the organic acid (D3) that may be used as part of the active hydrogen-containing compound (D) include formic acid, acetic acid, propionic acid, butyric acid, caproic acid, lauric acid, palmitic acid, stearic acid, oleic acid, linolenic acid, oxalic acid, malonic acid, succinic acid, glutaric acid, benzoic acid, phthalic acid, gallic acid, terephthalic acid, isophthalic acid, salicylic acid, lactic acid, citric acid, maleic acid, and adipic acid.

Examples of the hydrogen halide (D4) that may be used as part of the active hydrogen-containing compound (D) include hydrogen fluoride, hydrogen bromide, and hydrogen iodide.

Examples of the alcohol and thiol (D5) that may be used as part of the active hydrogen-containing compound (D) include methanol, ethanol, propanol, propan-2-ol, butanol, phenylmethanol, propane-1,2-diol, ethanethiol, butane-2,3-dithiol, and 3-mercapto-2-butanol.

The quaternary chlorinating agent (D6) that may be used as part of the active hydrogen-containing compound (D) is a mixture of an acid and an active hydrogen-free hydrazine derivative or a tertiary amine, the mixture being prepared in order to allow the active hydrogen-free hydrazine derivative or the tertiary amine, which does not have reactivity with an epoxy group, to react with an epoxy group. The quaternary chlorinating agent reacts with an epoxy group in the presence of water to form an epoxy group-containing resin and a quaternary salt, as needed. As the acid used to prepare the quaternary chlorinating agent, an organic acid such as acetic acid or lactic acid or an inorganic acid such as hydrochloric acid may be used.

An example of the active hydrogen-free hydrazine derivative used to prepare the quaternary chlorinating agent is 3,6-dichloropyridazine. Examples of the tertiary amine include dimethylethanolamine, triethylamine, trimethylamine, triisopropylamine, and methyldiethanolamine.

The hydrazine-modified organic resin (X) produced by reaction of the organic resin (C) with the active hydrogen-containing compound (D) that is partly or entirely composed of the hydrazine derivative (E) containing active hydrogen is prepared by causing reaction of the organic resin (C) with the active hydrogen-containing compound (D) at 10 to 300° C. and preferably 50 to 150° C. for about 1 to 8 hours. The reaction may be performed with an organic solvent. The type of organic solvent used is not particularly limited. Examples of the organic solvent include ketones such as acetone, methyl ethyl ketone, methyl isobutyl ketone, dibutyl ketone, and cyclohexanone; alcohols and ethers having hydroxyl groups, such as ethanol, butanol, 2-ethylhexyl alcohol, benzyl alcohol, ethylene glycol, ethylene glycol monoisopropyl ether, ethylene glycol monobutyl ether, ethylene glycol monohexyl ether, propylene glycol, propylene glycol monomethyl ether, diethylene glycol, diethylene glycol monoethyl ether, and diethylene glycol monobutyl ether; esters such as ethyl acetate, butyl acetate, and ethylene glycol monobutyl ether acetate; and aromatic hydrocarbons such as toluene and xylene. One or more of these compounds may be used. Among these compounds, a ketone or ether solvent is particularly preferred in view of solubility in an epoxy resin and ease of film formation.

The ratio of the active hydrogen-containing compound (D) that is partly or entirely composed of the hydrazine derivative (E) containing active hydrogen is 0.5 to 20 parts by mass and particularly preferably 1.0 to 10 parts by mass relative to 100 parts by mass of the organic resin (C) on a solid content basis. In the case where the organic resin (C) is the epoxy group-containing resin (C1), the epoxy group-containing resin (C1) and the active hydrogen-containing compound (D) are mixed with each other such that the ratio [number of active hydrogen groups/number of epoxy groups] of the number of active hydrogen groups of the active hydrogen-containing compound (D) to the number of epoxy groups of the epoxy group-containing resin (C1) is appropriately 0.01 to 10, more preferably 0.1 to 8, and further preferably 0.2 to 4 in view of corrosion resistance.

The ratio of the hydrazine derivative (E) containing active hydrogen in the active hydrogen-containing compound (D) is preferably 10 to 100% by mole, more preferably 30 to 100% by mole, and further preferably 40 to 100% by mole. If the ratio of the hydrazine derivative (E) containing active hydrogen is less than 10% by mole, a sufficient rust-inhibiting function cannot be provided to the second layer film (organic resin film). As a result, the produced rust-inhibiting effect is not so different from that in the case where a film-forming organic resin and a hydrazine derivative are simply mixed with each other and used.

The anticorrosion mechanism of the second layer film (organic resin film) described above is considered to be as follows.

That is, the hydrazine derivative (E) containing active hydrogen is added to the organic resin (C), whereby a hydrazine derivative is incorporated into molecules of the organic resin (C).

(1) A dense organic resin film (second layer film) is formed and produces an effect of blocking corrosive factors such as oxygen and chlorine ions.

(2) The hydrazine derivative (E) is tightly bonded to a surface of the first layer film in a stable manner and a passivation layer is formed.

(3) A free hydrazine derivative group (E) in the second layer film traps zinc ions eluted through a corrosion reaction and a stable insoluble chelate compound layer is formed, whereby the formation of an ion-conducting layer is suppressed at an interface between the first layer film and a galvanized layer, which inhibits the progress of corrosion. It is believed that the progress of corrosion is effectively suppressed by the foregoing advantageous effects, and thus high corrosion resistance is achieved.

In particular, when the epoxy group-containing resin (C1) is used as the organic resin (C), a dense barrier film is formed through reaction of the epoxy group-containing resin (C1) and a curing agent (crosslinking agent). The barrier film has an excellent ability to inhibit permeation of corrosive factors such as oxygen. Furthermore, since high bonding strength between the first layer film and the barrier film is achieved due to a hydroxyl group in the molecule of the barrier film, particularly high corrosion resistance (barrier property) is achieved. Moreover, in particular, when an active hydrogen-containing pyrazole compound and/or an active hydrogen-containing triazole compound is used as the hydrazine derivative (E) containing active hydrogen, higher corrosion resistance (barrier property) is achieved.

A method in which a composition obtained by mixing a film-forming organic resin with a hydrazine derivative is used has been known in the related art. Like this related art, the simple mixing of the film-forming organic resin with the hydrazine derivative provides little improvement in a corrosion-inhibiting effect. This is because, in the related art, the hydrazine derivative is not incorporated into the molecules of the film-forming organic resin. It is believed that, although a hydrazine derivative that is not incorporated into the molecules of the film-forming organic resin forms a chelate compound with a metal in the first layer film, the chelate compound does not function as a dense barrier layer because of its low molecular weight. In contrast, in the present invention, by incorporating the hydrazine derivative into the molecules of the film-forming organic resin, a remarkably high corrosion-inhibiting effect is produced. Thus, even if the thickness of the second layer film, which is an organic resin film, is decreased in order to ensure the continuity of a galvanized steel sheet, a second layer film that is formed by using the surface treatment solution (B) containing the hydrazine-modified organic resin (X) can provide desired corrosion resistance to the galvanized steel sheet.

In the present invention, the surface treatment solution (B) containing the organic resin (h) may further contain a rust-inhibiting additive (Y).

<Rust-inhibiting Additive (Y)>

When the second layer film is formed with the surface treatment solution (B) of the present invention, a galvanized steel sheet having significantly high corrosion resistance is provided as described above. To further suppress the occurrence of rust and improve the corrosion resistance of a galvanized steel sheet, it is effective to add a rust-inhibiting additive (Y). The content of the rust-inhibiting additive (Y) in the surface treatment solution (B) is preferably about 20 to 30% by mass on a solid content basis.

The type of the rust-inhibiting additive (Y) is not particularly limited. Any of rust-inhibiting additives such as known rust inhibitors sufficiently produces the foregoing effect. At least one of the following materials (i) and (j), which are self-repairing materials, is particularly preferably used:
(i) Ca ion-exchanged silica; and
(j) silicon oxide.

The Ca ion-exchanged silica of the component (i) is a porous silica gel powder containing calcium ions fixed on surfaces of particles of the powder. The Ca ion-exchanged silica releases Ca ions in a corrosive environment to form a precipitate film, thereby producing a rust-inhibiting effect.

Any Ca ion-exchanged silica may be used. The Ca ion-exchanged silica has an average particle size of 6 μm or less and preferably 4 μm or less. For example, a Ca ion-exchanged silica having an average particle size of 2 to 4 μm may be preferably used. If the average particle size of the Ca ion-exchanged silica is more than 6 μm, the corrosion resistance may be degraded and the dispersion stability in the surface treatment solution (B) may be degraded.

The Ca ion-exchanged silica preferably has a Ca concentration of 1% or more by mass and more preferably 2 to 8% by mass. If the Ca concentration is less than 1% by mass, the rust-inhibiting effect produced by releasing Ca may become insufficient. The surface area, pH, and oil absorption of the Ca ion-exchanged silica are not particularly limited.

Examples of the Ca ion-exchanged silica include SHIELDEX C303 (average particle size: 2.5 to 3.5 μm, Ca concentration: 3% by mass), SHIELDEX AC3 (average particle size: 2.3 to 3.1 μm, Ca concentration: 6% by mass), and SHIELDEX AC5 (average particle size: 3.8 to 5.2 μm, Ca concentration: 6% by mass) (trade names) manufactured by W. R. Grace & Co.; and SHIELDEX (average particle size: 3 μm, Ca concentration: 6 to 8% by mass) and SHIELDEX SY710 (average particle size: 2.2 to 2.5 μm, Ca concentration: 6.6 to 7.5% by mass) (trade names) manufactured by Fuji Silysia Chemical Ltd.

The silicon oxide of the component (j) may be either colloidal silica or dry-process silica. In the case where a water-based film-forming resin is used as a base, examples of the colloidal silica that may be used include Snowtex O, Snowtex N, Snowtex 20, Snowtex 30, Snowtex 40, Snowtex C, and Snowtex S (trade names) manufactured by Nissan Chemical Industries Ltd.; Cataloid S, Cataloid SI-350, Cataloid SI-40, Cataloid SA, and Cataloid SN (trade names) manufactured by Catalysts & Chemicals Industries Co., Ltd.; and Adelite AT-20 to 50, Adelite AT-20N, Adelite AT-300, Adelite AT-300S, and Adelite AT20Q (trade names) manufactured by ADEKA Corporation.

In the case where a solvent-based film-forming resin is used as a base, examples of the colloidal silica that may be used include ORGANOSILICASOL MA-ST-MS, ORGANOSILICASOL IPA-ST, ORGANOSILICASOL EG-ST, ORGANOSILICASOL IPA-ST-ZL, ORGANOSILICASOL NPC-ST-30, ORGANOSILICASOL DMAC-ST, ORGANOSILICASOL MEK-ST-L, ORGANOSILICASOL XBA-ST, and ORGANOSILICASOL MIBK-ST (trade names) manufactured by Nissan Chemical Industries Ltd.; and OSCAL-1132, OSCAL-1232, OSCAL-1332, OSCAL-1432, OSCAL-1532, OSCAL-1632, and OSCAL-1722 (trade names) manufactured by Catalysts & Chemicals Industries Co., Ltd.

In particular, an organic solvent-dispersible silica sol is excellent in terms of dispersibility and has higher corrosion resistance than fumed silica (dry-process silica).

Examples of the fumed silica (dry-process silica) that may be used include AEROSIL R812, AEROSIL R974, AEROSIL R202, AEROSIL R805, AEROSIL 130, AEROSIL 200, and AEROSIL 300 (trade names) manufactured by Nihon Aerosil Co., Ltd.

It is believed that the fine-particle silica described above contributes to the formation of a dense, stable corrosion product of zinc in a corrosive environment and the formation of the dense corrosion product on a coated surface inhibits the acceleration of corrosion.

The fine-particle silica preferably has a particle size of 5 to 50 nm, more preferably 5 to 20 nm, and further preferably 5 to 15 nm in view of corrosion resistance.

Even when one or more of the following self-repairing materials are used as the rust-inhibiting additive (Y) in addition to the components (i) and (j), the same effect as that of the components (i) and (j) is produced:
(l) phosphate;
(m) molybdate; and
(n) one or more organic compounds selected from triazoles, thiols, thiadiazoles, thiazoles, and thiurams.

The phosphate of the component (l) includes all types of salts such as simple salts and double salts. Metal cations constituting the salts are not limited. Any metal cation of zinc phosphate, magnesium phosphate, calcium phosphate, aluminum phosphate, and the like may be used. The skeleton and the degree of condensation of phosphate ions are not limited. Any of normal salts, dihydrogen salts, monohydrogen salts, and phosphites may be used. The normal salts include orthophosphates and all condensed phosphates such as polyphosphates.

Furthermore, the combined addition of the phosphate of the component (l) and a calcium compound can further improve the corrosion resistance. The calcium compound may be any one of calcium oxide, calcium hydroxide, and a calcium salt. One or more of these compounds may be used. The type of the calcium salt is not particularly limited and examples of the calcium salt that may be used include simple salts, such as calcium silicate, calcium carbonate, and calcium phosphate, that each contain only calcium as a cation; and double salts, such as calcium-zinc phosphate and calcium-magnesium phosphate, that each contain calcium and a cation other than calcium.

The skeleton and the degree of condensation of the molybdate of the component (m) are not limited. Examples of the molybdate include orthomolybdates, paramolybdates, and metamolybdates. The molybdate includes all salts such as simple salts and double salts. Examples of the double salts include phosphomolybdates.

Examples of the organic compound of the component (n) include triazoles such as 1,2,4-triazole, 3-amino-1,2,4-triazole, 3-mercapto-1,2,4-triazole, 5-amino-3-mercapto-1,2,4-triazole, and 1H-benzotriazole; thiols such as 1,3,5-triazine-2,4,6-trithiol and 2-mercaptobenzimidazole; thiadiazoles such as 5-amino-2-mercapto-1,3,4-thiadiazole and 2,5-dimercapto-1,3,4-thiadiazole; thiazoles such as 2-N,N-diethylthiobenzothiazole and 2-mercaptobenzothiazole; and thiurams such as tetraethylthiuram disulfide.

The total amount of the rust-inhibiting additive (Y) (the total amount of one or more of the self-repairing materials selected from the components (i), (j), and (l) to (n)) added in the second layer film is preferably 1 to 100 parts by mass (solid content), more preferably 5 to 80 parts by mass (solid content), and further preferably 10 to 50 parts by mass (solid content) relative to 100 parts by mass (solid content) of the organic resin in the surface treatment solution (B). If the amount of the rust-inhibiting additive (Y) added is less than 1 part by mass or more than 100 parts by mass, the corrosion resistance may be unfavorably degraded.

In the present invention, by adding an appropriate amount of the self-repairing materials (l) to (n) serving as the rust-inhibiting additive (Y) to the second layer film, particularly high corrosion resistance (self-repairing effect) can be achieved. The anticorrosion mechanism of the second layer film containing the rust-inhibiting additive (Y) is considered to be as follows.

In the case where the component (i) among components of the rust-inhibiting additive (Y) is added to the second layer film, when cations such as Na ions enter the second layer film in a corrosive environment, Ca ions on a silica surface are released due to an ion exchange effect. Furthermore, OH ions are generated through a cathodic reaction in a corrosive environment. As a result, the pH in the vicinity of an interface of a coated layer is increased, and the Ca ions released from the Ca ion-exchanged silica are precipitated in the form of $Ca(OH)_2$ in the vicinity of the interface of the coated layer. The resultant dense, sparingly soluble product seals defects, thereby suppressing a corrosion reaction. Moreover, it is believed that the eluted zinc ions are exchanged for the Ca ions and fixed on the silica surface.

The component (j) contributes to the formation of a dense, stable corrosion product of zinc in a corrosive environment. The corrosion product is densely formed on the surface of the coated layer, thereby inhibiting the acceleration of corrosion.

The component (l) is dissociated into phosphate ions through hydrolysis in a corrosive environment, and the phosphate ions are subjected to a complexation reaction with the eluted metal to form a protective film.

The component (m) provides a self-repairing property due to its passivation effect. That is, the component (m) forms a dense oxide on the surface of the coated film together with dissolved oxygen in a corrosive environment, and the oxide seals the origin of corrosion to inhibit a corrosion reaction.

The component (n) provides a self-repairing property due to its adsorption effect. That is, zinc and aluminum eluted due to corrosion are adsorbed to a nitrogen- or sulfur-containing polar group in the component (n) to form an inert film, and the inert film seals the origin of corrosion to inhibit a corrosion reaction.

In the present invention, even if the components (i) and (j), or the components (l) to (n) in addition to the components (i) and (j) are added to a general organic film, the rust-inhibiting effect is produced to some extent. In the case where the self-repairing materials, i.e., the components (i) and (j), or the components (l) to (n) in addition to the components (i) and (j), are added to a second layer film having an excellent barrier property and containing a specific organic resin (the organic resin (F) having an OH group and/or a COOH group, or the hydrazine-modified organic resin (X)), both effects (barrier property and self-repairing property) may be combined with each other and an outstanding rust-inhibiting effect is produced.

In the case where a calcium compound is added in combination with the component (l), the calcium compound is eluted in a corrosive environment before the elution of a coating metal, and thus is subjected to a complexation reaction with phosphate ions to form a dense, sparingly soluble protective film without using the elution of the coating metal as a trigger, thereby inhibiting a corrosion reaction.

When the components (i) and (j) or two or more of the components (l) to (n) in addition to the components (i) and (j) are added in a combined manner, the corrosion-inhibiting effects of the components are combined with each other and thus higher corrosion resistance is achieved.

In addition to the rust-inhibiting additive, the organic film may further contain one or more of other oxide fine particles, phosphomolybdates, organic phosphoric acids and the salts thereof, and organic inhibitors, which serve as corrosion inhibitors.

In the present invention, the surface treatment solution (B) may optionally further contain a lubricant (k) in order to improve the workability of the film. Examples of the lubricant (k) that may be used in the present invention are described below. One or more of these lubricants may be used.

<Lubricant (k)>

(k1) Polyolefin wax and paraffin wax, e.g., polyethylene wax (k1-1) Synthetic paraffin, natural paraffin, microcrystalline wax, and chlorinated hydrocarbon (k2) Fluorocarbon resin fine particles, e.g., polyfluoroethylene resin (polytetrafluoroethylene resin), polyvinyl fluoride resin, and polyvinylidene fluoride resin Other examples of the lubricant include fatty acid amide compounds (e.g., stearic acid amide, palmitic acid amide, methylenebisstearamide, ethylenebisstearamide, oleic acid amide, esylic acid amide, and alkylenebisfatty acid amide); metallic soaps (e.g., calcium stearate, lead stearate, calcium laurate, and calcium palmitate); metal sulfides (e.g., molybdenum disulfide and tungsten disulfide); graphite; graphite fluoride; boron nitride; polyalkylene glycol; and alkali metal sulfates. One or more of these compounds may be used.

Among these lubricants, polyethylene wax (k1) and fluorocarbon resin fine particles (k2) are preferred, and polytetrafluoroethylene resin fine particles are particularly preferred.

Examples of the polyethylene wax (k1) include Ceridust 9615A, Ceridust 3715, Ceridust 3620, and Ceridust 3910 (trade names) manufactured by Clariant (Japan) K.K.; Sanwax 131-P and Sanwax 161-P (trade names) manufactured by Sanyo Chemical Industries, Ltd.; and Chemipearl W-100, Chemipearl W-200, Chemipearl W-500, Chemipearl W-800, and Chemipearl W-950' (trade names) manufactured by Mitsui Chemicals, Inc.

As the fluorocarbon resin fine particles (k2), tetrafluoroethylene fine particles are most preferred. Preferred examples thereof include Lubron L-2 and Lubron L-5 (trade names) manufactured by Daikin Industries, Ltd.; MP1100 and MP1200 (trade names) manufactured by Dupont-Mitsui Co., Ltd.; and Fluon Dispersion AD1, Fluon Dispersion AD2, Fluon L141J, Fluon L150J, and Fluon L155J (trade names) manufactured by Asahi ICI Fluoropolymers Co., Ltd.

An excellent lubricating effect can be expected by combining the polyolefin wax and the tetrafluoroethylene fine particles with each other among these compounds.

The amount of the lubricant (k) added to the second layer film is preferably 1 to 80 parts by mass (solid content) and more preferably 3 to 40 parts by mass (solid content) relative to 100 parts by mass (solid content) of the organic resin in the surface treatment solution (B). When the amount of the lubricant (k) added is 1 part or more by mass, a lubricating effect becomes sufficient. When the amount is 80 parts or less by mass, the paintability is not degraded.

In the present invention, to form the second layer film as a dense barrier film, a curing agent may be added to the surface treatment solution (B), and the second layer film may be formed by thermal curing.

As a curing method for forming the second layer film as a dense barrier film, the following methods are appropriate: (1) a curing method that uses a urethane-forming reaction between an isocyanate and a hydroxyl group of a base resin; and (2) a curing method that uses an etherification reaction between an alkyl-etherified amino resin and a hydroxyl group of a base resin (the alkyl-etherified amino resin is prepared by partially or entirely causing a reaction of a methylol compound, which is prepared by reaction of one or more compounds selected from melamine, urea, and benzoguanamine with formaldehyde, with a monohydric alcohol having 1 to 5 carbon atoms). It is particularly preferable to use the urethane-forming reaction between an isocyanate and a hydroxy group of a base resin as a main reaction.

In the present invention, the surface treatment solution (B) may optionally further contain one or more of organic color pigments (e.g., condensed polycyclic organic pigments and phthalocyanine organic pigments), color dyes (e.g., organic solvent-soluble azo dyes and water-soluble azo metal dyes), inorganic pigments (e.g., titanium oxide), chelating agents (e.g., thiols), conductive pigments (e.g., powder of a metal such as zinc, aluminum, and nickel, iron phosphide, and antimony-doped tin oxide), coupling agents (e.g., silane coupling agents and titanium coupling agents), and melamine-cyanuric acid adducts.

<Another organic resin>

As described above, by using the surface treatment solution (B) that contains the organic resin (F) having an OH group and/or a COOH group or the hydrazine-modified organic resin (X), a galvanized steel sheet having high adhesion and continuity is provided. For example, when importance is attached to the workability of a galvanized steel sheet, a surface treatment solution (B) containing a water-soluble urethane-modified acrylic resin and/or a water-dispersible urethane-modified acrylic resin (o) serving as the organic resin (h), a curing agent (p), the silicon oxide (j), and the lubricant (k) in a specific ratio is preferably used.

The water-soluble urethane-modified acrylic resin (o) may be a water-soluble resin, a water-dispersible resin, or a mixture of these resins. A method for modifying an acrylic resin with urethane is not particularly limited.

For the water-soluble or water-dispersible urethane-modified acrylic resin (o), the mass ratio of a urethane component in the resin is preferably 10 to 50% by mass and more preferably 10 to 30% by mass on a solid content basis.

The curing agent (p) is added to sufficiently cause crosslinking in the film. The crosslinking provides high corrosion resistance and solvent resistance. The type of the curing agent is not particularly limited. A compound having at least one functional group selected from an epoxy group, an oxazoline group, an isocyanate group, and an aziridinyl group, which are not hydrophilic groups, is particularly preferably used rather than amines, polyhydric alcohols, and polybasic acids having an amino group, a hydroxy group, and a carboxy group, which are hydrophilic groups.

The silicon oxide (j) is added to improve corrosion resistance. The type of silicon oxide (j) is not particularly limited. One or more of the colloidal silica and fumed silica described above may be used. In the present invention, the particle size and type of silica are not particularly limited.

The lubricant (k) serves as a lubricating component to improve scratch resistance. The type of the lubricant (k) is not particularly limited and examples of the lubricant (k) include carnauba wax, rice wax, lanolin wax, montan wax, paraffin wax, microcrystalline wax, fatty acid ester wax, fatty acid amide wax and partially saponified products thereof, polyethylene wax, polyolefin wax, chlorinated hydrocarbons, fluorinated hydrocarbons, and ethylene-acrylic copolymer wax. One or more of these compounds may be used.

The lubricant (k) preferably has an average particle size of 0.05 to 3.0 μm. The lubricant (k) preferably has a melting point of 50 to 160° C. The shape of the lubricant particles is preferably spherical to achieve a high degree of workability.

The ratio of the total mass of (o) and (p) is preferably 50 to 95% by mass and more preferably 55 to 75% by mass on a solid content basis relative to the total mass of the water-soluble urethane-modified acrylic resin and/or water-dispersible urethane-modified acrylic resin (o)+the curing agent (p)+the silicon oxide (j)+the lubricant (k) (hereinafter, referred to as "(o)+(p)+(j)+(k)").

The curing agent (p) is preferably added such that the mass ratio ((o)/(p)) of the water-soluble urethane-modified acrylic resin and/or water-dispersible urethane-modified acrylic resin (o) to the curing agent (p) is 4 to 49 on a solid content basis.

The amount of the silicon oxide (j) added is preferably 3 to 40% by mass on a solid content basis relative to the total of (o)+(p)+(j)+(k).

The amount of the lubricant (k) added is preferably 2 to 20% by mass and more preferably 5 to 15% by mass on a solid content basis relative to the total of (o)+(p)+(j)+(k).

The surface treatment solution (B) used in the present invention may optionally contain a surfactant and a thickener, called a wettability-increasing agent, that is used to form a uniform film on a surface to be coated, an electrical conductive material used to improve electrical conductivity, a color pigment used to improve design, and a solvent used to improve a film formation property.

<Formation of Second Layer Film>

In the present invention, as described above, the second layer film is formed by applying the surface treatment solution (B) on the surface of the first layer film and drying the surface treatment solution (B) by heating.

A method for applying the surface treatment solution (B) onto the surface of the first layer film is optimally selected in accordance with, for example, the shape of a galvanized steel sheet to be treated and may be roll coating, bar coating, dipping, spray coating, or the like. Specifically, a galvanized steel sheet having a sheet-like shape is treated by roll coating or bar coating. Alternatively, such a galvanized steel sheet is treated by spraying the surface treatment solution (B) and adjusting the adhesion amount by roll squeezing or blowing of gas at a high pressure. A galvanized steel sheet having a shape of a formed product is treated by dipping the galvanized steel sheet in the surface treatment solution (B), withdrawing the galvanized steel sheet, and optionally adjusting the adhesion amount by blowing off an excessive surface treatment agent with compressed air.

After the application of the surface treatment solution (B), drying is normally performed by heating without performing washing with water. However, a water-washing step may be performed after the application of the surface treatment solution (B). The heating temperature (maximum sheet temperature) at the time of drying the surface treatment solution (B) is normally 50 to 350° C. and preferably 80 to 250° C. When the heating temperature is 50° C. or higher, a solvent does not remain in the second layer film. When the heating temperature is 350° C. or lower, the occurrence of cracking in the second layer film is suppressed. Therefore, problems such as degradation of corrosion resistance of a galvanized steel sheet do not occur. A heat-drying method is not particularly limited. The surface treatment solution (B) may be dried by heating using, for example, hot air, an induction heater, infrared radiation, or near infrared radiation.

The heating time is optimally selected in accordance with the types of galvanized steel sheets used. The heating time is preferably 0.1 to 60 seconds and more preferably 1 to 30 seconds in view of productivity and the like.

The thickness of the second layer film after drying by heating is preferably 0.01 μm or more and less than 3 μm and more preferably 0.1 to 2 μm. When the thickness after drying by heating is 0.01 μm or more, sufficient corrosion resistance and fingerprint resistance are achieved. When the thickness is less than 3 μm the continuity is not degraded.

In particular, when the hydrazine-modified organic resin (X) is used as the organic resin (h) for the second layer film, a uniform film having high corrosion resistance is formed even with a small thickness. This is particularly advantageous when the continuity is improved without degrading the corrosion resistance.

<Total film thickness>

The total thickness per side of the first layer film (composite oxide film) and the second layer film (organic resin film) formed thereon is 0.1 to 3 μm and preferably 0.1 to 2 μm. If the total thickness is less than 0.1 μm the corrosion resistance becomes insufficient. If the total thickness is more than 3 μm the continuity is degraded.

To achieve both corrosion resistance and continuity, the first layer film (composite oxide film) preferably has a thickness of 0.05 μm or more, and the second layer film (organic resin film) preferably has a thickness of 1.0 μm or less.

The present invention provides a steel sheet including the above-described films formed on one or both sides of the steel sheet. Examples of the configuration of the steel sheet of the present invention include the following:
(1) one side: coated layer-first layer film-second layer film, one side: coated layer;
(2) one side: coated layer-first layer film-second layer film, one side: coated layer-known phosphate-treated film or the like;
(3) both sides: coated layer-first layer film-second layer film;
(4) one side: coated layer-first layer film-second layer film, one side: coated layer-first layer film; and
(5) one side: coated layer-first layer film-second layer film, one side: coated layer-second layer film.

A method for measuring the thicknesses of the first layer film and second layer film is not particularly limited as long as the thicknesses can be measured by such a method with certainty. For example, the section of the films processed by FIB is observed with a SEM. Representative elements present in the films are measured by EDX or the like to determine the interface between the films. Thus, the thickness of each of the films can be calculated. For example, thicknesses are measured at any three points per one field of view of the section observed with a SEM. The average value of the thicknesses is defined as a thickness.

According to the present invention, a galvanized steel sheet can be provided that has various properties such as corrosion resistance and adhesion and allows for high continuity without degrading corrosion resistance even under a severe condition that the steel sheet is in contact at a low contact pressure. The galvanized steel sheet of the present invention can be used for various applications and suitably used as a material for use in various fields of architecture, electricity, automobiles, and the like.

EXAMPLES

Hereinafter, advantageous effects of the present invention will be described based on Examples and Comparative Examples. However, the Examples are mere examples for illustrating the present invention and do not limit the present invention.

1. Method for Preparing Test Sheets
(1) Test Sheets (Materials)

The following commercially available materials were used as test sheets.
(i) electrogalvanized steel sheet (EG): sheet thickness: 0.8 mm, coating weight: 20/20 $(g/m^2)$
(ii) hot dip galvanized steel sheet (GI): sheet thickness: 0.8 mm, coating weight: 60/60 $(g/m^2)$
(iii) hot dip galvannealed steel sheet (GA): sheet thickness: 0.8 mm, coating weight: 40/40 $(g/m^2)$ Note that "coating weight" represents a coating weight of each steel sheet. For example, the electrogalvanized steel sheet having a coating weight of 20/20 $(g/m^2)$ includes a coated layer having a coating weight of 20 $g/m^2$ on each surface of the steel sheet.

(2) Pretreatment (Washing)

Test pieces were prepared in the following manner. A surface of each test sheet was treated with Parclean N364S manufactured by Nihon Parkerizing Co., LTD. to remove oil and stains on the surface. The test sheet was then washed with tap water. After checking that the test sheet was completely wetted with water, pure water (deionized water) was poured onto the test sheet. The test sheet was dried in an oven at 100° C. and then used as a test piece.

(3) Preparation of Surface Treatment Solution (A)

A surface treatment solution (A) was prepared by mixing components in deionized water so as to achieve the composition (mass ratio) shown in Tables 1-1 to 1-5. The pH was adjusted to 8.0 to 11.0 with ammonia, acetic acid, or nitric acid.

The amount of a component (g) shown in Tables 1-1 to 1-5 is expressed by a ratio (solid content basis) of the component (g) in the surface treatment solution (A).

TABLE 1-1

| | | Surface treatment solution (A) Composition | | | | | | | |
|---|---|---|---|---|---|---|---|---|---|
| Test level | | Component (a) Type | Component (b) Type | Component (c) Type | Component (d) Type | Component (e) Type | Component (f) Type | Component (g) Type | Mixed amount |
| Example | 1 | a2 | b1 | c2 | d1 + d2 (*3) | e2 | f1 | — | 0 |
| Example | 2 | a1 | b1 | c2 | d1 + d2 (*3) | e2 | f1 | — | 0 |
| Example | 3 | a1 + a2 (*1) | b1 | c2 | d1 + d2 (*3) | e2 | f1 | — | 0 |
| Example | 4 | a2 | b1 | c2 | d1 + d2 (*3) | e2 | f1 | — | 0 |
| Example | 5 | a2 | b1 | c2 | d1 | e2 | f1 | — | 0 |
| Example | 6 | a2 | b1 | c2 | d1 + d2 (*3) | e2 | f1 | — | 0 |
| Example | 7 | a2 | b1 | c2 | d2 | e2 | f1 | — | 0 |
| Example | 8 | a2 | b1 | c2 | d1 + d2 (*3) | e1 | f1 | — | 0 |
| Example | 9 | a1 | b1 | c2 | d1 + d2 (*3) | e1 | f2 | — | 0 |
| Example | 10 | a1 | b1 | c2 | d1 + d2 (*3) | e1 | f2 | — | 0 |
| Example | 11 | a1 | b2 | c2 | d1 + d2 (*3) | e1 | f2 | — | 0 |
| Example | 12 | a1 | b1 | c2 | d1 + d2 (*3) | e1 | f2 | — | 0 |
| Example | 13 | a1 | b1 | c2 | d1 + d2 (*3) | e1 | f2 | — | 0 |
| Example | 14 | a1 | b1 | c2 | d1 + d2 (*3) | e1 | f2 | — | 0 |
| Example | 15 | a1 | b1 | c2 | d1 + d2 (*3) | e1 | f2 | — | 0 |
| Example | 16 | a1 | b1 | c2 | d1 + d2 (*3) | e1 | f2 | — | 0 |

TABLE 1-1-continued

| | | | | | | | | |
|---|---|---|---|---|---|---|---|---|
| Example | 17 | a1 | b1 | c2 | d1 + d2 (*3) | e1 | f2 | — | 0 |
| Example | 18 | a1 | b1 | c2 | d1 + d2 (*3) | e1 | f2 | — | 0 |
| Example | 19 | a1 | b1 | c2 | d1 + d2 (*3) | e1 | f2 | — | 0 |
| Example | 20 | a1 | b1 | c2 | d1 + d2 (*3) | e1 | f2 | — | 0 |
| Example | 21 | a1 | b1 | c1 | d1 + d2 (*3) | e1 | f2 | — | 0 |
| Example | 22 | a1 | b1 | c1 + c2 (*2) | d1 + d2 (*3) | e1 | f2 | — | 0 |
| Example | 23 | a1 | b1 | c2 | d1 + d2 (*3) | e1 | f2 | — | 0 |
| Example | 24 | a1 | b1 | c2 | d1 + d2 (*3) | e1 | f2 | — | 0 |
| Example | 25 | a1 | b1 | c2 | d1 + d2 (*3) | e1 | f2 | — | 0 |
| Example | 26 | a1 | b1 | c2 | d1 + d2 (*3) | e1 | f2 | — | 0 |
| Example | 27 | a1 | b1 | c2 | d1 + d2 (*3) | e1 | f2 | — | 0 |
| Example | 28 | a1 | b1 | c2 | d1 + d2 (*3) | e1 | f2 | — | 0 |
| Example | 29 | a1 | b1 | c2 | d1 + d2 (*3) | e1 | f2 | — | 0 |
| Example | 30 | a1 | b1 | c2 | d1 + d2 (*3) | e1 | f2 | — | 0 |
| Example | 31 | a1 | b1 | c2 | d1 + d2 (*3) | e1 | f2 | — | 0 |
| Example | 32 | a2 | b2 | c1 | d1 | e2 | f3 | — | 0 |
| Example | 33 | a2 | b2 | c1 | d1 | e1 | f3 | — | 0 |
| Example | 34 | a2 | b2 | c1 | d1 | e1 + e2 (*4) | f3 | — | 0 |
| Example | 35 | a2 | b2 | c1 | d1 | e2 | f3 | — | 0 |
| Example | 36 | a2 | b2 | c1 | d1 | e2 | f3 | — | 0 |
| Example | 37 | a2 | b2 | c1 | d1 | e2 | f3 | — | 0 |
| Example | 38 | a2 | b2 | c1 | d1 | e2 | f3 | — | 0 |
| Example | 39 | a2 | b2 | c1 | d1 | e2 | f1 | — | 0 |
| Example | 40 | a2 | b2 | c1 | d1 | e2 | f1 | — | 0 |

| | Surface treatment solution (A) | | | | | | | |
|---|---|---|---|---|---|---|---|---|
| | Composition | | | | | | | |
| Test level | Component (a) Mass % (*7) | (a/b) Mass ratio | (b/c) Mass ratio | (b/d) Mass ratio | (e/d) Mass ratio | (f/d) Mass ratio | (g) (*8) Mass % | pH |
| Example 1 | 17 | 1.40 | 0.43 | 1.22 | 0.34 | 0.07 | 0 | 8.4 |
| Example 2 | 20 | 1.68 | 0.43 | 1.22 | 0.34 | 0.07 | 0 | 8.4 |
| Example 3 | 20 | 1.68 | 0.43 | 1.22 | 0.34 | 0.07 | 0 | 8.4 |
| Example 4 | 20 | 1.68 | 0.43 | 1.22 | 0.34 | 0.07 | 0 | 8.4 |
| Example 5 | 27 | 3.03 | 0.43 | 1.22 | 0.34 | 0.07 | 0 | 8.4 |
| Example 6 | 27 | 3.03 | 0.43 | 1.22 | 0.34 | 0.07 | 0 | 8.4 |
| Example 7 | 27 | 3.03 | 0.43 | 1.22 | 0.34 | 0.07 | 0 | 8.4 |
| Example 8 | 36 | 5.97 | 0.43 | 1.22 | 0.34 | 0.07 | 0 | 8.4 |
| Example 9 | 19 | 5.89 | 0.10 | 0.30 | 0.34 | 0.07 | 0 | 8.4 |
| Example 10 | 19 | 2.94 | 0.20 | 0.61 | 0.34 | 0.07 | 0 | 8.4 |
| Example 11 | 19 | 2.94 | 0.20 | 0.61 | 0.34 | 0.07 | 0 | 8.4 |
| Example 12 | 19 | 2.94 | 0.20 | 0.61 | 0.34 | 0.07 | 0 | 8.4 |
| Example 13 | 18 | 1.47 | 0.43 | 1.22 | 0.34 | 0.07 | 0 | 8.4 |
| Example 14 | 18 | 1.47 | 0.43 | 1.22 | 0.34 | 0.07 | 0 | 8.4 |
| Example 15 | 18 | 1.47 | 0.43 | 1.22 | 0.34 | 0.07 | 0 | 8.4 |
| Example 16 | 18 | 1.47 | 0.43 | 1.22 | 0.34 | 0.07 | 0 | 8.4 |
| Example 17 | 18 | 1.47 | 0.43 | 1.22 | 0.34 | 0.07 | 0 | 8.4 |
| Example 18 | 18 | 1.47 | 0.43 | 1.22 | 0.34 | 0.07 | 0 | 8.4 |
| Example 19 | 18 | 1.47 | 0.43 | 1.22 | 0.34 | 0.07 | 0 | 8.4 |
| Example 20 | 17 | 1.49 | 0.95 | 1.69 | 0.22 | 0.05 | 0 | 8.4 |
| Example 21 | 18 | 1.35 | 1.06 | 1.88 | 0.22 | 0.05 | 0 | 8.4 |
| Example 22 | 18 | 1.35 | 1.06 | 1.88 | 0.22 | 0.05 | 0 | 8.4 |
| Example 23 | 18 | 1.35 | 1.06 | 1.88 | 0.22 | 0.05 | 0 | 8.4 |
| Example 24 | 19 | 1.28 | 1.11 | 1.97 | 0.22 | 0.05 | 0 | 8.4 |
| Example 25 | 19 | 1.47 | 1.05 | 1.22 | 0.34 | 0.07 | 0 | 8.4 |
| Example 26 | 18 | 1.47 | 0.43 | 1.22 | 0.34 | 0.07 | 0 | 8.0 |
| Example 27 | 18 | 1.47 | 0.43 | 1.22 | 0.34 | 0.07 | 0 | 8.2 |
| Example 28 | 18 | 1.47 | 0.43 | 1.22 | 0.34 | 0.07 | 0 | 9.5 |
| Example 29 | 18 | 1.47 | 0.43 | 1.22 | 0.34 | 0.07 | 0 | 10.0 |
| Example 30 | 22 | 1.47 | 0.84 | 1.22 | 0.34 | 0.07 | 0 | 8.4 |
| Example 31 | 20 | 1.47 | 0.63 | 1.22 | 0.34 | 0.07 | 0 | 8.4 |
| Example 32 | 18 | 1.47 | 0.43 | 0.31 | 0.09 | 0.06 | 0 | 8.4 |
| Example 33 | 16 | 1.47 | 0.43 | 0.57 | 0.16 | 0.11 | 0 | 8.4 |
| Example 34 | 16 | 1.47 | 0.43 | 0.57 | 0.16 | 0.11 | 0 | 8.4 |
| Example 35 | 16 | 1.47 | 0.43 | 0.57 | 0.16 | 0.11 | 0 | 8.4 |
| Example 36 | 18 | 1.47 | 0.43 | 0.47 | 0.14 | 0.09 | 0 | 8.4 |
| Example 37 | 18 | 1.47 | 0.43 | 0.93 | 0.27 | 0.06 | 0 | 8.4 |
| Example 38 | 18 | 1.47 | 0.43 | 1.01 | 0.29 | 0.06 | 0 | 8.4 |
| Example 39 | 18 | 1.47 | 0.43 | 1.69 | 0.48 | 0.10 | 0 | 8.4 |
| Example 40 | 18 | 1.47 | 0.43 | 1.69 | 0.48 | 0.10 | 0 | 8.4 |

Mixing ratio (mass ratio) of (*1) to (*6):
(*1) a1:a2 = 1:1
(*2) c1:c2 = 1:1
(*3) d1:d2 = 9:1
(*4) e1:e2 = 1:1

TABLE 1-1-continued (*5) f1:f2 = 1:1
(*6) f1:f3 = 1:1
(*7) The ratio (solid content basis) of component (a) (mass in terms of Zr) in surface treatment solution (A)
(*8) The ratio (solid content basis) of component (g) in surface treatment solution (A)

TABLE 1-2

| | | Surface treatment solution (A) Composition | | | | | | | |
|---|---|---|---|---|---|---|---|---|---|
| Test level | | Component (a) Type | Component (b) Type | Component (c) Type | Component (d) Type | Component (e) Type | Component (f) Type | Component (g) Type | Component (g) Mixed amount |
| Example | 41 | a2 | b2 | c1 | d1 | e2 | f1 | — | 0 |
| Example | 42 | a2 | b2 | c1 | d1 | e2 | f1 | — | 0 |
| Example | 43 | a2 | b2 | c1 | d1 | e2 | f1 | — | 0 |
| Example | 44 | a2 | b2 | c1 | d1 | e2 | f1 + f2 (*5) | — | 0 |
| Example | 45 | a2 | b2 | c1 | d1 | e2 | f2 | — | 0 |
| Example | 46 | a2 | b2 | c1 | d1 | e2 | f3 | — | 0 |
| Example | 47 | a2 | b2 | c1 | d1 | e2 | f3 | — | 0 |
| Example | 48 | a2 | b2 | c1 | d1 | e2 | f3 | — | 0 |
| Example | 49 | a2 | b2 | c1 | d1 | e2 | f1 + f2 (*5) | — | 0 |
| Example | 50 | a2 | b2 | c1 + c2 (*2) | d1 | e1 | f1 + f2 (*5) | — | 0 |
| Example | 51 | a2 | b2 | c1 + c2 (*2) | d1 | e1 | f1 + f2 (*5) | — | 0 |
| Example | 52 | a2 | b2 | c1 + c2 (*2) | d1 | e1 | f1 + f2 (*5) | — | 0 |
| Example | 53 | a2 | b2 | c1 + c2 (*2) | d1 | e1 | f1 + f2 (*5) | — | 0 |
| Example | 54 | a2 | b2 | c1 + c2 (*2) | d1 | e1 | f1 + f2 (*5) | — | 0 |
| Example | 55 | a2 | b2 | c1 + c2 (*2) | d1 | e1 | f1 + f2 (*5) | — | 0 |
| Example | 56 | a2 | b2 | c1 + c2 (*2) | d1 | e1 | f1 + f2 (*5) | — | 0 |
| Example | 57 | a2 | b2 | c1 + c2 (*2) | d1 | e1 | f1 + f2 (*5) | — | 0 |
| Example | 58 | a2 | b2 | c1 + c2 (*2) | d1 | e1 | f1 + f2 (*5) | — | 0 |
| Example | 59 | a2 | b2 | c1 + c2 (*2) | d1 | e1 | f1 + f2 (*5) | — | 0 |
| Example | 60 | a2 | b2 | c1 + c2 (*2) | d1 | e1 | f1 + f2 (*5) | — | 0 |
| Example | 61 | a2 | b2 | c1 | d2 | e2 | f1 + f2 (*5) | — | 0 |
| Example | 62 | a2 | b2 | c1 | d2 | e2 | f1 + f2 (*5) | — | 0 |
| Example | 63 | a2 | b2 | c1 | d2 | e2 | f1 + f2 (*5) | — | 0 |
| Example | 64 | a2 | b2 | c1 | d2 | e2 | f1 + f2 (*5) | — | 0 |
| Example | 65 | a2 | b2 | c1 | d1 | e2 | f1 + f3 (*6) | — | 0 |
| Example | 66 | a2 | b2 | c1 | d1 | e2 | f1 + f3 (*6) | — | 0 |
| Example | 67 | a2 | b2 | c1 | d1 | e2 | f1 + f3 (*6) | — | 0 |
| Example | 68 | a2 | b2 | c1 | d1 | e2 | f1 + f3 (*6) | — | 0 |
| Example | 69 | a2 | b2 | c1 | d1 + d2 (*3) | e2 | f1 | g1 | 1.3 |
| Example | 70 | a2 | b2 | c1 | d1 + d2 (*3) | e2 | f1 | g1 | 1.3 |
| Example | 71 | a2 | b2 | c1 | d1 + d2 (*3) | e2 | f1 | g1 | 1.3 |
| Example | 72 | a2 | b2 | c1 | d1 + d2 (*3) | e2 | f1 | g1 | 1.3 |
| Example | 73 | a2 | b2 | c1 | d1 + d2 (*3) | e2 | f1 | g1 | 1.3 |
| Example | 74 | a2 | b2 | c1 | d1 + d2 (*3) | e2 | f1 | — | 0 |
| Example | 75 | a2 | b2 | c1 | d1 + d2 (*3) | e2 | f1 | g1 | 3.3 |
| Example | 76 | a2 | b2 | c1 | d1 + d2 (*3) | e2 | f1 | — | 0 |
| Example | 77 | a2 | b2 | c1 | d1 + d2 (*3) | e2 | f1 | — | 0 |
| Example | 78 | a2 | b2 | c1 | d1 + d2 (*3) | e2 | f1 | — | 0 |
| Example | 79 | a2 | b2 | c1 | d1 + d2 (*3) | e2 | f1 | — | 0 |
| Example | 80 | a2 | b2 | c1 | d1 + d2 (*3) | e2 | f1 | — | 0 |

| | | Surface treatment solution (A) Composition | | | | | | | |
|---|---|---|---|---|---|---|---|---|---|
| Test level | | Component (a) Mass % (*7) | (a/b) Mass ratio | (b/c) Mass ratio | (b/d) Mass ratio | (e/d) Mass ratio | (f/d) Mass ratio | (g) (*8) Mass % | pH |
| Example | 41 | 18 | 1.47 | 0.43 | 1.69 | 0.48 | 0.10 | 0 | 8.4 |
| Example | 42 | 18 | 1.47 | 0.43 | 1.69 | 0.48 | 0.10 | 0 | 8.4 |
| Example | 43 | 18 | 1.47 | 0.43 | 1.69 | 0.48 | 0.10 | 0 | 8.4 |
| Example | 44 | 18 | 1.47 | 0.43 | 1.69 | 0.48 | 0.10 | 0 | 8.4 |
| Example | 45 | 18 | 1.47 | 0.43 | 1.69 | 0.48 | 0.10 | 0 | 8.4 |
| Example | 46 | 18 | 1.47 | 0.43 | 1.69 | 0.48 | 0.10 | 0 | 8.4 |
| Example | 47 | 19 | 1.47 | 0.43 | 1.76 | 0.51 | 0.11 | 0 | 8.4 |
| Example | 48 | 19 | 1.47 | 0.43 | 2.00 | 0.58 | 0.12 | 0 | 8.4 |
| Example | 49 | 19 | 1.47 | 0.43 | 1.22 | 0.05 | 0.07 | 0 | B.4 |
| Example | 50 | 18 | 1.47 | 0.43 | 1.22 | 0.34 | 0.07 | 0 | 8.4 |
| Example | 51 | 18 | 1.47 | 0.43 | 1.22 | 0.34 | 0.07 | 0 | 8.4 |
| Example | 52 | 18 | 1.47 | 0.43 | 1.22 | 0.34 | 0.07 | 0 | 8.4 |
| Example | 53 | 18 | 1.47 | 0.43 | 1.22 | 0.34 | 0.07 | 0 | 8.4 |
| Example | 54 | 18 | 1.47 | 0.43 | 1.22 | 0.34 | 0.07 | 0 | 8.4 |
| Example | 55 | 18 | 1.47 | 0.43 | 1.22 | 0.34 | 0.07 | 0 | 8.4 |

TABLE 1-2-continued

| | | | | | | | | | |
|---|---|---|---|---|---|---|---|---|---|
| Example | 56 | 18 | 1.47 | 0.43 | 1.22 | 0.34 | 0.07 | 0 | 8.4 |
| Example | 57 | 18 | 1.47 | 0.43 | 1.22 | 0.34 | 0.07 | 0 | 8.4 |
| Example | 58 | 18 | 1.47 | 0.43 | 1.22 | 0.34 | 0.07 | 0 | 8.4 |
| Example | 59 | 18 | 1.47 | 0.43 | 1.22 | 0.34 | 0.07 | 0 | 8.4 |
| Example | 60 | 18 | 1.47 | 0.43 | 1.22 | 0.34 | 0.07 | 0 | 8.4 |
| Example | 61 | 20 | 2.94 | 0.20 | 1.18 | 0.03 | 0.14 | 0 | 8.4 |
| Example | 62 | 20 | 2.94 | 0.20 | 1.18 | 0.18 | 0.14 | 0 | 8.4 |
| Example | 63 | 20 | 2.94 | 0.20 | 1.18 | 0.65 | 0.14 | 0 | 8.4 |
| Example | 64 | 19 | 2.94 | 0.20 | 1.18 | 0.71 | 0.14 | 0 | 8.4 |
| Example | 65 | 18 | 1.47 | 0.43 | 1.22 | 0.34 | 0.05 | 0 | 8.4 |
| Example | 66 | 17 | 1.47 | 0.43 | 1.22 | 0.34 | 0.17 | 0 | 8.4 |
| Example | 67 | 16 | 1.47 | 0.43 | 1.22 | 0.34 | 0.34 | 0 | 8.4 |
| Example | 68 | 14 | 1.47 | 0.43 | 1.22 | 0.34 | 0.80 | 0 | 8.4 |
| Example | 69 | 18 | 1.47 | 0.43 | 1.22 | 0.34 | 0.07 | 0.5 | 8.4 |
| Example | 70 | 18 | 1.47 | 0.43 | 1.22 | 0.34 | 0.07 | 0.5 | 8.4 |
| Example | 71 | 18 | 1.47 | 0.43 | 1.22 | 0.34 | 0.07 | 0.5 | 8.4 |
| Example | 72 | 18 | 1.47 | 0.43 | 1.22 | 0.34 | 0.07 | 0.5 | 8.4 |
| Example | 73 | 18 | 1.47 | 0.43 | 1.22 | 0.34 | 0.07 | 0.5 | 8.4 |
| Example | 74 | 18 | 1.47 | 0.43 | 1.22 | 0.34 | 0.07 | 0 | 8.4 |
| Example | 75 | 18 | 1.47 | 0.43 | 1.22 | 0.34 | 0.07 | 1.5 | 8.4 |
| Example | 76 | 18 | 1.47 | 0.43 | 1.22 | 0.34 | 0.07 | 0 | 8.4 |
| Example | 77 | 18 | 1.47 | 0.43 | 1.22 | 0.34 | 0.07 | 0 | 8.4 |
| Example | 78 | 18 | 1.47 | 0.43 | 1.22 | 0.34 | 0.07 | 0 | 8.4 |
| Example | 79 | 18 | 1.47 | 0.43 | 1.22 | 0.34 | 0.07 | 0 | 8.4 |
| Example | 80 | 18 | 1.47 | 0.43 | 1.22 | 0.34 | 0.07 | 0 | 8.4 |

Mixing ratio (mass ratio) of (*1) to (*6):
(*1) a1:a2 = 1:1
(*2) c1:c2 = 1:1
(*3) d1:d2 = 9:1
(*4) e1:e2 = 1:1
(*5) f1:f2 = 1:1
(*6) f1:f3 = 1:1
(*7) The ratio (solid content basis) of component (a) (mass in terms of Zr) in surface treatment solution (A)
(*8) The ratio (solid content basis) of component (g) in surface treatment solution (A)

TABLE 1-3

| | | Surface treatment solution (A) Composition | | | | | | | |
|---|---|---|---|---|---|---|---|---|---|
| | | | | | | | | Component (g) | |
| Test level | | Component (a) Type | Component (b) Type | Component (c) Type | Component (d) Type | Component (e) Type | Component (f) Type | Type | Mixed amount |
| Example | 81 | a2 | b1 | c1 | d1 + d2 (*3) | e1 | f1 | — | 0 |
| Example | 82 | a2 | b1 | c1 | d1 + d2 (*3) | e1 | f1 | — | 0 |
| Example | 83 | a2 | b1 | c1 | d1 + d2 (*3) | e1 | f1 | — | 0 |
| Example | 84 | a2 | b1 | c1 | d1 + d2 (*3) | e1 | f1 | — | 0 |
| Example | 85 | a2 | b2 | c1 | d1 + d2 (*3) | e2 | f1 | — | 0 |
| Example | 86 | a2 | b2 | c1 | d1 + d2 (*3) | e2 | f1 | — | 0 |
| Example | 87 | a2 | b2 | c1 | d1 + d2 (*3) | e2 | f1 | g1 | 30.0 |
| Example | 88 | a2 | b2 | c1 | d1 + d2 (*3) | e2 | f1 | g1 | 300.0 |
| Example | 89 | a2 | b2 | c1 | d1 + d2 (*3) | e2 | f1 + f2 (*5) | g1 | 2.5 |
| Example | 90 | a2 | b2 | c1 | d1 + d2 (*3) | e2 | f1 + f2 (*5) | g1 | 10.0 |
| Example | 91 | a2 | b2 | c1 | d1 + d2 (*3) | e2 | f1 + f2 (*5) | g1 | 10.0 |
| Example | 92 | a2 | b2 | c1 | d1 + d2 (*3) | e2 | f1 + f2 (*5) | g1 | 10.0 |
| Example | 93 | a2 | b2 | c1 | d1 + d2 (*3) | e2 | f1 + f2 (*5) | g1 | 10.0 |
| Example | 94 | a2 | b2 | c1 | d1 + d2 (*3) | e2 | f1 + f2 (*5) | g1 | 10.0 |
| Example | 95 | a2 | b2 | c1 | d1 + d2 (*3) | e2 | f1 + f2 (*5) | g1 | 10.0 |
| Example | 96 | a2 | b2 | c1 | d1 + d2 (*3) | e2 | f1 + f2 (*5) | g1 | 10.0 |
| Example | 97 | a2 | b2 | c1 | d1 + d2 (*3) | e2 | f1 + f2 (*5) | g1 | 10.0 |
| Example | 98 | a2 | b2 | c1 | d1 + d2 (*3) | e2 | f1 + f2 (*5) | g1 | 25.0 |
| Example | 99 | a2 | b2 | c1 | d1 + d2 (*3) | e2 | f1 + f2 (*5) | g1 | 37.5 |
| Example | 100 | a2 | b2 | c1 | d1 + d2 (*3) | e2 | f1 + f2 (*5) | g1 | 50.0 |
| Example | 101 | a2 | b2 | c1 | d1 + d2 (*3) | e2 | f1 + f2 (*5) | g1 | 100.0 |
| Example | 102 | a2 | b2 | c1 | d1 + d2 (*3) | e2 | f1 + f2 (*5) | g1 | 300.0 |
| Comparative Example | 103 | a2 | b1 | c2 | d1 + d2 (*3) | e2 | f1 | — | 0 |
| Comparative Example | 104 | a2 | b1 | c2 | d1 + d2 (*3) | e1 | f1 | — | 0 |
| Comparative Example | 105 | a1 | b1 | c2 | d1 + d2 (*3) | e1 | f2 | — | 0 |
| Comparative Example | 106 | a1 | b1 | c2 | d1 + d2 (*3) | e1 | f2 | — | 0 |
| Comparative Example | 107 | a2 | b2 | c1 | d1 | e2 | f3 | — | 0 |
| Comparative Example | 108 | a2 | b2 | c1 | d1 | e2 | f3 | — | 0 |
| Comparative Example | 109 | a2 | b2 | c1 | d2 | e2 | f1 + f2 (*5) | — | 0 |
| Comparative Example | 110 | a2 | b2 | c1 | d2 | e2 | f1 + f2 (*5) | — | 0 |
| Comparative Example | 111 | a2 | b2 | c1 | d1 | e2 | f1 + f3 (*6) | — | 0 |
| Comparative Example | 112 | a2 | b2 | c1 | d1 | e2 | f1 + f3 (*6) | — | 0 |

TABLE 1-3-continued

| | Test level | | | | | | | |
|---|---|---|---|---|---|---|---|---|
| Comparative Example | 113 | a1 | b1 | c2 | d1 + d2 (*3) | e1 | f2 | — | 0 |
| Comparative Example | 114 | a1 | b1 | c2 | d1 + d2 (*3) | e1 | f1 | — | 0 |
| Comparative Example | 115 | — | b1 | c1 | d1 + d2 (*3) | e1 | f1 | — | 0 |
| Comparative Example | 116 | a2 | — | c1 | d1 + d2 (*3) | e1 | f1 | — | 0 |
| Comparative Example | 117 | a2 | b1 | — | d1 + d2 (*3) | e1 | f1 | — | 0 |
| Comparative Example | 118 | a2 | b1 | c1 | d1 + d2 (*3) | — | — | — | 0 |
| Comparative Example | 119 | a2 | b1 | c1 | d1 + d2 (*3) | e1 | — | — | 0 |
| Comparative Example | 120 | a2 | b1 | c1 | — | e1 | f1 | — | 0 |

| | | Surface treatment solution (A) Composition | | | | | | | |
|---|---|---|---|---|---|---|---|---|---|
| | Test level | Component (a) Mass % (*7) | (a/b) Mass ratio | (b/c) Mass ratio | (b/d) Mass ratio | (e/d) Mass ratio | (f/d) Mass ratio | (g) (*8) Mass % | pH |
| Example | 81 | 18 | 1.47 | 0.43 | 1.22 | 0.34 | 0.07 | 0 | 8.4 |
| Example | 82 | 18 | 1.47 | 0.43 | 1.22 | 0.34 | 0.07 | 0 | 8.4 |
| Example | 83 | 18 | 1.47 | 0.43 | 1.22 | 0.34 | 0.07 | 0 | 8.4 |
| Example | 84 | 18 | 1.47 | 0.43 | 1.22 | 0.34 | 0.07 | 0 | 8.4 |
| Example | 85 | 18 | 1.47 | 0.43 | 1.22 | 0.34 | 0.07 | 0 | 8.4 |
| Example | 86 | 18 | 1.47 | 0.43 | 1.22 | 0.34 | 0.07 | 0 | 8.4 |
| Example | 87 | 17 | 1.47 | 0.43 | 1.22 | 0.34 | 0.07 | 8.6 | 8.4 |
| Example | 88 | 9 | 1.47 | 0.43 | 1.22 | 0.34 | 0.07 | 48.6 | 8.4 |
| Example | 89 | 18 | 1.47 | 0.43 | 1.22 | 0.34 | 0.07 | 1.0 | 8.4 |
| Example | 90 | 18 | 1.47 | 0.43 | 1.22 | 0.34 | 0.07 | 3.0 | 8.4 |
| Example | 91 | 18 | 1.47 | 0.43 | 1.22 | 0.34 | 0.07 | 3.0 | 8.4 |
| Example | 92 | 18 | 1.47 | 0.43 | 1.22 | 0.34 | 0.07 | 3.0 | 8.4 |
| Example | 93 | 18 | 1.47 | 0.43 | 1.22 | 0.34 | 0.07 | 3.0 | 8.4 |
| Example | 94 | 18 | 1.47 | 0.43 | 1.22 | 0.34 | 0.07 | 3.0 | 8.4 |
| Example | 95 | 18 | 1.47 | 0.43 | 1.22 | 0.34 | 0.07 | 3.0 | 8.4 |
| Example | 96 | 18 | 1.47 | 0.43 | 1.22 | 0.34 | 0.07 | 3.0 | 8.4 |
| Example | 97 | 18 | 1.47 | 0.43 | 1.22 | 0.34 | 0.07 | 3.0 | 8.4 |
| Example | 98 | 17 | 1.47 | 0.43 | 1.22 | 0.34 | 0.07 | 7.0 | 8.4 |
| Example | 99 | 16 | 1.47 | 0.43 | 1.22 | 0.34 | 0.07 | 10.0 | 8.4 |
| Example | 100 | 15 | 1.47 | 0.43 | 1.22 | 0.34 | 0.07 | 12.0 | 8.4 |
| Example | 101 | 12 | 1.47 | 0.43 | 1.22 | 0.34 | 0.07 | 23.4 | 8.4 |
| Example | 102 | 9 | 1.47 | 0.43 | 1.22 | 0.34 | 0.07 | 48.6 | 8.4 |
| Comparative Example | 103 | 12 | 0.84 | 0.43 | 1.22 | 0.34 | 0.07 | 0 | 8.4 |
| Comparative Example | 104 | 38 | 7.57 | 0.43 | 1.22 | 0.34 | 0.07 | 0 | 8.4 |
| Comparative Example | 105 | 19 | 11.77 | 0.05 | 0.15 | 0.34 | 0.07 | 0 | 8.4 |
| Comparative Example | 106 | 14 | 0.29 | 2.12 | 6.09 | 0.34 | 0.07 | 0 | 8.4 |
| Comparative Example | 107 | 18 | 1.47 | 0.43 | 2.00 | 0.06 | 0.01 | 0 | 8.4 |
| Comparative Example | 108 | 19 | 1.47 | 0.43 | 2.51 | 0.72 | 0.15 | 0 | 8.4 |
| Comparative Example | 109 | 20 | 2.94 | 2.04 | 1.18 | 0.01 | 0.14 | 0 | 8.4 |
| Comparative Example | 110 | 18 | 2.94 | 0.20 | 1.18 | 1.18 | 0.14 | 0 | 8.4 |
| Comparative Example | 111 | 19 | 1.47 | 0.43 | 1.22 | 0.34 | 0.002 | 0 | 8.4 |
| Comparative Example | 112 | 13 | 1.47 | 0.43 | 1.22 | 0.34 | 1.01 | 0 | 8.4 |
| Comparative Example | 113 | 18 | 1.47 | 0.43 | 1.22 | 0.34 | 0.07 | 0 | 4.5 |
| Comparative Example | 114 | 18 | 1.47 | 0.43 | 1.22 | 0.34 | 0.07 | 0 | 11.0 |
| Comparative Example | 115 | — | — | 0.43 | 2.37 | 0.68 | 0.14 | 0 | 8.4 |
| Comparative Example | 116 | 20 | — | — | — | 0.68 | 0.14 | 0 | 8.4 |
| Comparative Example | 117 | 27 | 1.47 | — | 2.37 | 0.68 | 0.14 | 0 | 8.4 |
| Comparative Example | 118 | 19 | 1.47 | 0.43 | 2.37 | — | — | 0 | 8.4 |
| Comparative Example | 119 | 20 | 1.47 | 0.43 | 2.37 | 0.68 | — | 0 | 8.4 |
| Comparative Example | 120 | 19 | 1.47 | 0.43 | — | — | — | 0 | 8.4 |

Mixing ratio (mass ratio) of (*1) to (*6):
(*1) a1:a2 = 1:1
(*2) c1:c2 = 1:1
(*3) d1:d2 = 9:1
(*4) e1:e2 = 1:1
(*5) f1:f2 = 1:1
(*6) f1:f3 = 1:1
(*7) The ratio (solid content basis) or component (a) (mass in terms of Zr) in surface treatment solution (A)
(*8) The ratio (solid content basis) of component (g) in surface treatment solution (A)

TABLE 1-4

| | | Surface treatment solution (A) Composition | | | | | | | |
|---|---|---|---|---|---|---|---|---|---|
| | | Component (a) | Component (b) | Component (c) | Component (d) | Component (e) | Component (f) | Component (g) | |
| | Test level | Type | Type | Type | Type | Type | Type | Type | Mixed amount |
| Example | 121 | a2 | b1 | c1 | d1 + d2 (*3) | e1 | f1 | — | 0 |
| Example | 122 | a2 | b1 | c1 | d1 + d2 (*3) | e1 | f1 | — | 0 |

TABLE 1-4-continued

| | Test level | | | | | | | | |
|---|---|---|---|---|---|---|---|---|---|
| Example | 123 | a2 | b1 | c1 | d1 + d2 (*3) | e1 | f1 | — | 0 |
| Example | 124 | a2 | b1 | c1 | d1 + d2 (*3) | e1 | f1 | — | 0 |
| Example | 125 | a2 | b1 | c1 | d1 + d2 (*3) | e1 | f1 | — | 0 |
| Example | 126 | a2 | b1 | c1 | d1 + d2 (*3) | e1 | f1 | — | 0 |
| Example | 127 | a2 | b1 | c1 | d1 + d2 (*3) | e1 | f1 | — | 0 |
| Example | 128 | a2 | b1 | c1 | d1 + d2 (*3) | e1 | f1 | — | 0 |
| Example | 129 | a2 | b1 | c1 | d1 + d2 (*3) | e1 | f1 | — | 0 |
| Example | 130 | a2 | b1 | c1 | d1 + d2 (*3) | e1 | f1 | — | 0 |
| Example | 131 | a2 | b1 | c1 | d1 + d2 (*3) | e1 | f1 | — | 0 |
| Example | 132 | a2 | b1 | c1 | d1 + d2 (*3) | e1 | f1 | — | 0 |
| Example | 133 | a2 | b1 | c1 | d1 + d2 (*3) | e1 | f1 | — | 0 |
| Example | 134 | a2 | b1 | c1 | d1 + d2 (*3) | e1 | f1 | — | 0 |
| Example | 135 | a2 | b1 | c1 | d1 + d2 (*3) | e1 | f1 | — | 0 |
| Example | 136 | a2 | b1 | c1 | d1 + d2 (*3) | e1 | f1 | — | 0 |
| Example | 137 | a2 | b1 | c1 | d1 + d2 (*3) | e1 | f1 | — | 0 |
| Example | 138 | a2 | b1 | c1 | d1 + d2 (*3) | e1 | f1 | — | 0 |
| Example | 139 | a2 | b1 | c1 | d1 + d2 (*3) | e1 | f1 | — | 0 |
| Example | 140 | a2 | b1 | c1 | d1 + d2 (*3) | e1 | f1 | — | 0 |
| Example | 141 | a2 | b1 | c1 | d1 + d2 (*3) | e1 | f1 | — | 0 |
| Example | 142 | a2 | b1 | c1 | d1 + d2 (*3) | e1 | f1 | — | 0 |
| Example | 143 | a2 | b1 | c1 | d1 + d2 (*3) | e1 | f1 | — | 0 |
| Example | 144 | a2 | b1 | c1 | d1 + d2 (*3) | e1 | f1 | — | 0 |
| Example | 145 | a2 | b1 | c1 | d1 + d2 (*3) | e1 | f1 | — | 0 |
| Example | 146 | a2 | b1 | c1 | d1 + d2 (*3) | e1 | f1 | — | 0 |
| Example | 147 | a2 | b1 | c1 | d1 + d2 (*3) | e1 | f1 | — | 0 |
| Example | 148 | a2 | b1 | c1 | d1 + d2 (*3) | e1 | f1 | — | 0 |
| Example | 149 | a2 | b1 | c1 | d1 + d2 (*3) | e1 | f1 | — | 0 |
| Example | 150 | a2 | b1 | c1 | d1 + d2 (*3) | e1 | f1 | — | 0 |
| Example | 151 | a2 | b1 | c1 | d1 + d2 (*3) | e1 | f1 | — | 0 |
| Example | 152 | a2 | b1 | c1 | d1 + d2 (*3) | e1 | f1 | — | 0 |
| Example | 153 | a2 | b1 | c1 | d1 + d2 (*3) | e1 | f1 | — | 0 |
| Example | 154 | a2 | b1 | c1 | d1 + d2 (*3) | e1 | f1 | — | 0 |
| Example | 155 | a2 | b1 | c1 | d1 + d2 (*3) | e1 | f1 | — | 0 |
| Example | 156 | a2 | b1 | c1 | d1 + d2 (*3) | e1 | f1 | — | 0 |
| Example | 157 | a2 | b1 | c1 | d1 + d2 (*3) | e1 | f1 | — | 0 |
| Example | 158 | a2 | b1 | c1 | d1 + d2 (*3) | e1 | f1 | — | 0 |
| Example | 159 | a2 | b1 | c1 | d1 + d2 (*3) | e1 | f1 | — | 0 |
| Comparative Example | 160 | a2 | b1 | c1 | d1 + d2 (*3) | e1 | f1 | — | 0 |

| | | Surface treatment solution (A) | | | | | | | |
|---|---|---|---|---|---|---|---|---|---|
| | | Composition | | | | | | | |
| | Test level | Component (a) Mass % (*7) | (a/b) Mass ratio | (b/c) Mass ratio | (b/d) Mass ratio | (e/d) Mass ratio | (f/d) Mass ratio | (g) (*8) Mass % | pH |
| Example | 121 | 18 | 1.47 | 0.43 | 1.22 | 0.34 | 0.07 | 0 | 8.4 |
| Example | 122 | 18 | 1.47 | 0.43 | 1.22 | 0.34 | 0.07 | 0 | 8.4 |
| Example | 123 | 18 | 1.47 | 0.43 | 1.22 | 0.34 | 0.07 | 0 | 8.4 |
| Example | 124 | 18 | 1.47 | 0.43 | 1.22 | 0.34 | 0.07 | 0 | 8.4 |
| Example | 125 | 18 | 1.47 | 0.43 | 1.22 | 0.34 | 0.07 | 0 | 8.4 |
| Example | 126 | 18 | 1.47 | 0.43 | 1.22 | 0.34 | 0.07 | 0 | 8.4 |
| Example | 127 | 18 | 1.47 | 0.43 | 1.22 | 0.34 | 0.07 | 0 | 8.4 |
| Example | 128 | 18 | 1.47 | 0.43 | 1.22 | 0.34 | 0.07 | 0 | 8.4 |
| Example | 129 | 18 | 1.47 | 0.43 | 1.22 | 0.34 | 0.07 | 0 | 8.4 |
| Example | 130 | 18 | 1.47 | 0.43 | 1.22 | 0.34 | 0.07 | 0 | 8.4 |
| Example | 131 | 18 | 1.47 | 0.43 | 1.22 | 0.34 | 0.07 | 0 | 8.4 |
| Example | 132 | 18 | 1.47 | 0.43 | 1.22 | 0.34 | 0.07 | 0 | 8.4 |
| Example | 133 | 18 | 1.47 | 0.43 | 1.22 | 0.34 | 0.07 | 0 | 8.4 |
| Example | 134 | 18 | 1.47 | 0.43 | 1.22 | 0.34 | 0.07 | 0 | 8.4 |
| Example | 135 | 18 | 1.47 | 0.43 | 1.22 | 0.34 | 0.07 | 0 | 8.4 |
| Example | 136 | 18 | 1.47 | 0.43 | 1.22 | 0.34 | 0.07 | 0 | 8.4 |
| Example | 137 | 18 | 1.47 | 0.43 | 1.22 | 0.34 | 0.07 | 0 | 8.4 |
| Example | 138 | 18 | 1.47 | 0.43 | 1.22 | 0.34 | 0.07 | 0 | 8.4 |
| Example | 139 | 18 | 1.47 | 0.43 | 1.22 | 0.34 | 0.07 | 0 | 8.4 |
| Example | 140 | 18 | 1.47 | 0.43 | 1.22 | 0.34 | 0.07 | 0 | 8.4 |
| Example | 141 | 18 | 1.47 | 0.43 | 1.22 | 0.34 | 0.07 | 0 | 8.4 |
| Example | 142 | 18 | 1.47 | 0.43 | 1.22 | 0.34 | 0.07 | 0 | 8.4 |
| Example | 143 | 18 | 1.47 | 0.43 | 1.22 | 0.34 | 0.07 | 0 | 8.4 |
| Example | 144 | 18 | 1.47 | 0.43 | 1.22 | 0.34 | 0.07 | 0 | 8.4 |
| Example | 145 | 18 | 1.47 | 0.43 | 1.22 | 0.34 | 0.07 | 0 | 8.4 |
| Example | 146 | 18 | 1.47 | 0.43 | 1.22 | 0.34 | 0.07 | 0 | 8.4 |
| Example | 147 | 18 | 1.47 | 0.43 | 1.22 | 0.34 | 0.07 | 0 | 8.4 |
| Example | 148 | 18 | 1.47 | 0.43 | 1.22 | 0.34 | 0.07 | 0 | 8.4 |
| Example | 149 | 18 | 1.47 | 0.43 | 1.22 | 0.34 | 0.07 | 0 | 8.4 |
| Example | 150 | 18 | 1.47 | 0.43 | 1.22 | 0.34 | 0.07 | 0 | 8.4 |
| Example | 151 | 18 | 1.47 | 0.43 | 1.22 | 0.34 | 0.07 | 0 | 8.4 |
| Example | 152 | 18 | 1.47 | 0.43 | 1.22 | 0.34 | 0.07 | 0 | 8.4 |
| Example | 153 | 18 | 1.47 | 0.43 | 1.22 | 0.34 | 0.07 | 0 | 8.4 |

TABLE 1-4-continued

|  |  |  |  |  |  |  |  |  |  |
|---|---|---|---|---|---|---|---|---|---|
|  | Example | 154 | 18 | 1.47 | 0.43 | 1.22 | 0.34 | 0.07 | 0 | 8.4 |
|  | Example | 155 | 18 | 1.47 | 0.43 | 1.22 | 0.34 | 0.07 | 0 | 8.4 |
|  | Example | 156 | 18 | 1.47 | 0.43 | 1.22 | 0.34 | 0.07 | 0 | 8.4 |
|  | Example | 157 | 18 | 1.47 | 0.43 | 1.22 | 0.34 | 0.07 | 0 | 8.4 |
|  | Example | 158 | 18 | 1.47 | 0.43 | 1.22 | 0.34 | 0.07 | 0 | 8.4 |
|  | Example | 159 | 18 | 1.47 | 0.43 | 1.22 | 0.34 | 0.07 | 0 | 8.4 |
|  | Comparative Example | 160 | 18 | 1.47 | 0.43 | 1.22 | 0.34 | 0.07 | 0 | 8.4 |

Mixing ratio (mass ratio) of (*1) to (*6):

(*1) a1:a2 = 1:1

(*2) c1:c2 = 1:1

(*3) d1:d2 = 9:1

(*4) e1:e2 = 1:1

(*5) f1:f2 = 1:1

(*6) f1:f3 = 1:1

(*7) The ratio (solid content basis) of component (a) (mass in terms of Zr) in surface treatment solution (A)

(*8) The ratio (solid content basis) of component (g) in surface treatment solution (A)

TABLE 1-5

| Test level | | Surface treatment solution (A) Composition | | | | | |
|---|---|---|---|---|---|---|---|
| | | Component (a) Type | Component (b) Type | Component (c) Type | Component (d) Type | Component (e) Type | Component (f) Type |
| Comparative Example | 161 | — | — | — | — | — | — |
| Comparative Example | 162 | — | — | — | — | — | — |
| Comparative Example | 163 | a2 | b1 | c1 | d1 + d2 (*3) | e1 | f1 |
| Comparative Example | 164 | a2 | b1 | c1 | d1 + d2 (*3) | e1 | f1 |
| Example | 165 | a2 | b1 | c1 | d1 + d2 (*3) | e1 | f1 |
| Example | 166 | a2 | b1 | c1 | d1 + d2 (*3) | e1 | f1 |
| Example | 167 | a2 | b1 | c1 | d1 + d2 (*3) | e1 | f1 |
| Example | 168 | a2 | b1 | c1 | d1 + d2 (*3) | e1 | f1 |
| Example | 169 | a2 | b1 | c1 | d1 + d2 (*3) | e1 | f1 |
| Example | 170 | a2 | b1 | c1 | d1 + d2 (*3) | e1 | f1 |
| Example | 171 | a2 | b1 | c1 | d1 + d2 (*3) | e1 | f1 |
| Example | 172 | a2 | b1 | c1 | d1 + d2 (*3) | e1 | f1 |
| Example | 173 | a2 | b1 | c1 | d1 + d2 (*3) | e1 | f1 |
| Example | 174 | a2 | b1 | c1 | d1 + d2 (*3) | e1 | f1 |
| Example | 175 | a2 | b1 | c1 | d1 + d2 (*3) | e1 | f1 |
| Example | 176 | a2 | b1 | c1 | d1 + d2 (*3) | e1 | f1 |
| Example | 177 | a2 | b1 | c1 | d1 + d2 (*3) | e1 | f1 |
| Example | 178 | a2 | b1 | c1 | d1 + d2 (*3) | e1 | f1 |
| Example | 179 | a2 | b1 | c1 | d1 + d2 (*3) | e1 | f1 |
| Example | 180 | a2 | b1 | c1 | d1 + d2 (*3) | e1 | f1 |
| Example | 181 | a2 | b1 | c1 | d1 + d2 (*3) | e1 | f1 |
| Example | 182 | a2 | b1 | c1 | d1 + d2 (*3) | e1 | f1 |
| Example | 183 | a2 | b1 | c1 | d1 + d2 (*3) | e1 | f1 |
| Example | 184 | a2 | b1 | c1 | d1 + d2 (*3) | e1 | f1 |
| Example | 185 | a2 | b1 | c1 | d1 + d2 (*3) | e1 | f1 |
| Example | 186 | a2 | b1 | c1 | d1 + d2 (*3) | e1 | f1 |
| Example | 187 | a2 | b1 | c1 | d1 + d2 (*3) | e1 | f1 |
| Example | 188 | a2 | b1 | c1 | d1 + d2 (*3) | e1 | f1 |
| Example | 189 | a2 | b1 | c1 | d1 + d2 (*3) | e1 | f1 |
| Example | 190 | a2 | b1 | c1 | d1 + d2 (*3) | e1 | f1 |
| Example | 191 | a2 | b1 | c1 | d1 + d2 (*3) | e1 | f1 |
| Example | 192 | a2 | b1 | c1 | d1 + d2 (*3) | e1 | f1 |
| Example | 193 | a2 | b1 | c1 | d1 + d2 (*3) | e1 | f1 |
| Example | 194 | a2 | b1 | c1 | d1 + d2 (*3) | e1 | f1 |
| Example | 195 | a2 | b1 | c1 | d1 + d2 (*3) | e1 | f1 |
| Example | 196 | a2 | b1 | c1 | d1 + d2 (*3) | e1 | f1 |
| Example | 197 | a2 | b1 | c1 | d1 + d2 (*3) | e1 | f1 |
| Example | 198 | a2 | b1 | c1 | d1 + d2 (*3) | e1 | f1 |
| Example | 199 | a2 | b1 | c1 | d1 + d2 (*3) | e1 | f1 |
| Example | 200 | a2 | b1 | c1 | d1 + d2 (*3) | e1 | f1 |
| Example | 201 | a2 | b1 | c1 | d1 + d2 (*3) | e1 | f1 |
| Comparative Example | 202 | a2 | b1 | c1 | d1 + d2 (*3) | e1 | f1 |
| Comparative Example | 203 | a2 | b1 | c1 | d1 + d2 (*3) | e1 | f1 |

TABLE 1-5-continued

| | | Surface treatment solution (A) | | | | | | | | |
|---|---|---|---|---|---|---|---|---|---|---|
| | | Composition | | | | | | | | |
| | | Component (g) | | | | | | | | |
| Test level | | Type | Mixed amount | Component (a) Mass % (*7) | (a/b) Mass ratio | (b/c) Mass ratio | (b/d) Mass ratio | (e/d) Mass ratio | (f/d) Mass ratio | (g) (*8) Mass % | pH |
| Comparative Example | 161 | — | — | — | — | — | — | — | — | — | — |
| Comparative Example | 162 | — | — | — | — | — | — | — | — | — | — |
| Comparative Example | 163 | — | 0 | 18 | 1.47 | 0.43 | 1.22 | 0.34 | 0.07 | 0 | 8.4 |
| Comparative Example | 164 | — | 0 | 18 | 1.47 | 0.43 | 1.22 | 0.34 | 0.07 | 0 | 8.4 |
| Example | 165 | — | 0 | 18 | 1.47 | 0.43 | 1.22 | 0.34 | 0.07 | 0 | 8.4 |
| Example | 166 | — | 0 | 18 | 1.47 | 0.43 | 1.22 | 0.34 | 0.07 | 0 | 8.4 |
| Example | 167 | — | 0 | 18 | 1.47 | 0.43 | 1.22 | 0.34 | 0.07 | 0 | 8.4 |
| Example | 168 | — | 0 | 18 | 1.47 | 0.43 | 1.22 | 0.34 | 0.07 | 0 | 8.4 |
| Example | 169 | — | 0 | 18 | 1.47 | 0.43 | 1.22 | 0.34 | 0.07 | 0 | 8.4 |
| Example | 170 | — | 0 | 18 | 1.47 | 0.43 | 1.22 | 0.34 | 0.07 | 0 | 8.4 |
| Example | 171 | — | 0 | 18 | 1.47 | 0.43 | 1.22 | 0.34 | 0.07 | 0 | 8.4 |
| Example | 172 | — | 0 | 18 | 1.47 | 0.43 | 1.22 | 0.34 | 0.07 | 0 | 8.4 |
| Example | 173 | — | 0 | 18 | 1.47 | 0.43 | 1.22 | 0.34 | 0.07 | 0 | 8.4 |
| Example | 174 | — | 0 | 18 | 1.47 | 0.43 | 1.22 | 0.34 | 0.07 | 0 | 8.4 |
| Example | 175 | — | 0 | 18 | 1.47 | 0.43 | 1.22 | 0.34 | 0.07 | 0 | 8.4 |
| Example | 176 | — | 0 | 18 | 1.47 | 0.43 | 1.22 | 0.34 | 0.07 | 0 | 8.4 |
| Example | 177 | — | 0 | 18 | 1.47 | 0.43 | 1.22 | 0.34 | 0.07 | 0 | 8.4 |
| Example | 178 | — | 0 | 18 | 1.47 | 0.43 | 1.22 | 0.34 | 0.07 | 0 | 8.4 |
| Example | 179 | — | 0 | 18 | 1.47 | 0.43 | 1.22 | 0.34 | 0.07 | 0 | 8.4 |
| Example | 180 | — | 0 | 18 | 1.47 | 0.43 | 1.22 | 0.34 | 0.07 | 0 | 8.4 |
| Example | 181 | — | 0 | 18 | 1.47 | 0.43 | 1.22 | 0.34 | 0.07 | 0 | 8.4 |
| Example | 182 | — | 0 | 18 | 1.47 | 0.43 | 1.22 | 0.34 | 0.07 | 0 | 8.4 |
| Example | 183 | — | 0 | 18 | 1.47 | 0.43 | 1.22 | 0.34 | 0.07 | 0 | 8.4 |
| Example | 184 | — | 0 | 18 | 1.47 | 0.43 | 1.22 | 0.34 | 0.07 | 0 | 8.4 |
| Example | 185 | — | 0 | 18 | 1.47 | 0.43 | 1.22 | 0.34 | 0.07 | 0 | 8.4 |
| Example | 186 | — | 0 | 18 | 1.47 | 0.43 | 1.22 | 0.34 | 0.07 | 0 | 8.4 |
| Example | 187 | — | 0 | 18 | 1.47 | 0.43 | 1.22 | 0.34 | 0.07 | 0 | 8.4 |
| Example | 188 | — | 0 | 18 | 1.47 | 0.43 | 1.22 | 0.34 | 0.07 | 0 | 8.4 |
| Example | 189 | — | 0 | 18 | 1.47 | 0.43 | 1.22 | 0.34 | 0.07 | 0 | 8.4 |
| Example | 190 | — | 0 | 18 | 1.47 | 0.43 | 1.22 | 0.34 | 0.07 | 0 | 8.4 |
| Example | 191 | — | 0 | 18 | 1.47 | 0.43 | 1.22 | 0.34 | 0.07 | 0 | 8.4 |
| Example | 192 | — | 0 | 18 | 1.47 | 0.43 | 1.22 | 0.34 | 0.07 | 0 | 8.4 |
| Example | 193 | — | 0 | 18 | 1.47 | 0.43 | 1.22 | 0.34 | 0.07 | 0 | 8.4 |
| Example | 194 | — | 0 | 18 | 1.47 | 0.43 | 1.22 | 0.34 | 0.07 | 0 | 8.4 |
| Example | 195 | — | 0 | 18 | 1.47 | 0.43 | 1.22 | 0.34 | 0.07 | 0 | 8.4 |
| Example | 196 | — | 0 | 18 | 1.47 | 0.43 | 1.22 | 0.34 | 0.07 | 0 | 8.4 |
| Example | 197 | — | 0 | 18 | 1.47 | 0.43 | 1.22 | 0.34 | 0.07 | 0 | 8.4 |
| Example | 198 | — | 0 | 18 | 1.47 | 0.43 | 1.22 | 0.34 | 0.07 | 0 | 8.4 |
| Example | 199 | — | 0 | 18 | 1.47 | 0.43 | 1.22 | 0.34 | 0.07 | 0 | 8.4 |
| Example | 200 | — | 0 | 18 | 1.47 | 0.43 | 1.22 | 0.34 | 0.07 | 0 | 8.4 |
| Example | 201 | — | 0 | 18 | 1.47 | 0.43 | 1.22 | 0.34 | 0.07 | 0 | 8.4 |
| Comparative Example | 202 | — | 0 | 18 | 1.47 | 0.43 | 1.22 | 0.34 | 0.07 | 0 | 8.4 |
| Comparative Example | 203 | — | 0 | 18 | 1.47 | 0.43 | 1.22 | 0.34 | 0.07 | 0 | 8.4 |

Mixing ratio (mass ratio) of (*1) to (*6):
(*1) a1:a2 = 1:1
(*2) c1:c2 = 1:1
(*3) d1:d2 = 9:1
(*4) e1:e2 = 1:1
(*5) f1:f2 = 1:1
(*6) f1:f3 = 1:1
(*7) The ratio (solid content basis) of component (a) (mass in terms of Zr) in surface treatment solution (A)
(*8) The ratio (solid content basis) of component (g) in surface treatment solution (A)

Hereinafter, the compounds used in Tables 1-1 to 1-5 will be described.

<Water-soluble Zirconium Compound (a)>
a1: sodium zirconium carbonate
a2: ammonium zirconium carbonate
<Tetraalkoxysilane (b)>
b1: tetraethoxysilane
b2: tetramethoxysilane
<Epoxy Group-containing Compound (c)>
c1: γ-glycidoxypropyltriethoxysilane
c2: polyethylene glycol diglycidyl ether
<Chelating Agent (d)>
d1: 1-hydroxymethane-1,1-diphosphonic acid
d2: tartaric acid
<Vanadate Compound (e)>
e1: ammonium metavanadate
e2: sodium metavanadate <Metal Compound (f)> f1: ammonium fluorotitanate f2: aluminum nitrate hexahydrate f3: zinc carbonate

<Nonionic Acrylic Resin Emulsion (g)> g1: styrene-ethylmethacrylate-n-butylacrylate-acrylic acid copolymer (4) Preparation of Surface Treatment Solution (B)

A surface treatment solution (B) was prepared by adding the additives shown in Tables 2-1 to 2-5 to the organic resins (h1 to h7) described below.

Each of the organic resins (h) shown in Tables 2-1 to 2-5 was contained so as to have a concentration of 4 to 10 g/l in the surface treatment solution (B). The amounts of the components (i), (j), and (k) are expressed by a mixing ratio in the base resin (h).

TABLE 2-1

| | | Surface treatment solution (B) | | | |
|---|---|---|---|---|---|
| | | Organic resin | | Additive | Mixing ratio (mass ratio) |
| Test level | | Type | Concentration (*9) | Type | h:(i + j)   h:k |
| Example | 1 | h6 | 10 | — | —   — |
| Example | 2 | h6 | 10 | — | —   — |
| Example | 3 | h6 | 10 | — | —   — |
| Example | 4 | h6 | 10 | — | —   — |
| Example | 5 | h6 | 10 | — | —   — |
| Example | 6 | h6 | 10 | — | —   — |
| Example | 7 | h6 | 10 | — | —   — |
| Example | 8 | h6 | 10 | — | —   — |
| Example | 9 | h6 | 10 | — | —   — |
| Example | 10 | h6 | 10 | — | —   — |
| Example | 11 | h6 | 10 | — | —   — |
| Example | 12 | h6 | 10 | — | —   — |
| Example | 13 | h6 | 10 | — | —   — |
| Example | 14 | h6 | 8 | i1 + j1 (*10) | 100:30   — |
| Example | 15 | h6 | 8 | j2 | 100:30   — |
| Example | 16 | h4 | 10 | — | —   — |
| Example | 17 | h5 | 10 | — | —   — |
| Example | 18 | h6 | 10 | — | —   — |
| Example | 19 | h6 | 10 | — | —   — |
| Example | 20 | h6 | 10 | — | —   — |
| Example | 21 | h6 | 10 | — | —   — |
| Example | 22 | h6 | 10 | — | —   — |
| Example | 23 | h6 | 10 | — | —   — |
| Example | 24 | h6 | 10 | — | —   — |
| Example | 25 | h6 | 10 | — | —   — |
| Example | 26 | h6 | 10 | — | —   — |
| Example | 27 | h6 | 10 | — | —   — |
| Example | 28 | h6 | 10 | — | —   — |
| Example | 29 | h6 | 10 | — | —   — |
| Example | 30 | h6 | 10 | — | —   — |
| Example | 31 | h6 | 10 | — | —   — |
| Example | 32 | h6 | 10 | — | —   — |
| Example | 33 | h6 | 10 | — | —   — |
| Example | 34 | h6 | 10 | — | —   — |
| Example | 35 | h6 | 10 | — | —   — |
| Example | 36 | h6 | 10 | — | —   — |
| Example | 37 | h6 | 10 | — | —   — |
| Example | 38 | h6 | 10 | — | —   — |
| Example | 39 | h6 | 10 | — | —   — |
| Example | 40 | h6 | 8 | i1 + j1 (*10) | 100:30   — |

(*9) Concentration (g/l) of base resin in surface treatment solution (B)
(*10) Mixing ratio (mass ratio) is i1:j1 = 1:1
(*11) Mixing ratio (mass ratio) is i1:j1:l1 = 1:1:0.1
(*12) Mixing ratio (mass ratio) is i1:j1:m1 = 1:1:0.1
(*13) Mixing ratio (mass ratio) is i1:j1:l1:m1 = 1:1:0.1:0.1

TABLE 2-2

| | | Surface treatment solution (B) | | | |
|---|---|---|---|---|---|
| | | Organic resin | | Additive | Mixing ratio (mass ratio) |
| Test level | | Type | Concentration (*9) | Type | h:(i + j)   h:k |
| Example | 41 | h6 | 8 | j2 | 100:30   — |
| Example | 42 | h4 | 10 | — | —   — |
| Example | 43 | h5 | 10 | — | —   — |
| Example | 44 | h6 | 10 | — | —   — |
| Example | 45 | h6 | 10 | — | —   — |
| Example | 46 | h6 | 10 | — | —   — |
| Example | 47 | h6 | 10 | — | —   — |
| Example | 48 | h6 | 10 | — | —   — |
| Example | 49 | h6 | 10 | — | —   — |
| Example | 50 | h6 | 10 | — | —   — |
| Example | 51 | h6 | 10 | — | —   — |
| Example | 52 | h6 | 10 | — | —   — |
| Example | 53 | h6 | 10 | — | —   — |
| Example | 54 | h6 | 10 | — | —   — |
| Example | 55 | h6 | 8 | i1 + j1 (*10) | 100:30   — |
| Example | 56 | h6 | 8 | j2 | 100:30   — |
| Example | 57 | h4 | 10 | — | —   — |
| Example | 58 | h5 | 10 | — | —   — |
| Example | 59 | h6 | 10 | — | —   — |
| Example | 60 | h6 | 10 | — | —   — |
| Example | 61 | h6 | 10 | — | —   — |
| Example | 62 | h6 | 10 | — | —   — |
| Example | 63 | h6 | 10 | — | —   — |
| Example | 64 | h6 | 10 | — | —   — |
| Example | 65 | h6 | 10 | — | —   — |
| Example | 66 | h6 | 10 | — | —   — |
| Example | 67 | h6 | 10 | — | —   — |
| Example | 68 | h6 | 10 | — | —   — |
| Example | 69 | h6 | 10 | — | —   — |
| Example | 70 | h6 | 8 | i1 + j1 (*10) | 100:30   — |
| Example | 71 | h6 | 8 | j2 | 100:30   — |
| Example | 72 | h4 | 10 | — | —   — |
| Example | 73 | h5 | 10 | — | —   — |
| Example | 74 | h6 | 10 | — | —   — |
| Example | 75 | h6 | 10 | — | —   — |
| Example | 76 | h6 | 10 | — | —   — |
| Example | 77 | h6 | 10 | — | —   — |
| Example | 78 | h6 | 10 | — | —   — |
| Example | 79 | h6 | 10 | — | —   — |
| Example | 80 | h6 | 10 | — | —   — |

(*9) Concentration (g/l) of base resin in surface treatment solution (B)
(*10) Mixing ratio (mass ratio) is i1:j1 = 1:1
(*11) Mixing ratio (mass ratio) is i1:j1:l1 = 1:1:0.1
(*12) Mixing ratio (mass ratio) is i1:j1:m1 = 1:1:0.1
(*13) Mixing ratio (mass ratio) is i1:j1:l1:m1 = 1:1:0.1:0.1

TABLE 2-3

| | | Surface treatment solution (B) | | | |
|---|---|---|---|---|---|
| | | Organic resin | | Additive | Mixing ratio (mass ratio) |
| Test level | | Type | Concentration (*9) | Type | h:(i + j)   h:k |
| Example | 81 | h6 | 10 | — | —   — |
| Example | 82 | h6 | 8 | i1 + j1 (*10) | 100:30   — |
| Example | 83 | h6 | 8 | j2 | 100:30   — |
| Example | 84 | h4 | 10 | — | —   — |
| Example | 85 | h5 | 10 | — | —   — |
| Example | 86 | h6 | 10 | — | —   — |
| Example | 87 | h6 | 10 | — | —   — |
| Example | 88 | h6 | 10 | — | —   — |
| Example | 89 | h6 | 10 | — | —   — |
| Example | 90 | h6 | 10 | — | —   — |
| Example | 91 | h6 | 8 | i1 + j1 (*10) | 100:30   — |
| Example | 92 | h6 | 8 | j2 | 100:30   — |
| Example | 93 | h4 | 10 | — | —   — |
| Example | 94 | h5 | 10 | — | —   — |

TABLE 2-3-continued

| Test level | | Type | Organic resin Concentration (*9) | Additive Type | Mixing ratio (mass ratio) h:(i + j) | h:k |
|---|---|---|---|---|---|---|
| Example | 95 | h6 | 10 | — | — | — |
| Example | 96 | h6 | 10 | — | — | — |
| Example | 97 | h6 | 10 | — | — | — |
| Example | 98 | h4 | 10 | — | — | — |
| Example | 99 | h5 | 10 | — | — | — |
| Example | 100 | h6 | 10 | — | — | — |
| Example | 101 | h6 | 10 | — | — | — |
| Example | 102 | h6 | 10 | — | — | — |
| Comparative Example | 103 | h6 | 10 | — | — | — |
| Comparative Example | 104 | h6 | 10 | — | — | — |
| Comparative Example | 105 | h6 | 10 | — | — | — |
| Comparative Example | 106 | h6 | 10 | — | — | — |
| Comparative Example | 107 | h6 | 10 | — | — | — |
| Comparative Example | 108 | h6 | 10 | — | — | — |
| Comparative Example | 109 | h6 | 10 | — | — | — |
| Comparative Example | 110 | h6 | 10 | — | — | — |
| Comparative Example | 111 | h6 | 10 | — | — | — |
| Comparative Example | 112 | h6 | 10 | — | — | — |
| Comparative Example | 113 | h6 | 10 | — | — | — |
| Comparative Example | 114 | h6 | 10 | — | — | — |
| Comparative Example | 115 | h6 | 10 | — | — | — |
| Comparative Example | 116 | h6 | 10 | — | — | — |
| Comparative Example | 117 | h6 | 10 | — | — | — |
| Comparative Example | 118 | h6 | 10 | — | — | — |
| Comparative Example | 119 | h6 | 10 | — | — | — |
| Comparative Example | 120 | h6 | 10 | — | — | — |

(*9) Concentration (g/l) of base resin in surface treatment solution (B)
(*10) Mixing ratio (mass ratio) is i1:j1 = 1:1
(*11) Mixing ratio (mass ratio) is i1:j1:l1 = 1:1:0.1
(*12) Mixing ratio (mass ratio) is i1:j1:m1 = 1:1:0.1
(*13) Mixing ratio (mass ratio) is i1:j1:l1:m1 = 1:1:0.1:0.1

TABLE 2-4

| Test level | | Type | Organic resin Concentration (*9) | Additive Type | Mixing ratio (mass ratio) h:(i + j) | h:k |
|---|---|---|---|---|---|---|
| Example | 121 | h1 | 10 | — | — | — |
| Example | 122 | h2 | 10 | — | — | — |
| Example | 123 | h3 | 10 | — | — | — |
| Example | 124 | h7 | 10 | — | — | — |
| Example | 125 | h3 | 8 | j2 | 100:30 | — |
| Example | 126 | h3 | 8 | i1 + j1 (*10) | 100:30 | — |
| Example | 127 | h3 | 8 | i1 + j1 + l1 (*11) | 100:30 | — |

TABLE 2-4-continued

| Test level | | Type | Organic resin Concentration (*9) | Additive Type | Mixing ratio (mass ratio) h:(i + j) | h:k |
|---|---|---|---|---|---|---|
| Example | 128 | h3 | 8 | i1 + j1 + m1 (*12) | 100:30 | — |
| Example | 129 | h3 | 8 | i1 + j1 + l1 + m1 (*13) | 100:30 | — |
| Example | 130 | h3 | 10 | k1 | — | 100:3 |
| Example | 131 | h3 | 8 | j2 + k1 | 100:30 | 100:3 |
| Example | 132 | h3 | 8 | i1 + j1 (*10) + k1 | 100:30 | 100:3 |
| Example | 133 | h3 | 8 | j3 | 100:30 | — |
| Example | 134 | h3 | 8 | j3 + k1 | 100:30 | 100:3 |
| Example | 135 | h3 | 10 | — | — | — |
| Example | 136 | h3 | 10 | — | — | — |
| Example | 137 | h3 | 10 | — | — | — |
| Example | 138 | h3 | 10 | — | — | — |
| Example | 139 | h3 | 10 | — | — | — |
| Example | 140 | h3 | 10 | — | — | — |
| Example | 141 | h3 | 10 | — | — | — |
| Example | 142 | h3 | 10 | — | — | — |
| Example | 143 | h3 | 10 | — | — | — |
| Example | 144 | h3 | 10 | — | — | — |
| Example | 145 | h3 | 10 | — | — | — |
| Example | 146 | h3 | 10 | — | — | — |
| Example | 147 | h3 | 10 | — | — | — |
| Example | 148 | h3 | 10 | — | — | — |
| Example | 149 | h3 | 10 | — | — | — |
| Example | 150 | h3 | 10 | — | — | — |
| Example | 151 | h3 | 10 | — | — | — |
| Example | 152 | h3 | 10 | — | — | — |
| Example | 153 | h3 | 10 | — | — | — |
| Example | 154 | h4 | 10 | — | — | — |
| Example | 155 | h4 | 10 | — | — | — |
| Example | 156 | h4 | 10 | — | — | — |
| Example | 157 | h4 | 10 | — | — | — |
| Example | 158 | h4 | 10 | — | — | — |
| Example | 159 | h4 | 10 | — | — | — |
| Comparative Example | 160 | — | 0 | — | — | — |

(*9) Concentration (g/l) of base resin in surface treatment solution (B)
(*10) Mixing ratio (mass ratio) is i1:j1 = 1:1
(*11) Mixing ratio (mass ratio) is i1:j1:l1 = 1:1:0.1
(*12) Mixing ratio (mass ratio) is i1:j1:m1 = 1:1:0.1
(*13) Mixing ratio (mass ratio) is i1:j1:l1:m1 = 1:1:0.1:0.1

TABLE 2-5

| Test level | | Type | Organic resin Concentration (*9) | Additive Type | Mixing ratio (mass ratio) h:(i + j) | h:k |
|---|---|---|---|---|---|---|
| Comparative Example | 161 | h3 | 10 | — | — | — |
| Comparative Example | 162 | h4 | 10 | — | — | — |
| Comparative Example | 163 | h3 | 10 | — | — | — |
| Comparative Example | 164 | h4 | 10 | — | — | — |
| Example | 165 | h6 | 10 | j2 | 100:5 | — |
| Example | 166 | h6 | 9 | j2 | 100:10 | — |
| Example | 167 | h6 | 6 | j2 | 100:70 | — |
| Example | 168 | h6 | 5 | j2 | 100:100 | — |
| Example | 169 | h7 | 9 | j2 | 100:10 | — |
| Example | 170 | h7 | 8 | j2 | 100:30 | — |
| Example | 171 | h7 | 6 | j2 | 100:70 | — |

TABLE 2-5-continued

| | | Surface treatment solution (B) | | | |
|---|---|---|---|---|---|
| | | Organic resin | | Mixing ratio | |
| | | | | (mass ratio) | |
| Test level | | Type | Concentration (*9) | Additive Type | h:(i + j) | h:k |
| Example | 172 | h6 | 8 | j1 | 100:30 | — |
| Example | 173 | h6 | 8 | j1 | 100:30 | — |
| Example | 174 | h6 | 9 | i1 + j1 (*10) | 100:10 | — |
| Example | 175 | h6 | 8 | i1 + j1 (*10) | 100:30 | — |
| Example | 176 | h6 | 6 | i1 + j1 (*10) | 100:70 | — |
| Example | 177 | h7 | 9 | i1 + j1 (*10) | 100:10 | — |
| Example | 178 | h7 | 8 | i1 + j1 (*10) | 100:30 | — |
| Example | 179 | h7 | 6 | i1 + j1 (*10) | 100:70 | — |
| Example | 180 | h6 | 10 | j1 | 100:5 | — |
| Example | 181 | h7 | 10 | j1 | 100:5 | — |
| Example | 182 | h6 | 8 | j2 | 100:30 | — |
| Example | 183 | h6 | 8 | j2 | 100:30 | — |
| Example | 184 | h6 | 8 | j2 | 100:30 | — |
| Example | 185 | h6 | 8 | j2 | 100:30 | — |
| Example | 186 | h6 | 8 | j2 | 100:30 | — |
| Example | 187 | h6 | 8 | j2 | 100:30 | — |
| Example | 188 | h6 | 8 | j2 | 100:30 | — |
| Example | 189 | h6 | 8 | j2 | 100:30 | — |
| Example | 190 | h6 | 8 | j2 | 100:30 | — |
| Example | 191 | h6 | 8 | j2 | 100:30 | — |
| Example | 192 | h6 | 8 | j2 | 100:30 | — |
| Example | 193 | h6 | 8 | j2 | 100:30 | — |
| Example | 194 | h6 | 8 | j2 | 100:30 | — |
| Example | 195 | h6 | 8 | j2 | 100:30 | — |
| Example | 196 | h6 | 8 | j2 | 100:30 | — |
| Example | 197 | h6 | 8 | j2 | 100:30 | — |
| Example | 198 | h6 | 8 | j2 | 100:30 | — |
| Example | 199 | h6 | 8 | j2 | 100:30 | — |
| Example | 200 | h6 | 8 | j2 | 100:30 | — |
| Example | 201 | h6 | 4 | j2 | 100:150 | — |
| Comparative Example | 202 | — | 0 | j2 | 0:30 | — |
| Comparative Example | 203 | — | 0 | i1 + j1 (*10) | 0:30 | — |

(*9) Concentration (g/l) of base resin in surface treatment solution (B)
(*10) Mixing ratio (mass ratio) is i1:j1 = 1:1
(*11) Mixing ratio (mass ratio) is i1:j1:l1 = 1:1:0.1
(*12) Mixing ratio (mass ratio) is i1:j1:m1 = 1:1:0.1
(*13) Mixing ratio (mass ratio) is i1:j1:l1:m1 = 1:1:0.1:0.1

Hereinafter, the compounds used in Tables 2-1 to 2-5 will be described.

<Organic Resin: Organic Resin Having No OH Group and/or COOH Group>
h1: polyolefin resin (Manufacturer: TOHO Chemical Industry Co., Ltd., Model: HYTEC S-3121)
h2: fluorocarbon resin (Manufacturer: Asahi Glass Co., Ltd., Model: Lumiflon LF552)

<Organic Resin: Organic Resin (F) Having OH Group and/or COOH Group>
h3: epoxy resin (Manufacturer: Japan Epoxy Resin Co., Ltd., Model: jER1009)
h4: urethane resin (Manufacturer: Dai-Ichi Kogyo Seiyaku Co., Ltd., Model: Superflex E-2000)
h5: alkyd resin (Manufacturer: Hitachi Chemical Company, Ltd., Model: PHTHALKYD W2343)

<Organic Resin: Hydrazine-modified Organic Resin (X)> h6: [Synthetic Example 1]

Into a four-necked flask, 1870 parts by mass of EP828 (manufactured by Yuka Shell Epoxy K.K., epoxy equivalent: 187), 91 parts by mass of bisphenol A, 2 parts by mass of tetraethylammonium bromide, and 300 parts by mass of methyl isobutyl ketone were inserted. The mixture was heated to 140° C. and caused to react for 4 hours to obtain an epoxy resin having an epoxy equivalent of 1391 and a solid content of 90% by mass. After 1500 parts by mass of ethylene glycol monobutyl ether was added thereto, the mixture was cooled to 100° C. Then, 96 parts by mass of 3,5-dimethylpyrazole (molecular weight: 96) and 129 parts by mass of dibutylamine (molecular weight: 129) were added thereto. The mixture was caused to react for 6 hours until epoxy groups disappeared. Then, 205 parts by mass of methyl isobutyl ketone was added thereto with cooling, and thus a pyrazole-modified epoxy resin having a solid content of 60% by mass was obtained. This resin is defined as an organic resin (h6). The organic resin (h6) is a product of an organic resin (C) and an active hydrogen-containing compound (D) that contains 50 mol % of a hydrazine derivative (E) containing active hydrogen.

h7: [Synthetic Example 2]

Into a four-necked flask, 4000 parts by mass of EP1007 (manufactured by Japan Epoxy Resin Co., Ltd., epoxy equivalent: 2000) and 2239 parts by mass of ethylene glycol monobutyl ether were inserted. The mixture was heated to 120° C. to completely dissolve the epoxy resin in 1 hour. The solution was cooled to 100° C. Then, 168 parts by mass of 3-amino-1,2,4-triazole (molecular weight: 84) was added thereto. The mixture was caused to react for 6 hours until epoxy groups disappeared. Then, 540 parts by mass of methyl isobutyl ketone was added thereto with cooling, and thus a triazole-modified epoxy resin having a solid content of 60% by mass was obtained. This resin is defined as an organic resin (h7). The organic resin (h7) is a product of an organic resin (C) and an active hydrogen-containing compound (D) that contains 100 mol % of a hydrazine derivative (E) containing active hydrogen.

Ca Ion-Exchanged Silica (i)>
i1: Ca ion-exchanged silica (Manufacturer: W. R. Grace & Co., Model: SHIELDEX C303)

<Silicon Oxide (j)>
j1: fumed silica (Manufacturer: Nihon Aerosil Co., Ltd., Model: AEROSIL 200)
j2: organosilica sol (Manufacturer: Nissan Chemical Industries Ltd., Model: ORGANOSILICASOL MA-ST-MS)
j3: colloidal silica (Manufacturer: Nissan Chemical Industries Ltd., Model: Snowtex 30)

<Lubricant (k)>
k1: polyethylene wax (Manufacturer: Clariant (Japan) K.K., Model: Ceridust 3620)

<Phosphate (l)>
l1: zinc phosphate

<Molybdate (m)>
m1: aluminum molybdate (5) Method for Producing Galvanized Steel Sheet The surface treatment solution (A) was applied onto one surface of each of the test pieces by bar coating. The resulting test pieces were placed in an induction heating furnace without being washed with water, and dried by heating at drying temperatures shown in Tables 3-1 to 3-5. Consequently, films having thicknesses (μm) shown in Tables 3-1 to 3-5 were formed. Subsequently, the surface treatment solution (B) for forming a second layer film was applied onto a surface of each of the films. The test pieces were placed in the induction heating furnace and dried by heating at drying temperatures shown in Tables 2-1 to 2-5. Consequently, films having thicknesses (μm) shown in Tables 3-1 to 3-5 were formed. Thus, galvanized steel sheets according to invention examples and comparative examples were produced.

The heat-drying temperature was adjusted by controlling induction heating power. Note that, the heat-drying temperature corresponds to the maximum temperature of the surface of the test piece.

A specific bar coating method is described below.

The surface treatment solution was dropped onto the test piece and coating was performed with one of #3 to #5 bar coaters. The thickness of the film was adjusted to thicknesses shown in Tables 3-1 to 3-5 by selecting the size of the bar coater and the concentration of the surface treatment solution.

TABLE 3-1

| Test level | | Test sheet Type | Treatment method of surface treatment solution (A) | | | Treatment method of surface treatment solution (B) | | | Total film thickness μm |
|---|---|---|---|---|---|---|---|---|---|
| | | | Coating method Type | Film thickness μm | Drying temperature °C. | Coating method Type | Film thickness μm | Drying temperature °C. | |
| Ex. | 1 | (i) | Bar coating | 0.15 | 140 | Bar coating | 0.5 | 140 | 0.65 |
| Ex. | 2 | (i) | Bar coating | 0.15 | 140 | Bar coating | 0.5 | 140 | 0.65 |
| Ex. | 3 | (i) | Bar coating | 0.15 | 140 | Bar coating | 0.5 | 140 | 0.65 |
| Ex. | 4 | (i) | Bar coating | 0.15 | 140 | Bar coating | 0.5 | 140 | 0.65 |
| Ex. | 5 | (i) | Bar coating | 0.15 | 140 | Bar coating | 0.5 | 140 | 0.65 |
| Ex. | 6 | (i) | Bar coating | 0.15 | 140 | Bar coating | 0.5 | 140 | 0.65 |
| Ex. | 7 | (i) | Bar coating | 0.15 | 140 | Bar coating | 0.5 | 140 | 0.65 |
| Ex. | 8 | (i) | Bar coating | 0.15 | 140 | Bar coating | 0.5 | 140 | 0.65 |
| Ex. | 9 | (i) | Bar coating | 0.15 | 140 | Bar coating | 0.5 | 140 | 0.65 |
| Ex. | 10 | (i) | Bar coating | 0.15 | 140 | Bar coating | 0.5 | 140 | 0.65 |
| Ex. | 11 | (i) | Bar coating | 0.15 | 140 | Bar coating | 0.5 | 140 | 0.65 |
| Ex. | 12 | (i) | Bar coating | 0.15 | 140 | Bar coating | 0.5 | 140 | 0.65 |
| Ex. | 13 | (i) | Bar coating | 0.15 | 140 | Bar coating | 0.5 | 140 | 0.65 |
| Ex. | 14 | (i) | Bar coating | 0.15 | 140 | Bar coating | 0.5 | 140 | 0.65 |
| Ex. | 15 | (i) | Bar coating | 0.15 | 140 | Bar coating | 0.5 | 140 | 0.65 |
| Ex. | 16 | (i) | Bar coating | 0.15 | 140 | Bar coating | 0.5 | 140 | 0.65 |
| Ex. | 17 | (i) | Bar coating | 0.15 | 140 | Bar coating | 0.5 | 140 | 0.65 |
| Ex. | 18 | (ii) | Bar coating | 0.15 | 140 | Bar coating | 0.5 | 140 | 0.65 |
| Ex. | 19 | (iii) | Bar coating | 0.15 | 140 | Bar coating | 0.5 | 140 | 0.65 |
| Ex. | 20 | (i) | Bar coating | 0.15 | 140 | Bar coating | 0.5 | 140 | 0.65 |
| Ex. | 21 | (i) | Bar coating | 0.15 | 140 | Bar coating | 0.5 | 140 | 0.65 |
| Ex. | 22 | (i) | Bar coating | 0.15 | 140 | Bar coating | 0.5 | 140 | 0.65 |
| Ex. | 23 | (i) | Bar coating | 0.15 | 140 | Bar coating | 0.5 | 140 | 0.65 |
| Ex. | 24 | (i) | Bar coating | 0.15 | 140 | Bar coating | 0.5 | 140 | 0.65 |
| Ex. | 25 | (i) | Bar coating | 0.15 | 140 | Bar coating | 0.5 | 140 | 0.65 |
| Ex. | 26 | (i) | Bar coating | 0.15 | 140 | Bar coating | 0.5 | 140 | 0.65 |
| Ex. | 27 | (i) | Bar coating | 0.15 | 140 | Bar coating | 0.5 | 140 | 0.65 |
| Ex. | 28 | (i) | Bar coating | 0.15 | 140 | Bar coating | 0.5 | 140 | 0.65 |
| Ex. | 29 | (i) | Bar coating | 0.15 | 140 | Bar coating | 0.5 | 140 | 0.65 |
| Ex. | 30 | (i) | Bar coating | 0.15 | 140 | Bar coating | 0.5 | 140 | 0.65 |
| Ex. | 31 | (i) | Bar coating | 0.15 | 140 | Bar coating | 0.5 | 140 | 0.65 |
| Ex. | 32 | (i) | Bar coating | 0.15 | 140 | Bar coating | 0.5 | 140 | 0.65 |
| Ex. | 33 | (i) | Bar coating | 0.15 | 140 | Bar coating | 0.5 | 140 | 0.65 |
| Ex. | 34 | (i) | Bar coating | 0.15 | 140 | Bar coating | 0.5 | 140 | 0.65 |
| Ex. | 35 | (i) | Bar coating | 0.15 | 140 | Bar coating | 0.5 | 140 | 0.65 |
| Ex. | 36 | (i) | Bar coating | 0.15 | 140 | Bar coating | 0.5 | 140 | 0.65 |
| Ex. | 37 | (i) | Bar coating | 0.15 | 140 | Bar coating | 0.5 | 140 | 0.65 |
| Ex. | 38 | (i) | Bar coating | 0.15 | 140 | Bar coating | 0.5 | 140 | 0.65 |
| Ex. | 39 | (i) | Bar coating | 0.15 | 140 | Bar coating | 0.5 | 140 | 0.65 |
| Ex. | 40 | (i) | Bar coating | 0.15 | 140 | Bar coating | 0.5 | 140 | 0.65 |

Ex.: Example
C.E.: Comparative Example

TABLE 3-2

| Testl evel | | Test sheet Type | Treatment method of surface treatment solution (A) | | | Treatment method of surface treatment solution (B) | | | Total film thickness μm |
|---|---|---|---|---|---|---|---|---|---|
| | | | Coating method Type | Film thickness μm | Drying temperature °C. | Coating method Type | Film thickness μm | Drying temperature °C. | |
| Ex. | 41 | (i) | Bar coating | 0.15 | 140 | Bar coating | 0.5 | 140 | 0.65 |
| Ex. | 42 | (i) | Bar coating | 0.15 | 140 | Bar coating | 0.5 | 140 | 0.65 |
| Ex. | 43 | (i) | Bar coating | 0.15 | 140 | Bar coating | 0.5 | 140 | 0.65 |
| Ex. | 44 | (i) | Bar coating | 0.15 | 140 | Bar coating | 0.5 | 140 | 0.65 |
| Ex. | 45 | (i) | Bar coating | 0.15 | 140 | Bar coating | 0.5 | 140 | 0.65 |
| Ex. | 46 | (i) | Bar coating | 0.15 | 140 | Bar coating | 0.5 | 140 | 0.65 |
| Ex. | 47 | (i) | Bar coating | 0.15 | 140 | Bar coating | 0.5 | 140 | 0.65 |
| Ex. | 48 | (i) | Bar coating | 0.15 | 140 | Bar coating | 0.5 | 140 | 0.65 |
| Ex. | 49 | (i) | Bar coating | 0.15 | 140 | Bar coating | 0.5 | 140 | 0.65 |
| Ex. | 50 | (i) | Bar coating | 0.01 | 140 | Bar coating | 0.5 | 140 | 0.51 |

TABLE 3-2-continued

| Test level | | Test sheet Type | Treatment method of surface treatment solution (A) | | | Treatment method of surface treatment solution (B) | | | Total film thickness μm |
|---|---|---|---|---|---|---|---|---|---|
| | | | Coating method Type | Film thickness μm | Drying temperature ° C. | Coating method Type | Film thickness μm | Drying temperature ° C. | |
| Ex. | 51 | (i) | Bar coating | 0.05 | 140 | Bar coating | 0.5 | 140 | 0.55 |
| Ex. | 52 | (i) | Bar coating | 0.10 | 140 | Bar coating | 0.5 | 140 | 0.60 |
| Ex. | 53 | (i) | Bar coating | 0.20 | 140 | Bar coating | 0.5 | 140 | 0.70 |
| Ex. | 54 | (i) | Bar coating | 0.30 | 140 | Bar coating | 0.5 | 140 | 0.80 |
| Ex. | 55 | (i) | Bar coating | 0.30 | 140 | Bar coating | 0.5 | 140 | 0.80 |
| Ex. | 56 | (i) | Bar coating | 0.30 | 140 | Bar coating | 0.5 | 140 | 0.80 |
| Ex. | 57 | (i) | Bar coating | 0.30 | 140 | Bar coating | 0.5 | 140 | 0.80 |
| Ex. | 58 | (i) | Bar coating | 0.30 | 140 | Bar coating | 0.5 | 140 | 0.80 |
| Ex. | 59 | (i) | Bar coating | 0.50 | 140 | Bar coating | 0.5 | 140 | 1.00 |
| Ex. | 60 | (i) | Bar coating | 0.80 | 140 | Bar coating | 0.5 | 140 | 1.30 |
| Ex. | 61 | (i) | Bar coating | 0.15 | 140 | Bar coating | 0.5 | 140 | 0.65 |
| Ex. | 62 | (i) | Bar coating | 0.15 | 140 | Bar coating | 0.5 | 140 | 0.65 |
| Ex. | 63 | (i) | Bar coating | 0.15 | 140 | Bar coating | 0.5 | 140 | 0.65 |
| Ex. | 64 | (i) | Bar coating | 0.15 | 140 | Bar coating | 0.5 | 140 | 0.65 |
| Ex. | 65 | (i) | Bar coating | 0.15 | 140 | Bar coating | 0.5 | 140 | 0.65 |
| Ex. | 66 | (i) | Bar coating | 0.15 | 140 | Bar coating | 0.5 | 140 | 0.65 |
| Ex. | 67 | (i) | Bar coating | 0.15 | 140 | Bar coating | 0.5 | 140 | 0.65 |
| Ex. | 68 | (i) | Bar coating | 0.15 | 140 | Bar coating | 0.5 | 140 | 0.65 |
| Ex. | 69 | (i) | Bar coating | 0.15 | 140 | Bar coating | 0.5 | 140 | 0.65 |
| Ex. | 70 | (i) | Bar coating | 0.15 | 140 | Bar coating | 0.5 | 140 | 0.65 |
| Ex. | 71 | (i) | Bar coating | 0.15 | 140 | Bar coating | 0.5 | 140 | 0.65 |
| Ex. | 72 | (i) | Bar coating | 0.15 | 140 | Bar coating | 0.5 | 140 | 0.65 |
| Ex. | 73 | (i) | Bar coating | 0.15 | 140 | Bar coating | 0.5 | 140 | 0.65 |
| Ex. | 74 | (i) | Bar coating | 0.15 | 40 | Bar coating | 0.5 | 140 | 0.65 |
| Ex. | 75 | (i) | Bar coating | 0.15 | 60 | Bar coating | 0.5 | 140 | 0.65 |
| Ex. | 76 | (i) | Bar coating | 0.15 | 60 | Bar coating | 0.5 | 140 | 0.65 |
| Ex. | 77 | (i) | Bar coating | 0.15 | 80 | Bar coating | 0.5 | 140 | 0.65 |
| Ex. | 78 | (i) | Bar coating | 0.15 | 180 | Bar coating | 0.5 | 140 | 0.65 |
| Ex. | 79 | (i) | Bar coating | 0.15 | 200 | Bar coating | 0.5 | 140 | 0.65 |
| Ex. | 80 | (i) | Bar coating | 0.15 | 250 | Bar coating | 0.5 | 140 | 0.65 |

Ex.: Example
C.E.: Comparative Example

TABLE 3-3

| Test level | | Test sheet Type | Treatment method of surface treatment solution (A) | | | Treatment method of surface treatment solution (B) | | | Total film thickness μm |
|---|---|---|---|---|---|---|---|---|---|
| | | | Coating method Type | Film thickness μm | Drying temperature ° C. | Coating method Type | Film thickness μm | Drying temperature ° C. | |
| Ex. | 81 | (i) | Bar coating | 0.15 | 140 | Bar coating | 0.5 | 140 | 0.65 |
| Ex. | 82 | (i) | Bar coating | 0.15 | 140 | Bar coating | 0.5 | 140 | 0.65 |
| Ex. | 83 | (i) | Bar coating | 0.15 | 140 | Bar coating | 0.5 | 140 | 0.65 |
| Ex. | 84 | (i) | Bar coating | 0.15 | 140 | Bar coating | 0.5 | 140 | 0.65 |
| Ex. | 85 | (i) | Bar coating | 0.15 | 140 | Bar coating | 0.5 | 140 | 0.65 |
| Ex. | 86 | (i) | Bar coating | 0.15 | 140 | Bar coating | 0.5 | 140 | 0.65 |
| Ex. | 87 | (i) | Bar coating | 0.15 | 140 | Bar coating | 0.5 | 140 | 0.65 |
| Ex. | 88 | (i) | Bar coating | 0.15 | 140 | Bar coating | 0.5 | 140 | 0.65 |
| Ex. | 89 | (i) | Bar coating | 0.15 | 140 | Bar coating | 0.5 | 140 | 0.65 |
| Ex. | 90 | (i) | Bar coating | 0.15 | 140 | Bar coating | 0.5 | 140 | 0.65 |
| Ex. | 91 | (i) | Bar coating | 0.15 | 140 | Bar coating | 0.5 | 140 | 0.65 |
| Ex. | 92 | (i) | Bar coating | 0.15 | 140 | Bar coating | 0.5 | 140 | 0.65 |
| Ex. | 93 | (i) | Bar coating | 0.15 | 140 | Bar coating | 0.5 | 140 | 0.65 |
| Ex. | 94 | (i) | Bar coating | 0.15 | 140 | Bar coating | 0.5 | 140 | 0.65 |
| Ex. | 95 | (i) | Bar coating | 0.30 | 140 | Bar coating | 0.5 | 140 | 0.80 |
| Ex. | 96 | (i) | Bar coating | 0.50 | 140 | Bar coating | 0.5 | 140 | 1.00 |
| Ex. | 97 | (i) | Bar coating | 0.80 | 140 | Bar coating | 0.5 | 140 | 1.30 |
| Ex. | 98 | (i) | Bar coating | 0.15 | 140 | Bar coating | 0.5 | 140 | 0.65 |
| Ex. | 99 | (i) | Bar coating | 0.15 | 140 | Bar coating | 0.5 | 140 | 0.65 |
| Ex. | 100 | (i) | Bar coating | 0.15 | 140 | Bar coating | 0.5 | 140 | 0.65 |
| Ex. | 101 | (i) | Bar coating | 0.15 | 140 | Bar coating | 0.5 | 140 | 0.65 |
| Ex. | 102 | (i) | Bar coating | 0.15 | 140 | Bar coating | 0.5 | 140 | 0.65 |
| C.E. | 103 | (i) | Bar coating | 0.15 | 140 | Bar coating | 0.5 | 140 | 0.65 |
| C.E. | 104 | (i) | Bar coating | 0.15 | 140 | Bar coating | 0.5 | 140 | 0.65 |
| C.E. | 105 | (i) | Bar coating | 0.15 | 140 | Bar coating | 0.5 | 140 | 0.65 |
| C.E. | 106 | (i) | Bar coating | 0.15 | 140 | Bar coating | 0.5 | 140 | 0.65 |
| C.E. | 107 | (i) | Bar coating | 0.15 | 140 | Bar coating | 0.5 | 140 | 0.65 |

TABLE 3-3-continued

| | | | Treatment method of surface treatment solution (A) | | | Treatment method of surface treatment solution (B) | | | |
|---|---|---|---|---|---|---|---|---|---|
| Test level | | Test sheet Type | Coating method Type | Film thickness μm | Drying temperature ° C. | Coating method Type | Film thickness μm | Drying temperature ° C. | Total film thickness μm |
| C.E. | 108 | (i) | Bar coating | 0.15 | 140 | Bar coating | 0.5 | 140 | 0.65 |
| C.E. | 109 | (i) | Bar coating | 0.15 | 140 | Bar coating | 0.5 | 140 | 0.65 |
| C.E. | 110 | (i) | Bar coating | — | 140 | Bar coating | — | 140 | — |
| C.E. | 111 | (i) | Bar coating | 0.15 | 140 | Bar coating | 0.5 | 140 | 0.65 |
| C.E. | 112 | (i) | Bar coating | 0.15 | 140 | Bar coating | 0.5 | 140 | 0.65 |
| C.E. | 113 | (i) | Bar coating | 0.15 | 140 | Bar coating | 0.5 | 140 | 0.65 |
| C.E. | 114 | (i) | Bar coating | 0.15 | 140 | Bar coating | 0.5 | 140 | 0.65 |
| C.E. | 115 | (i) | Bar coating | 0.15 | 140 | Bar coating | 0.5 | 140 | 0.65 |
| C.E. | 116 | (i) | Bar coating | 0.15 | 140 | Bar coating | 0.5 | 140 | 0.65 |
| C.E. | 117 | (i) | Bar coating | 0.15 | 140 | Bar coating | 0.5 | 140 | 0.65 |
| C.E. | 118 | (i) | Bar coating | — | 140 | Bar coating | — | 140 | — |
| C.E. | 119 | (i) | Bar coating | 0.15 | 140 | Bar coating | 0.5 | 140 | 0.65 |
| C.E. | 120 | (i) | Bar coating | 0.15 | 140 | Bar coating | 0.5 | 140 | 0.65 |

Ex.: Example
C.E.: Comparative Example

TABLE 3-4

| | | | Treatment method of surface treatment solution (A) | | | Treatment method of surface treatment solution (B) | | | |
|---|---|---|---|---|---|---|---|---|---|
| Test level | | Test sheet Type | Coating method Type | Film thickness μm | Drying temperature ° C. | Coating method Type | Film thickness μm | Drying temperature ° C. | Total film thickness μm |
| Ex. | 121 | (i) | Bar coating | 0.15 | 140 | Bar coating | 0.5 | 140 | 0.65 |
| Ex. | 122 | (i) | Bar coating | 0.15 | 140 | Bar coating | 0.5 | 140 | 0.65 |
| Ex. | 123 | (i) | Bar coating | 0.15 | 140 | Bar coating | 0.5 | 140 | 0.65 |
| Ex. | 124 | (i) | Bar coating | 0.15 | 140 | Bar coating | 0.5 | 140 | 0.65 |
| Ex. | 125 | (i) | Bar coating | 0.15 | 140 | Bar coating | 0.5 | 140 | 0.65 |
| Ex. | 126 | (i) | Bar coating | 0.15 | 140 | Bar coating | 0.5 | 140 | 0.65 |
| Ex. | 127 | (i) | Bar coating | 0.15 | 140 | Bar coating | 0.5 | 140 | 0.65 |
| Ex. | 128 | (i) | Bar coating | 0.15 | 140 | Bar coating | 0.50 | 140 | 0.65 |
| Ex. | 129 | (i) | Bar coating | 0.15 | 140 | Bar coating | 0.50 | 140 | 0.65 |
| Ex. | 130 | (i) | Bar coating | 0.15 | 140 | Bar coating | 0.50 | 140 | 0.65 |
| Ex. | 131 | (i) | Bar coating | 0.15 | 140 | Bar coating | 0.50 | 140 | 0.65 |
| Ex. | 132 | (i) | Bar coating | 0.15 | 140 | Bar coating | 0.50 | 140 | 0.65 |
| Ex. | 133 | (i) | Bar coating | 0.15 | 140 | Bar coating | 0.50 | 140 | 0.65 |
| Ex. | 134 | (i) | Bar coating | 0.15 | 140 | Bar coating | 0.50 | 140 | 0.65 |
| Ex. | 135 | (i) | Bar coating | 0.15 | 140 | Bar coating | 0.01 | 140 | 0.16 |
| Ex. | 136 | (i) | Bar coating | 0.15 | 140 | Bar coating | 0.05 | 140 | 0.20 |
| Ex. | 137 | (i) | Bar coating | 0.15 | 140 | Bar coating | 0.10 | 140 | 0.25 |
| Ex. | 138 | (i) | Bar coating | 0.15 | 140 | Bar coating | 0.30 | 140 | 0.45 |
| Ex. | 139 | (i) | Bar coating | 0.15 | 140 | Bar coating | 1.00 | 140 | 1.15 |
| Ex. | 140 | (i) | Bar coating | 0.15 | 140 | Bar coating | 2.00 | 140 | 2.15 |
| Ex. | 141 | (i) | Bar coating | 0.10 | 140 | Bar coating | 0.30 | 140 | 0.40 |
| Ex. | 142 | (i) | Bar coating | 0.10 | 140 | Bar coating | 1.00 | 140 | 1.10 |
| Ex. | 143 | (i) | Bar coating | 0.20 | 140 | Bar coating | 0.30 | 140 | 0.50 |
| Ex. | 144 | (i) | Bar coating | 0.20 | 140 | Bar coating | 1.00 | 140 | 1.20 |
| Ex. | 145 | (i) | Bar coating | 0.05 | 140 | Bar coating | 2.50 | 140 | 2.55 |
| Ex. | 146 | (i) | Bar coating | 0.50 | 140 | Bar coating | 0.01 | 140 | 0.51 |
| Ex. | 147 | (i) | Bar coating | 0.50 | 140 | Bar coating | 2.50 | 140 | 3.00 |
| Ex. | 148 | (i) | Bar coating | 0.01 | 140 | Bar coating | 0.01 | 140 | 0.02 |
| Ex. | 149 | (i) | Bar coating | 0.15 | 140 | Bar coating | 0.50 | 50 | 0.65 |
| Ex. | 150 | (i) | Bar coating | 0.15 | 140 | Bar coating | 0.50 | 100 | 0.65 |
| Ex. | 151 | (i) | Bar coating | 0.15 | 140 | Bar coating | 0.50 | 200 | 0.65 |
| Ex. | 152 | (i) | Bar coating | 0.15 | 140 | Bar coating | 0.50 | 250 | 0.65 |
| Ex. | 153 | (i) | Bar coating | 0.15 | 140 | Bar coating | 0.50 | 350 | 0.65 |
| Ex. | 154 | (i) | Bar coating | 0.15 | 140 | Bar coating | 0.30 | 140 | 0.45 |
| Ex. | 155 | (i) | Bar coating | 0.15 | 140 | Bar coating | 1.00 | 140 | 1.15 |
| Ex. | 156 | (i) | Bar coating | 0.10 | 140 | Bar coating | 0.30 | 140 | 0.40 |
| Ex. | 157 | (i) | Bar coating | 0.10 | 140 | Bar coating | 1.00 | 140 | 1.10 |
| Ex. | 158 | (i) | Bar coating | 0.20 | 140 | Bar coating | 0.30 | 140 | 0.50 |
| Ex. | 159 | (i) | Bar coating | 0.20 | 140 | Bar coating | 1.00 | 140 | 1.20 |
| C.E. | 160 | (i) | Bar coating | 0.15 | 140 | — | 0 | — | 0.15 |

Ex.: Example
C.E.: Comparative Example

TABLE 3-5

|  | Test level | Test sheet Type | Treatment method of surface treatment solution (A) | | | | Treatment method of surface treatment solution (B) | | | Total film thickness μm |
|---|---|---|---|---|---|---|---|---|---|---|
|  |  |  | Coating method Type | Film thickness μm | Drying temperature ° C. | | Coating method Type | Film thickness μm | Drying temperature ° C. |  |
| C.E. | 161 | (i) | — | 0 | — | | Bar coating | 0.50 | 140 | 0.50 |
| C.E. | 162 | (i) | — | 0 | — | | Bar coating | 0.50 | 140 | 0.50 |
| C.E. | 163 | (i) | Bar coating | 0.15 | 140 | | Bar coating | 3.00 | 140 | 3.15 |
| C.E. | 164 | (i) | Bar coating | 0.15 | 140 | | Bar coating | 3.00 | 140 | 3.15 |
| Ex. | 165 | (i) | Bar coating | 0.15 | 140 | | Bar coating | 0.50 | 140 | 0.65 |
| Ex. | 166 | (i) | Bar coating | 0.15 | 140 | | Bar coating | 0.50 | 140 | 0.65 |
| Ex. | 167 | (i) | Bar coating | 0.15 | 140 | | Bar coating | 0.50 | 140 | 0.65 |
| Ex. | 168 | (i) | Bar coating | 0.15 | 140 | | Bar coating | 0.50 | 140 | 0.65 |
| Ex. | 169 | (i) | Bar coating | 0.15 | 140 | | Bar coating | 0.50 | 140 | 0.65 |
| Ex. | 170 | (i) | Bar coating | 0.15 | 140 | | Bar coating | 0.50 | 140 | 0.65 |
| Ex. | 171 | (i) | Bar coating | 0.15 | 140 | | Bar coating | 0.50 | 140 | 0.65 |
| Ex. | 172 | (i) | Bar coating | 0.15 | 140 | | Bar coating | 0.50 | 140 | 0.65 |
| Ex. | 173 | (i) | Bar coating | 0.15 | 140 | | Bar coating | 0.50 | 140 | 0.65 |
| Ex. | 174 | (i) | Bar coating | 0.15 | 140 | | Bar coating | 0.50 | 140 | 0.65 |
| Ex. | 175 | (i) | Bar coating | 0.15 | 140 | | Bar coating | 0.50 | 140 | 0.65 |
| Ex. | 176 | (i) | Bar coating | 0.15 | 140 | | Bar coating | 0.50 | 140 | 0.65 |
| Ex. | 177 | (i) | Bar coating | 0.15 | 140 | | Bar coating | 0.50 | 140 | 0.65 |
| Ex. | 178 | (i) | Bar coating | 0.15 | 140 | | Bar coating | 0.50 | 140 | 0.65 |
| Ex. | 179 | (i) | Bar coating | 0.15 | 140 | | Bar coating | 0.50 | 140 | 0.65 |
| Ex. | 180 | (i) | Bar coating | 0.15 | 140 | | Bar coating | 0.50 | 140 | 0.65 |
| Ex. | 181 | (i) | Bar coating | 0.15 | 140 | | Bar coating | 0.50 | 140 | 0.65 |
| Ex. | 182 | (i) | Bar coating | 0.15 | 140 | | Bar coating | 0.01 | 140 | 0.16 |
| Ex. | 183 | (i) | Bar coating | 0.15 | 140 | | Bar coating | 0.05 | 140 | 0.20 |
| Ex. | 184 | (i) | Bar coating | 0.15 | 140 | | Bar coating | 0.10 | 140 | 0.25 |
| Ex. | 185 | (i) | Bar coating | 0.15 | 140 | | Bar coating | 0.30 | 140 | 0.45 |
| Ex. | 186 | (i) | Bar coating | 0.15 | 140 | | Bar coating | 1.00 | 140 | 1.15 |
| Ex. | 187 | (i) | Bar coating | 0.15 | 140 | | Bar coating | 2.00 | 140 | 2.15 |
| Ex. | 188 | (i) | Bar coating | 0.10 | 140 | | Bar coating | 0.30 | 140 | 0.40 |
| Ex. | 189 | (i) | Bar coating | 0.10 | 140 | | Bar coating | 1.00 | 140 | 1.10 |
| Ex. | 190 | (i) | Bar coating | 0.20 | 140 | | Bar coating | 0.30 | 140 | 0.50 |
| Ex. | 191 | (i) | Bar coating | 0.20 | 140 | | Bar coating | 1.00 | 140 | 1.20 |
| Ex. | 192 | (i) | Bar coating | 0.05 | 140 | | Bar coating | 2.50 | 140 | 2.55 |
| Ex. | 193 | (i) | Bar coating | 0.50 | 140 | | Bar coating | 0.01 | 140 | 0.51 |
| Ex. | 194 | (i) | Bar coating | 0.50 | 140 | | Bar coating | 2.50 | 140 | 3.00 |
| Ex. | 195 | (i) | Bar coating | 0.01 | 140 | | Bar coating | 0.01 | 140 | 0.02 |
| Ex. | 196 | (i) | Bar coating | 0.15 | 140 | | Bar coating | 0.50 | 50 | 0.65 |
| Ex. | 197 | (i) | Bar coating | 0.15 | 140 | | Bar coating | 0.50 | 100 | 0.65 |
| Ex. | 198 | (i) | Bar coating | 0.15 | 140 | | Bar coating | 0.50 | 200 | 0.65 |
| Ex. | 199 | (i) | Bar coating | 0.15 | 140 | | Bar coating | 0.50 | 250 | 0.65 |
| Ex. | 200 | (i) | Bar coating | 0.15 | 140 | | Bar coating | 0.50 | 350 | 0.65 |
| Ex. | 201 | (i) | Bar coating | 0.15 | 140 | | Bar coating | 0.50 | 140 | 0.65 |
| C.E. | 202 | (i) | Bar coating | 0.15 | 140 | | Bar coating | 0.50 | 140 | 0.65 |
| C.E. | 203 | (i) | Bar coating | 0.15 | 140 | | Bar coating | 0.50 | 140 | 0.65 |

Ex.: Example
C.E.: Comparative Example (6) Evaluation Test Method
(6-1) Evaluation of Corrosion Resistance Each of the test sheets having a two-layer film formed thereon was cut into test pieces each having a size of 70×150 mm. The back surface and ends of each of the test pieces were masked with a vinyl tape. The test piece was subjected to a salt-spray test (SST) complying with JIS-Z-2371-2000. The corrosion resistance was evaluated on the basis of the length of time until the white rust area percentage reached 5% during the salt-water spray test. Evaluation criteria are described below.

Evaluation Criteria

Excellent: The length of time until the white rust area percentage reaches 5% is 192 hours or longer.

Good: The length of time until the white rust area percentage reaches 5% is 156 hours or longer and shorter than 192 hours.

Satisfactory: The length of time until the white rust area percentage reaches 5% is 132 hours or longer and shorter than 156 hours.

Fair: The length of time until the white rust area percentage reaches 5% is 72 hours or longer and shorter than 132 hours.

Poor: The length of time until the white rust area percentage reaches 5% is shorter than 72 hours.

(6-2) Evaluation of Overcoatability (Adhesion)

A commercially available melamine alkyd paint was applied onto a test piece having the same size as that of the above-described test piece so that the coating film baked at 140° C. for 30 minutes had a thickness of 30 μm. The test piece was then immersed in boiling water for 2 hours. Cuts extending to base steel were made on a surface of the test piece with an NT cutter to form a grid pattern divided into 100 sections each having a size of 1 mm×1 mm. The test piece was subjected to cupping by 5 mm with an Erichsen cupping machine so that the cut portion faced outward. The Erichsen cupping conditions were in conformity with JIS-Z-2247-2006 (Erichsen value symbol: IE) and the punch diameter was 20 mm, the die diameter was 27 mm, and the drawing width was 27 mm. After the Erichsen cupping, a tape peel test was performed to evaluate the overcoatability (adhesion) on the basis of the state of the remaining coating film. Evaluation criteria are described below.

Evaluation Criteria
  Excellent: Peeled area is zero and less than 5%.
  Good: Peeled area is 5% or more and less than 10%.
  Fair: Peeled area is 10% or more and less than 20%.
  Poor: Peeled area is 20% or more.
  (6-3) Evaluation of continuity
  The surface resistance of the test piece above was measured using an ESP probe of Loresta GP manufactured by Mitsubishi Chemical Analytech Co., Ltd. The surface resistance was measured while a load on the probe was increased in increments of 50 g. The continuity was evaluated by determining the minimum load that achieved a surface resistance of $10^{-4}$ Ω or less.
  Excellent: The average load at 10 points is less than 350 g.
  Good: The average load at 10 points is 350 g or more and less than 600 g.
  Satisfactory: The average load at 10 points is 600 g or more and less than 800 g.
  Fair: The average load at 10 points is 800 g or more and less than 950 g.
  Poor: The average load at 10 points is 950 g or more.
(6-4) Evaluation of Storage Stability
  The surface treatment solutions (A) having the compositions described in Tables 1-1 to 1-5 were stored in a constant temperature oven set at 40° C. for 30 days. The appearance of the surface treatment solutions was visually evaluated.
  Excellent: No change is observed.
  Good: Very small amount of precipitate is observed.
  Fair: Small amount of precipitate is observed, or viscosity is slightly increased.
  Poor: Large amount of precipitate is observed, or gelation occurs.
(6-5) Evaluation of Lubricity
  Each of the test sheets having a two-layer film formed thereon was cut into disc-shaped test pieces having a diameter of 100 mm. The test pieces were each formed into a cup under the conditions: a punch diameter of 50 mm, a die diameter of 51.91 mm, and a blank holding force of 1 ton. The appearance of the drawn surface of the formed product (side surface of the cup) was visually inspected and was evaluated on the basis of the degrees of scratches and blackening. Evaluation criteria are described below.
  Excellent: Uniform appearance (almost no change over the entire surface, or slightly blackened)
  Good: Scratched and blackened, and clearly nonuniform appearance
  Fair: Severely scratched and blackened mainly in corner portions
  Poor: Cracked and unsuccessful forming
  The evaluations described in (6-1) to (6-5) were performed on the galvanized steel sheets produced using the surface treatment solutions described in Examples and Comparative Examples. Tables 4-1 to 4-5 show the results.

TABLE 4-1

| Test level | | Corrosion resistance | Adhesion | Continuity | Storage stability | Lubricity |
|---|---|---|---|---|---|---|
| Example | 1 | Good | Excellent | Excellent | Excellent | Good |
| Example | 2 | Excellent | Excellent | Excellent | Excellent | Good |
| Example | 3 | Excellent | Excellent | Excellent | Excellent | Good |
| Example | 4 | Excellent | Excellent | Excellent | Excellent | Good |
| Example | 5 | Excellent | Excellent | Excellent | Excellent | Good |
| Example | 6 | Excellent | Excellent | Excellent | Excellent | Good |
| Example | 7 | Excellent | Excellent | Excellent | Excellent | Good |
| Example | 8 | Excellent | Excellent | Good | Excellent | Good |
| Example | 9 | Good | Excellent | Excellent | Excellent | Good |

TABLE 4-1-continued

| Test level | | Corrosion resistance | Adhesion | Continuity | Storage stability | Lubricity |
|---|---|---|---|---|---|---|
| Example | 10 | Excellent | Excellent | Excellent | Excellent | Good |
| Example | 11 | Excellent | Excellent | Excellent | Excellent | Good |
| Example | 12 | Excellent | Excellent | Excellent | Excellent | Good |
| Example | 13 | Excellent | Excellent | Excellent | Excellent | Good |
| Example | 14 | Excellent | Excellent | Excellent | Excellent | Good |
| Example | 15 | Excellent | Excellent | Excellent | Excellent | Good |
| Example | 16 | Good | Excellent | Excellent | Excellent | Good |
| Example | 17 | Good | Excellent | Excellent | Excellent | Good |
| Example | 18 | Excellent | Excellent | Excellent | Excellent | Good |
| Example | 19 | Excellent | Excellent | Excellent | Excellent | Good |
| Example | 20 | Excellent | Excellent | Excellent | Excellent | Good |
| Example | 21 | Excellent | Excellent | Excellent | Excellent | Good |
| Example | 22 | Excellent | Excellent | Excellent | Excellent | Good |
| Example | 23 | Excellent | Excellent | Excellent | Excellent | Good |
| Example | 24 | Excellent | Excellent | Excellent | Excellent | Good |
| Example | 25 | Excellent | Excellent | Excellent | Excellent | Good |
| Example | 26 | Good | Good | Excellent | Excellent | Good |
| Example | 27 | Excellent | Excellent | Excellent | Excellent | Good |
| Example | 28 | Excellent | Excellent | Excellent | Excellent | Good |
| Example | 29 | Good | Excellent | Good | Excellent | Good |
| Example | 30 | Excellent | Excellent | Excellent | Excellent | Good |
| Example | 31 | Excellent | Good | Excellent | Excellent | Good |
| Example | 32 | Good | Excellent | Excellent | Excellent | Good |
| Example | 33 | Excellent | Excellent | Excellent | Excellent | Good |
| Example | 34 | Excellent | Excellent | Excellent | Excellent | Good |
| Example | 35 | Excellent | Excellent | Excellent | Excellent | Good |
| Example | 36 | Excellent | Excellent | Excellent | Excellent | Good |
| Example | 37 | Excellent | Excellent | Excellent | Excellent | Good |
| Example | 38 | Excellent | Excellent | Excellent | Excellent | Good |
| Example | 39 | Excellent | Excellent | Excellent | Excellent | Good |
| Example | 40 | Excellent | Excellent | Excellent | Excellent | Good |

TABLE 4-2

| Test level | | Corrosion resistance | Adhesion | Continuity | Storage stability | Lubricity |
|---|---|---|---|---|---|---|
| Example | 41 | Excellent | Excellent | Excellent | Excellent | Good |
| Example | 42 | Good | Excellent | Excellent | Excellent | Good |
| Example | 43 | Good | Excellent | Excellent | Excellent | Good |
| Example | 44 | Excellent | Excellent | Excellent | Excellent | Good |
| Example | 45 | Excellent | Excellent | Excellent | Excellent | Good |
| Example | 46 | Excellent | Excellent | Excellent | Excellent | Good |
| Example | 47 | Excellent | Excellent | Excellent | Excellent | Good |
| Example | 48 | Good | Excellent | Excellent | Excellent | Good |
| Example | 49 | Excellent | Excellent | Excellent | Excellent | Good |
| Example | 50 | Good | Excellent | Excellent | Excellent | Good |
| Example | 51 | Excellent | Excellent | Excellent | Excellent | Good |
| Example | 52 | Excellent | Excellent | Excellent | Excellent | Good |
| Example | 53 | Excellent | Excellent | Excellent | Excellent | Good |
| Example | 54 | Excellent | Excellent | Excellent | Excellent | Good |
| Example | 55 | Excellent | Excellent | Excellent | Excellent | Good |
| Example | 56 | Excellent | Excellent | Excellent | Excellent | Good |
| Example | 57 | Excellent | Excellent | Excellent | Excellent | Good |
| Example | 58 | Excellent | Excellent | Excellent | Excellent | Good |
| Example | 59 | Excellent | Excellent | Good | Excellent | Excellent |
| Example | 60 | Excellent | Excellent | Satisfactory | Excellent | Excellent |
| Example | 61 | Good | Excellent | Excellent | Excellent | Good |
| Example | 62 | Excellent | Excellent | Excellent | Excellent | Good |
| Example | 63 | Excellent | Excellent | Excellent | Excellent | Good |
| Example | 64 | Excellent | Excellent | Excellent | Excellent | Good |
| Example | 65 | Good | Excellent | Excellent | Excellent | Good |
| Example | 66 | Excellent | Excellent | Excellent | Excellent | Good |
| Example | 67 | Excellent | Excellent | Excellent | Excellent | Good |
| Example | 68 | Excellent | Excellent | Good | Excellent | Good |
| Example | 69 | Excellent | Excellent | Excellent | Excellent | Good |
| Example | 70 | Excellent | Excellent | Excellent | Excellent | Good |
| Example | 71 | Excellent | Excellent | Excellent | Excellent | Good |
| Example | 72 | Good | Excellent | Excellent | Excellent | Good |
| Example | 73 | Good | Excellent | Excellent | Excellent | Good |
| Example | 74 | Fair | Excellent | Excellent | Excellent | Good |
| Example | 75 | Excellent | Excellent | Excellent | Excellent | Good |

TABLE 4-2-continued

| Test level | | Corrosion resistance | Adhesion | Continuity | Storage stability | Lubricity |
|---|---|---|---|---|---|---|
| Example | 76 | Good | Excellent | Excellent | Excellent | Good |
| Example | 77 | Excellent | Excellent | Excellent | Excellent | Good |
| Example | 78 | Excellent | Excellent | Excellent | Excellent | Good |
| Example | 79 | Good | Excellent | Excellent | Excellent | Good |

TABLE 4-2-continued

| Test level | | Corrosion resistance | Adhesion | Continuity | Storage stability | Lubricity |
|---|---|---|---|---|---|---|
| Example | 80 | Satisfactory | Excellent | Satisfactory | Excellent | Good |

TABLE 4-3

| Test level | | Corrosion resistance | Adhesion | Continuity | Storage stability | Lubricity |
|---|---|---|---|---|---|---|
| Example | 81 | Excellent | Excellent | Excellent | Excellent | Good |
| Example | 82 | Excellent | Excellent | Excellent | Excellent | Good |
| Example | 83 | Excellent | Excellent | Excellent | Excellent | Good |
| Example | 84 | Good | Excellent | Excellent | Excellent | Good |
| Example | 85 | Good | Excellent | Excellent | Excellent | Good |
| Example | 86 | Excellent | Excellent | Excellent | Excellent | Good |
| Example | 87 | Good | Excellent | Excellent | Excellent | Good |
| Example | 88 | Good | Excellent | Fair | Excellent | Excellent |
| Example | 89 | Excellent | Excellent | Excellent | Excellent | Good |
| Example | 90 | Excellent | Excellent | Excellent | Excellent | Good |
| Example | 91 | Excellent | Excellent | Excellent | Excellent | Good |
| Example | 92 | Excellent | Excellent | Excellent | Excellent | Good |
| Example | 93 | Good | Excellent | Excellent | Excellent | Good |
| Example | 94 | Good | Excellent | Excellent | Excellent | Good |
| Example | 95 | Excellent | Excellent | Excellent | Excellent | Good |
| Example | 96 | Excellent | Excellent | Good | Excellent | Excellent |
| Example | 97 | Excellent | Excellent | Satisfactory | Excellent | Excellent |
| Example | 98 | Excellent | Excellent | Excellent | Excellent | Good |
| Example | 99 | Excellent | Excellent | Excellent | Excellent | Excellent |
| Example | 100 | Good | Excellent | Good | Excellent | Excellent |
| Example | 101 | Good | Excellent | Good | Good | Excellent |
| Example | 102 | Good | Excellent | Satisfactory | Good | Excellent |
| Comparative Example | 103 | Poor | Fair | Good | Good | Good |
| Comparative Example | 104 | Good | Fair | Poor | Good | Good |
| Comparative Example | 105 | Poor | Fair | Poor | Excellent | Good |
| Comparative Example | 106 | Fair | Poor | Good | Fair | Good |
| Comparative Example | 107 | Poor | Fair | Good | Fair | Good |
| Comparative Example | 108 | Poor | Fair | Good | Fair | Good |
| Comparative Example | 109 | Poor | Fair | Good | Excellent | Good |
| Comparative Example | 110 | — | — | — | Poor | — |
| Comparative Example | 111 | Poor | Fair | Good | Excellent | Good |
| Comparative Example | 112 | Good | Fair | Poor | Fair | Good |
| Comparative Example | 113 | Poor | Poor | Poor | Excellent | Good |
| Comparative Example | 114 | Poor | Poor | Poor | Excellent | Good |
| Comparative Example | 115 | Poor | Fair | Fair | Fair | Good |
| Comparative Example | 116 | Poor | Fair | Fair | Excellent | Good |
| Comparative Example | 117 | Poor | Poor | Satisfactory | Fair | Good |
| Comparative Example | 118 | — | — | — | Poor | — |
| Comparative Example | 119 | Poor | Fair | Fair | Excellent | Good |
| Comparative Example | 120 | Poor | Fair | Fair | Good | Good |

TABLE 4-4

| Test level | | Corrosion resistance | Adhesion | Continuity | Storage stability | Lubricity |
|---|---|---|---|---|---|---|
| Example | 121 | Satisfactory | Good | Excellent | Excellent | Good |
| Example | 122 | Satisfactory | Good | Excellent | Excellent | Good |
| Example | 123 | Good | Excellent | Excellent | Excellent | Good |
| Example | 124 | Excellent | Excellent | Excellent | Excellent | Good |
| Example | 125 | Good | Excellent | Excellent | Excellent | Good |
| Example | 126 | Good | Excellent | Excellent | Excellent | Good |
| Example | 127 | Good | Excellent | Excellent | Excellent | Good |
| Example | 128 | Good | Excellent | Excellent | Excellent | Good |
| Example | 129 | Good | Excellent | Excellent | Excellent | Good |
| Example | 130 | Good | Excellent | Excellent | Excellent | Excellent |
| Example | 131 | Good | Excellent | Excellent | Excellent | Excellent |
| Example | 132 | Good | Excellent | Excellent | Excellent | Excellent |
| Example | 133 | Good | Excellent | Excellent | Excellent | Good |
| Example | 134 | Good | Excellent | Excellent | Excellent | Excellent |
| Example | 135 | Satisfactory | Excellent | Excellent | Excellent | Good |

TABLE 4-4-continued

| Test level | | Corrosion resistance | Adhesion | Continuity | Storage stability | Lubricity |
|---|---|---|---|---|---|---|
| Example | 136 | Good | Excellent | Excellent | Excellent | Good |
| Example | 137 | Good | Excellent | Excellent | Excellent | Good |
| Example | 138 | Good | Excellent | Excellent | Excellent | Good |
| Example | 139 | Excellent | Excellent | Good | Excellent | Excellent |
| Example | 140 | Excellent | Excellent | Satisfactory | Excellent | Excellent |
| Example | 141 | Good | Excellent | Excellent | Excellent | Good |
| Example | 142 | Excellent | Excellent | Excellent | Excellent | Excellent |
| Example | 143 | Excellent | Excellent | Excellent | Excellent | Good |
| Example | 144 | Excellent | Excellent | Good | Excellent | Excellent |
| Example | 145 | Excellent | Excellent | Good | Excellent | Excellent |
| Example | 146 | Excellent | Excellent | Excellent | Excellent | Good |
| Example | 147 | Excellent | Excellent | Satisfactory | Excellent | Excellent |
| Example | 148 | Fair | Excellent | Excellent | Excellent | Fair |
| Example | 149 | Satisfactory | Excellent | Excellent | Excellent | Good |
| Example | 150 | Good | Excellent | Excellent | Excellent | Good |
| Example | 151 | Good | Excellent | Excellent | Excellent | Good |
| Example | 152 | Good | Excellent | Excellent | Excellent | Good |
| Example | 153 | Satisfactory | Excellent | Excellent | Excellent | Good |
| Example | 154 | Good | Excellent | Excellent | Excellent | Good |
| Example | 155 | Excellent | Excellent | Good | Excellent | Excellent |
| Example | 156 | Good | Excellent | Excellent | Excellent | Good |
| Example | 157 | Excellent | Excellent | Good | Excellent | Excellent |
| Example | 158 | Excellent | Excellent | Excellent | Excellent | Good |
| Example | 159 | Excellent | Good | Good | Excellent | Excellent |
| Comparative Example | 160 | Fair | Excellent | Excellent | Excellent | Poor |

TABLE 4-5

| Test level | | Corrosion resistance | Adhesion | Continuity | Storage stability | Lubricity |
|---|---|---|---|---|---|---|
| Comparative Example | 161 | Poor | Fair | Excellent | Excellent | Good |
| Comparative Example | 162 | Poor | Fair | Excellent | Excellent | Good |
| Comparative Example | 163 | Excellent | Good | Poor | Excellent | Excellent |
| Comparative Example | 164 | Excellent | Good | Poor | Excellent | Excellent |
| Example | 165 | Excellent | Excellent | Excellent | Excellent | Good |
| Example | 166 | Excellent | Excellent | Excellent | Excellent | Good |
| Example | 167 | Excellent | Excellent | Excellent | Excellent | Good |
| Example | 168 | Good | Excellent | Excellent | Excellent | Good |
| Example | 169 | Excellent | Excellent | Excellent | Excellent | Good |
| Example | 170 | Excellent | Excellent | Excellent | Excellent | Good |
| Example | 171 | Excellent | Excellent | Excellent | Excellent | Good |
| Example | 172 | Excellent | Excellent | Excellent | Excellent | Good |
| Example | 173 | Excellent | Excellent | Excellent | Excellent | Good |
| Example | 174 | Excellent | Excellent | Excellent | Excellent | Good |
| Example | 175 | Excellent | Excellent | Excellent | Excellent | Good |
| Example | 176 | Excellent | Excellent | Good | Excellent | Good |
| Example | 177 | Excellent | Excellent | Excellent | Excellent | Good |
| Example | 178 | Excellent | Excellent | Excellent | Excellent | Good |
| Example | 179 | Excellent | Excellent | Good | Excellent | Good |
| Example | 180 | Excellent | Excellent | Excellent | Excellent | Good |
| Example | 181 | Excellent | Excellent | Excellent | Excellent | Good |
| Example | 182 | Good | Excellent | Excellent | Excellent | Good |
| Example | 183 | Good | Excellent | Excellent | Excellent | Good |
| Example | 184 | Good | Excellent | Excellent | Excellent | Good |
| Example | 185 | Excellent | Excellent | Excellent | Excellent | Good |
| Example | 186 | Excellent | Excellent | Good | Excellent | Excellent |
| Example | 187 | Excellent | Excellent | Satisfactory | Excellent | Excellent |
| Example | 188 | Good | Excellent | Excellent | Excellent | Good |
| Example | 189 | Excellent | Excellent | Excellent | Excellent | Excellent |
| Example | 190 | Excellent | Excellent | Excellent | Excellent | Good |
| Example | 191 | Excellent | Excellent | Good | Excellent | Excellent |
| Example | 192 | Excellent | Excellent | Good | Excellent | Excellent |
| Example | 193 | Excellent | Excellent | Excellent | Excellent | Good |
| Example | 194 | Excellent | Excellent | Satisfactory | Excellent | Excellent |
| Example | 195 | Satisfactory | Excellent | Excellent | Excellent | Fair |
| Example | 196 | Satisfactory | Excellent | Excellent | Excellent | Good |
| Example | 197 | Good | Excellent | Excellent | Excellent | Good |
| Example | 198 | Excellent | Excellent | Excellent | Excellent | Good |
| Example | 199 | Excellent | Excellent | Excellent | Excellent | Good |
| Example | 200 | Good | Excellent | Excellent | Excellent | Good |
| Example | 201 | Satisfactory | Fair | Satisfactory | Excellent | Good |

TABLE 4-5-continued

| Test level | | Corrosion resistance | Adhesion | Continuity | Storage stability | Lubricity |
|---|---|---|---|---|---|---|
| Comparative Example | 202 | Poor | Poor | Good | Excellent | Good |
| Comparative Example | 203 | Poor | Poor | Fair | Excellent | Good |

As shown in Tables 4-1 to 4-5, each of the galvanized steel sheets according to the present invention has high corrosion resistance and adhesion and has high continuity even if the steel sheet is in contact with a gasket or the like at a low contact pressure. In contrast, in each of Comparative Examples in which any of the requirements is outside the appropriate range of the present invention, at least one of the corrosion resistance, adhesion, continuity, and storage stability was insufficient.

In Comparative Examples 110 and 118, the surface treatment solutions were unstable and the films could not be formed. Therefore, the evaluations could not be performed.

INDUSTRIAL APPLICABILITY

There can be provided a galvanized steel sheet that includes a film free from regulated substances causing pollution such as hexavalent chromium, that has various properties such as corrosion resistance and adhesion, and that allows for high continuity without degrading corrosion resistance even under a severe condition that the steel sheet is in contact with a gasket or the like at a low contact pressure. Accordingly, the galvanized steel sheet of the present invention is significantly useful as a component of automobiles, household electrical appliances, office automation appliances, and the like.

The invention claimed is:

1. A galvanized steel sheet, comprising:
a surface film on a surface of a galvanized layer on one or both sides of the steel sheet, the surface film having a two-layer structure including a first layer film and a second layer film,
wherein the first layer film is formed by applying a surface treatment solution (A) having a pH of 8 to 10 onto the surface of the galvanized layer and drying the surface treatment solution (A) by heating,
the surface treatment solution (A) containing a water-soluble zirconium compound (a), a tetraalkoxysilane (b), an epoxy group-containing compound (c), a chelating agent (d), a vanadate compound (e), and a metal compound (f) containing at least one selected from the group consisting of Ti, Al, and Zn so that conditions (I) to (V) below are satisfied,
wherein the second layer film is formed by applying a surface treatment solution (B) containing an organic resin (h) onto a surface of the first layer film and drying the surface treatment solution (B) by heating, and
wherein a total combined thickness of the first layer film and the second layer film on the surface of the galvanized layer is 0.1 to 3 µm on any side:
 (I) a ratio ($a_{Zr}/b$) of the mass ($a_{Zr}$) of the water-soluble zirconium compound (a) in terms of Zr to the mass of the tetraalkoxysilane (b) is 1.0 to 6.0,
 (II) a ratio ($b/c_S$) of the mass of the tetraalkoxysilane (b) to the mass of a solid ($c_S$) of the epoxy group-containing compound (c) is 0.1 to 1.6,
 (III) a ratio ($b/c_S$) of the mass of the tetraalkoxysilane (b) to the mass of a solid ($d_S$) of the chelating agent (d) is 0.3 to 2.0,
 (IV) a ratio ($e_V/d_S$) of the mass ($e_V$) of the vanadate compound (e) in terms of V to the mass of a solid ($d_S$) of the chelating agent (d) is 0.03 to 1.0, and
 (V) a ratio ($f_M/d_S$) of the total metal mass ($f_M$) of the metal compound (f) to the mass of a solid ($d_S$) of the chelating agent (d) is 0.05 to 0.8.

2. The galvanized steel sheet according to claim 1, wherein the surface treatment solution (B) further contains a rust-inhibiting additive (Y).

3. The galvanized steel sheet according to claim 2, wherein the rust-inhibiting additive (Y) is (i) and/or (j) below, and the content of the rust-inhibiting additive (Y) is 1 to 100 parts by mass on a solid content basis relative to 100 parts by mass of the whole organic resin (h) in the surface treatment solution (B):
 (i) Ca ion-exchanged silica; and
 (j) silicon oxide.

4. The galvanized steel sheet according to claim 1, wherein the surface treatment solution (B) further contains a lubricant (k).

5. The galvanized steel sheet according to claim 1, wherein the ratio ($a_{Zr}/b$) is 1.47 to 3.1, the ratio ($f_M/d_S$) is 0.17 to 0.34, and the surface treatment solution (A) has a pH of 8.2 to 9.5.

6. The galvanized steel sheet according to claim 5, having corrosion resistance such that a length of time at salt-water spray test until a white rust area percentage reaches 5% is 192 hours or longer, and continuity where average of minimum load that achieves a surface resistance of $10^{-4}$ Ω or less at 10 points is less than 350 g.

7. The galvanized steel sheet according to claim 1, having corrosion resistance such that a length of time at salt-water spray test until a white rust area percentage reaches 5% is 156 hours or longer, and continuity where average of minimum load that achieves a surface resistance of $10^{-4}$ Ω or less at 10 points is less than 600 g.

8. The galvanized steel sheet according to claim 1, wherein a skeleton of the first layer film is constituted by the water-soluble zirconium compound (a), the tetraalkoxysilane (b), and the epoxy group-containing compound (c).

9. The galvanized steel sheet according to claim 1, wherein the chelating agent (d) contains at least one of carboxyl groups and phosphonic acid groups.

10. The galvanized steel sheet according to claim 9, wherein a skeleton of the first layer film is constituted by the water-soluble zirconium compound (a), the tetraalkoxysilane (b), the epoxy group-containing compound (c), and the chelating agent (d).

11. The galvanized steel sheet according to claim 1, wherein the steel sheet is a chromium-free treated steel sheet.

12. A shield box comprising the galvanized steel sheet according to claim 1 and an electrically conductive gasket in contact with the galvanized steel sheet.

13. The galvanized steel sheet according to claim 1, wherein the organic resin (h) in the surface treatment solution (B) contains an organic resin (F) having an OH group and/or a COOH group.

14. The galvanized steel sheet according to claim 13, wherein the surface treatment solution (B) further contains a rust-inhibiting additive (Y).

15. The galvanized steel sheet according to claim 13, wherein the surface treatment solution (B) further contains a lubricant (k).

16. The galvanized steel sheet according to claim 1, wherein the organic resin (h) in the surface treatment solution (B) contains a hydrazine-modified organic resin (X) produced by reaction with an active hydrogen-containing compound (D) that is partly or entirely composed of a hydrazine derivative (E) containing active hydrogen.

17. The galvanized steel sheet according to claim 16, wherein the surface treatment solution (B) further contains a rust-inhibiting additive (Y).

18. The galvanized steel sheet according to claim 16, wherein the surface treatment solution (B) further contains a lubricant (k).

19. The galvanized steel sheet according to claim 1, wherein the surface treatment solution (A) further contains a nonionic acrylic resin emulsion (g), and a ratio of the nonionic acrylic resin emulsion in the surface treatment solution (A) is 0.5 to 45.0% by mass on a solid content basis.

20. The galvanized steel sheet according to claim 19, wherein the organic resin (h) in the surface treatment solution (B) contains an organic resin (F) having an OH group and/or a COOH group.

21. The galvanized steel sheet according to claim 10, wherein the organic resin (h) in the surface treatment solution (B) contains a hydrazine-modified organic resin (X) produced by reaction with an active hydrogen-containing compound (D) that is partly or entirely composed of a hydrazine derivative (E) containing active hydrogen.

22. The galvanized steel sheet according to claim 19, wherein the surface treatment solution (B) further contains a rust-inhibiting additive (Y).

23. The galvanized steel sheet according to claim 19, wherein the surface treatment solution (B) further contains a lubricant (k).

24. The galvanized steel sheet according to claim 19, wherein the ratio of the nonionic acrylic resin emulsion in the surface treatment solution (A) is 0.5 to 4.5% by mass on a solid content basis.

25. The galvanized steel sheet according to claim 24, wherein the organic resin (h) in the surface treatment solution (B) contains an organic resin (F) having an OH group and/or a COOH group.

26. The galvanized steel sheet according to claim 24, wherein the organic resin (h) in the surface treatment solution (B) contains a hydrazine-modified organic resin (X) produced by reaction with an active hydrogen-containing compound (D) that is partly or entirely composed of a hydrazine derivative (E) containing active hydrogen.

27. The galvanized steel sheet according to claim 24, wherein the surface treatment solution (B) further contains a rust-inhibiting additive (Y).

28. The galvanized steel sheet according to claim 24, wherein the surface treatment solution (B) further contains a lubricant (k).

* * * * *